United States Patent
Zaremoodi et al.

(10) Patent No.: US 12,554,934 B2
(45) Date of Patent: Feb. 17, 2026

(54) MULTI-TASK MODEL WITH CONTEXT MASKING

(71) Applicant: Oracle International Corporation, Redwood Shores, CA (US)

(72) Inventors: Poorya Zaremoodi, Melbourne (AU); Duy Vu, Melbourne (AU); Nagaraj N. Bhat, Bengaluru (IN); Srijon Sarkar, Bengaluru (IN); Varsha Kuppur Rajendra, Bellevue, WA (US); Thanh Long Duong, Melbourne (AU); Mark Edward Johnson, Sydney (AU); Pramir Sarkar, Bengaluru (IN); Shahid Reza, Redwood Shores (IN)

(73) Assignee: Oracle International Corporation, Redwood Shores, CA (US)

( * ) Notice: Subject to any disclaimer, the term of this patent is extended or adjusted under 35 U.S.C. 154(b) by 105 days.

(21) Appl. No.: 18/485,700

(22) Filed: Oct. 12, 2023

(65) Prior Publication Data

US 2024/0143934 A1 May 2, 2024

(30) Foreign Application Priority Data

Oct. 13, 2022 (IN) .............................. 202241058632

(51) Int. Cl.
- *G10L 15/18* (2013.01)
- *G06F 40/284* (2020.01)

(Continued)

(52) U.S. Cl.
CPC ............ *G06F 40/30* (2020.01); *G06F 40/284* (2020.01); *G06F 40/289* (2020.01); *G10L 15/16* (2013.01);

(Continued)

(58) Field of Classification Search
None
See application file for complete search history.

(56) References Cited

U.S. PATENT DOCUMENTS 10,839,155 B2 * 11/2020 Oshima ................. G06F 40/268
11,663,417 B2 * 5/2023 Jiang ....................... G06F 40/30
                                                                                                                  704/9

(Continued)

FOREIGN PATENT DOCUMENTS

CN        111985205 A * 11/2020 ............. G06N 3/045
CN        113157920 A * 7/2021 ............. G06N 3/047

(Continued)

OTHER PUBLICATIONS

Machine translation of CN-114764564-A (Year: 2022).*

(Continued)

*Primary Examiner* — Richard Z Zhu
(74) *Attorney, Agent, or Firm* — Kilpatrick Townsend & Stockton LLP

(57) ABSTRACT

A method includes accessing document including sentences, document being associated with configuration flag indicating whether ABSA, SLSA, or both are to be performed; inputting the document into language model that generates chunks of token embeddings for the document; and, based on the configuration flag, performing at least one from among the ABSA and the SLSA by inputting the chunks of token embeddings into a multi-task model. When performing the SLSA, a part of token embeddings in each of the chunks is masked, and the masked token embeddings do not belong to a particular sentence on which the SLSA is performed.

18 Claims, 18 Drawing Sheets

(51) Int. Cl.
G06F 40/289 (2020.01)
G06F 40/30 (2020.01)
G10L 15/16 (2006.01)
G06F 40/295 (2020.01)
(52) U.S. Cl.
CPC ............ *G10L 15/18* (2013.01); *G06F 40/295* (2020.01); *G10L 15/1807* (2013.01); *G10L 15/1815* (2013.01); *G10L 15/1822* (2013.01)

(56) References Cited

U.S. PATENT DOCUMENTS

| | | | | |
|---|---|---|---|---|
| 12,333,258 | B2* | 6/2025 | Tiwari | G10L 13/08 |
| 2013/0018892 | A1* | 1/2013 | Castellanos | G06Q 50/01 |
| | | | | 707/E17.014 |
| 2020/0286002 | A1 | 9/2020 | Szanto et al. | |
| 2020/0372404 | A1 | 11/2020 | Mahmud et al. | |
| 2021/0209299 | A1 | 7/2021 | Akinwande et al. | |
| 2021/0334468 | A1 | 10/2021 | Yu et al. | |
| 2023/0153528 | A1 | 5/2023 | Vu et al. | |
| 2023/0153687 | A1 | 5/2023 | Vu et al. | |
| 2023/0153688 | A1 | 5/2023 | Vu et al. | |
| 2023/0154455 | A1* | 5/2023 | Vu | G06N 3/082 |
| | | | | 704/243 |
| 2024/0070399 | A1* | 2/2024 | Tiwari | G06F 40/35 |
| 2024/0135116 | A1 | 4/2024 | Vu et al. | |

FOREIGN PATENT DOCUMENTS

| | | | | |
|---|---|---|---|---|
| CN | 114676687 | A * | 6/2022 | G06F 16/35 |
| CN | 114764564 | A * | 7/2022 | G06F 18/2431 |
| CN | 114942976 | A * | 8/2022 | G06F 18/214 |

OTHER PUBLICATIONS

Machine translation of CN-113157920-A (Year: 2021).*
Qureshi et al., "A novel auto-annotation technique for aspect level sentiment analysis", CMC, 2022, vol. 70, No. 3 (Year: 2022).*
Chen et al., "Unsupervised Data Augmentation for Aspect based Sentiment Analysis", Proceedings of the 29th International Conference on Computational Linguistics, pp. 6746-6751, Oct. 12-17, 2022 (Year: 2022).*
Wang et al., "Aspect Level Sentiment Analysis using AS-Capsules", WWW' 19, May 13-17, 2019 (Year: 2019).*
Zhang et al., "EATN: An efficient adaptive transfer network for Aspect-level sentiment Analysis", IEEE Transactions On Knowledge and Data Engineering, vol. 35, No. 1 (Year: 2021).*
Li et al., "Hierarchical Attention Based Position-aware Network for Aspect level Sentiment Analysis", Proceedings of the 22nd Conference on Computational Natural Language Learning, pp. 181-189, 2018. (Year: 2018).*
Machine translation of CN-114942976-A. (Year: 2022).*
Machine translation of CN-114676687-A. (Year: 2022).*
Machine translation of CN-111985205-A (Year: 2020).*
Aggregate Function, Available Online at: https://en.wikipedia.org/wiki/Aggregate_function, Accessed from Internet on Oct. 12, 2023, pp. 1-5.
AI Language, Available Online at: https://www.oracle.com/au/artificial-intelligence/language/#rc30p3, Accessed from Internet on Oct. 12, 2023, pp. 1-6.
Bert/Multilingual.md at Master, GitHub, Google-research/bert, retrieved Oct. 12, 2023 at https://github.com/google-research/bert/blob/master/multilingual.md#list-of-languages.
F-Score, Available Online at: https://en.wikipedia.org/wiki/F-score, Accessed from Internet on Oct. 12, 2023, pp. 1-7.
Language Technology Research Group at the University of Helsinki, Available Online at: https://huggingface.co/Helsinki-NLP, Accessed from Internet on Oct. 12, 2023, pp. 1-3.
Sklearn. Metrics.Accuracy_Score, Scikit-Learn 1.3.0 Documentation, 2007-2023, 2 pages.
Sklearn.Metrics.F1_Score, Scikit-Learn 1.3.0 Documentation, 2007-2023, 3 pages.
Stochastic Gradient Descent, Wikipedia, retrieved Oct. 12, 2023 at https://en.wikipedia.org/wiki/Stochastic_gradient_descent.
Tatoeba is a Collection of Sentences and Translations, Tatoeba, Available Online at: https://tatoeba.org/en/, Accessed from Internet on Oct. 12, 2023, pp. 1-2.
Can et al., Multilingual Sentiment Analysis: An RNN-Based Framework for Limited Data, Available Online at: https://arxiv.org/abs/1806.04511, Jun. 8, 2018, 5 pages.
Chen et al., Unsupervised Data Augmentation for Aspect Based Sentiment Analysis, Proceedings of the 29th International Conference on Computational Linguistics, Oct. 12-17, 2022, pp. 6746-6751.
Dou et al., Word Alignment by Fine-tuning Embeddings on Parallel Corpora, Available Online at: https://arxiv.org/abs/2101.08231, Aug. 12, 2021, 17 pages.
Garg et al., KL-NF Technique for Sentiment Classification, Multimedia Tools and Applications, vol. 80, No. 13, Mar. 3, 2021, 23 pages.
Imseng et al., Using KL-Divergence and Multilingual Information to Improve ASR for Under-Resourced Languages, Institute of Electrical and Electronics Engineers International Conference on Acoustics, Speech and Signal Processing (ICASSP), Mar. 2012, pp. 4869-4872.
Lample et al., Neural Architectures for Named Entity Recognition, Proceedings of the 2016 Conference of the North American Chapter of the Association for Computational Linguistics: Human Language Technologies, Apr. 7, 2016, pp. 260-270.
Mamta et al., Exploring Multi-lingual, Multi-task and Adversarial Learning for Low-resource Sentiment Analysis, Association for Computing Machinery, vol. 21, No. 5, Sep. 23, 2022, 18 pages.
Patidar et al., From Monolingual to Multilingual FAQ Assistant using Multilingual Co-training, Association for Computational Linguistics. Proceedings of the 2nd Workshop on Deep Learning Approaches for Low-Resource NLP (DeepLo), Nov. 3, 2019, pp. 115-123.
Ronningstad, Targeted Sentiment Analysis for Norwegian Text, Norwegian Research Center for AI Innovation, 2021, 1 page.
Sanchez-Cartagena et al., Rethinking Data Augmentation for Low-Resource Neural Machine Translation: A Multi-Task Learning Approach, Association for Computational Linguistics, Proceedings of the 2021 Conference on Empirical Methods in Natural Language Processing, Nov. 7-11, 2021, pp. 8502-8516.
Wang, Data Efficient Multilingual Natural Language Processing, Available Online at: https://www.lti.cs.cmu.edu/sites/default/files/wang%2C%20cindy%20-%20Thesis.pdf, 2022, pp. 1-145.
Zhao et al., Learning Discriminative Neural Sentiment Units for Semi-supervised Target-Level Sentiment Classification, Advances in Knowledge Discovery and Data Mining, May 2020, 28 pages.
U.S. Appl. No. 18/485,779, Non-Final Office Action mailed on Jul. 3, 2025, 17 pages.
Edunov et al., Understanding Back-Translation at Scale, Available Online at: https://arxiv.org/abs/1808.09381, Oct. 3, 2018, 12 pages.
U.S. Appl. No. 18/485,779, Notice of Allowance, Mailed On Nov. 6, 2025, 8 pages.

* cited by examiner

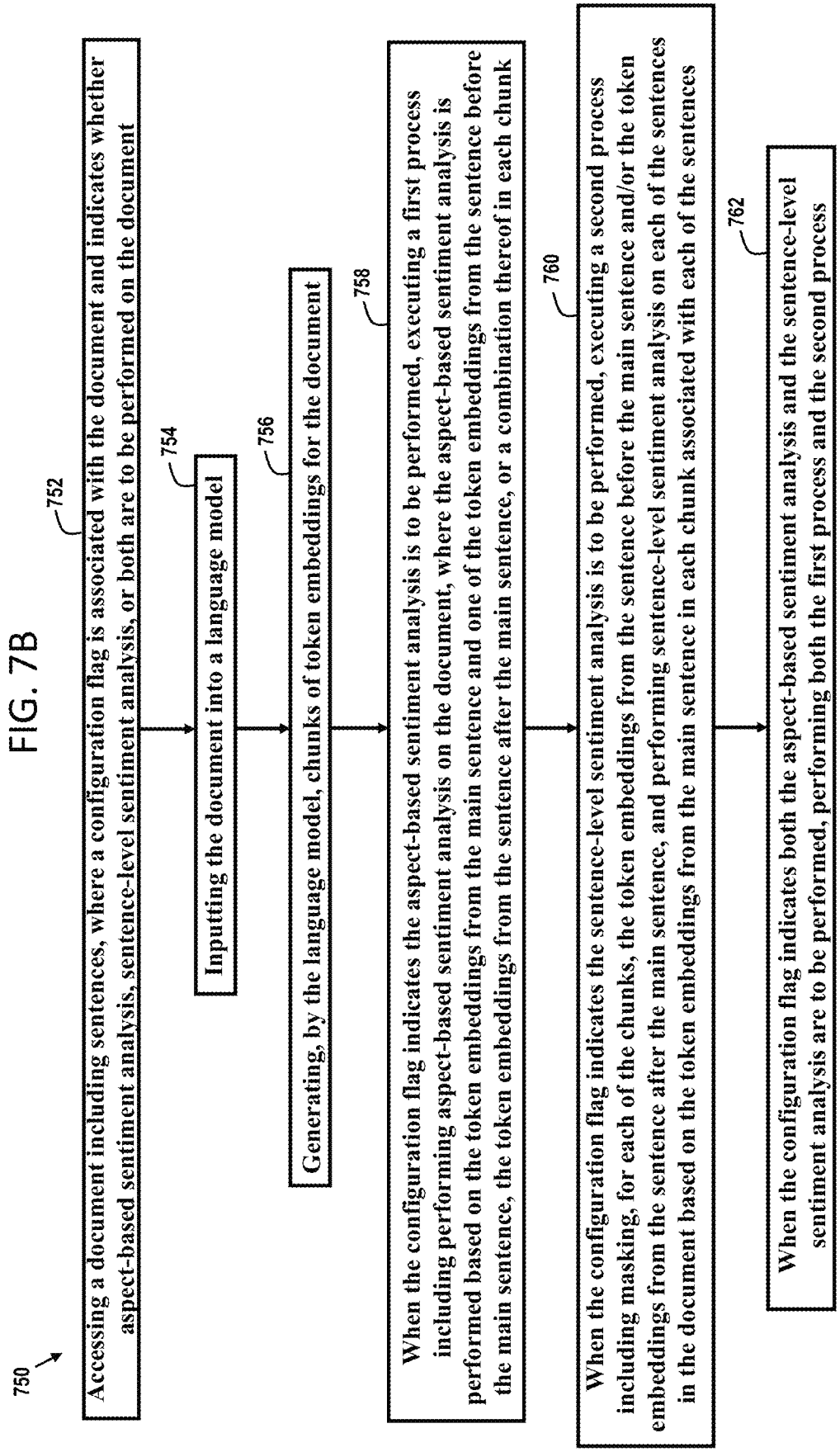

MULTI-TASK MODEL WITH CONTEXT MASKING

CROSS-REFERENCE TO RELATED APPLICATION

The present application is a non-provisional application of and claims the benefit and priority under 35 U.S.C. 119(e) of Indian Provisional Application No. 202241058632, filed Oct. 13, 2022, which is incorporated by reference herein in its entirety.

FIELD

The present disclosure relates generally to artificial intelligence techniques, and more particularly, to building and using a multi-task machine learning (ML) model that can predict the sentiment for one or more input documents using a plurality of different task-based approaches.

BACKGROUND

Artificial intelligence has many applications. For example, an intelligent bot, powered by artificial intelligence, can communicate more intelligently and contextually in live conversations, and thus may allow for a more natural conversation between the bot and the end users. Instead of the end user learning a fixed set of keywords or commands that the bot knows how to respond to, an intelligent bot may be able to understand the end user's intention and/or sentiment based upon user utterances in natural language and respond accordingly.

Machine learning (ML) is an area of artificial intelligence where computers have the capability to learn without being explicitly programmed. There are different types of ML techniques including supervised learning techniques, unsupervised learning techniques, and others. In a supervised learning technique, an ML model is created and trained using training data, where the training data includes multiple training examples, each training example including an input and a known output corresponding to the input (e.g., a ground truth).

Recently, the ML techniques have been proposed to perform sentiment analysis on the documents. Sentiment analysis is the process of analyzing digital text to determine the emotional tone of the message, e.g., if the tone is positive, negative, mixed, or neutral. For instance, sentiment analysis may be performed on social media to determine overall opinion on a particular trending topic. As another example, companies can utilize sentiment analysis to monitor brand reputation across large volumes of text data, e.g., emails, customer support chat transcripts, social media, reviews, etc.

However, the related art ML techniques used for sentiment analysis have some drawbacks. For example, the related art ML techniques suffer from latency and inaccuracies in making predictions with respect to the sentiment class.

SUMMARY

Techniques disclosed herein relate generally to artificial intelligence. More specifically and without limitation, techniques disclosed herein relate to techniques for training and using a multi-task model that can predict the sentiment of an input document using a plurality of different, task-specific AI algorithms. Techniques disclosed herein can provide a combination of different sentiment analysis techniques to enhance the AI-driven sentiment analysis by building and implementing a multi-task model that improves performance accuracy and reduces latency as compared to the methods where different sentiment analysis techniques are performed using separate single-task models.

In various embodiments, a computer-implemented method is provided that includes accessing a document including sentences, where a configuration flag is associated with the document and indicates whether aspect-based sentiment analysis, sentence-level sentiment analysis, or both are to be performed on the document; inputting the document into a language model; generating, by the language model, chunks of token embeddings for the document, where each of the chunks includes a predefined total number of token embeddings including token embeddings from a main sentence and at least one of token embeddings from a sentence before the main sentence, token embeddings from a sentence after the main sentence, or a combination thereof, and, for each of the chunks, a number of the token embeddings from the sentence before the main sentence and a number of the token embeddings from the sentence after the main sentence are restricted to a predefined limit number of token embeddings; when the configuration flag indicates the aspect-based sentiment analysis is to be performed, executing a first process including performing, using a multi-task model, the aspect-based sentiment analysis on the document, where the aspect-based sentiment analysis is performed based on the token embeddings from the main sentence and the at least one of the token embeddings from the sentence before the main sentence, the token embeddings from the sentence after the main sentence, or the combination thereof in each chunk; when the configuration flag indicates the sentence-level sentiment analysis is to be performed, executing a second process including masking, for each of the chunks, the at least one of the token embeddings from the sentence before the main sentence, the token embeddings from the sentence after the main sentence, or the combination thereof, and performing, using the multi-task model, the sentence-level sentiment analysis on each of the sentences in the document based on the token embeddings from the main sentence of each chunk associated with each of the sentences; and when the configuration flag indicates both the aspect-based sentiment analysis and the sentence-level sentiment analysis are to be performed, performing both the first process and the second process.

In some embodiments, the masking includes applying, for each of the chunks, a mask value to the at least one of the token embeddings from the sentence before the main sentence, the token embeddings from the sentence after the main sentence, or the combination thereof.

In some embodiments, the performing the sentence-level sentiment analysis on each of the sentences in the document includes: inputting the token embeddings from the main sentence in each chunk that is associated with a given sentence into a sequence classification head of the multi-task model; predicting, by the sequence classification head, a sentiment class for the given sentence based on the token embeddings; and outputting, by the sequence classification head, the sentiment class for the given sentence.

In some embodiments, the performing the aspect-based sentiment analysis on the document includes: inputting the token embeddings from the main sentence and the at least one of the token embeddings from the sentence before the main sentence, the token embeddings from the sentence after the main sentence, or the combination thereof in each chunk into a token labeling head of the multi-task model; locating, by the token labeling head, one or more aspects in the document based on the token embeddings from the main sentence and the at least one of the token embeddings from the sentence before the main sentence, the token embeddings from the sentence after the main sentence, or the combination thereof in each chunk; predicting, by the token labeling head, a sentiment class expressed towards each of the one or more aspects based on the token embeddings from the main sentence and the at least one of the token embeddings from the sentence before the main sentence, the token embeddings from the sentence after the main sentence, or the combination thereof in each chunk; and outputting, by the token labeling head, the sentiment class expressed towards each of the one or more aspects.

In some embodiments, at least one of the chunks includes a part of the token embeddings from the sentence before the main sentence and the token embeddings from the main sentence, and a chunk following the at least one of the chunks includes a part of the token embeddings from the main sentence and the token embeddings from the sentence after the main sentence.

In some embodiments, the multi-task model includes a sequence classification head and a token labeling head, and the sentence-level sentiment analysis and the aspect-based sentiment analysis are performed using a sentiment analysis network comprising the language model configured to generate the chunks of the token embeddings, the sequence classification head configured to perform the sentence-level sentiment analysis, and the token labeling head configured to perform the aspect-based sentiment analysis.

In some embodiments, the token labeling head and the sequence classification head are configured by training a first head and a second head, respectively, using an early stop training method that includes: training the first head and the second head using token embeddings from a first set of documents; optimizing hyperparameters including weights associated with a first performance metric for the first head and a second performance metric for the second head; validating the first head and the second head using token embeddings from a second set of documents; evaluating performance of the first head and the second head based on the second set of documents using a combination of the first performance metric, the second performance metric, and associated weights; and stopping the training of the first head and the second head when the performance of the first head and the second head on the second set of documents begins to degrade as determined based on the evaluating.

In various embodiments, a computer system is provided that includes one or more processors and one or more computer-readable media storing instructions that, when executed by the one or more processors, cause the one or more processors to perform part or all of the operations and/or methods disclosed herein.

In various embodiments, one or more non-transitory computer-readable media are provided that store instructions that, when executed by one or more processors of a computer system, cause the one or more processors to perform part or all of the operations and/or methods disclosed herein.

The techniques described herein may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

FIG. 7B is a flowchart of a method in accordance with various embodiments.

DETAILED DESCRIPTION

Figure 1:
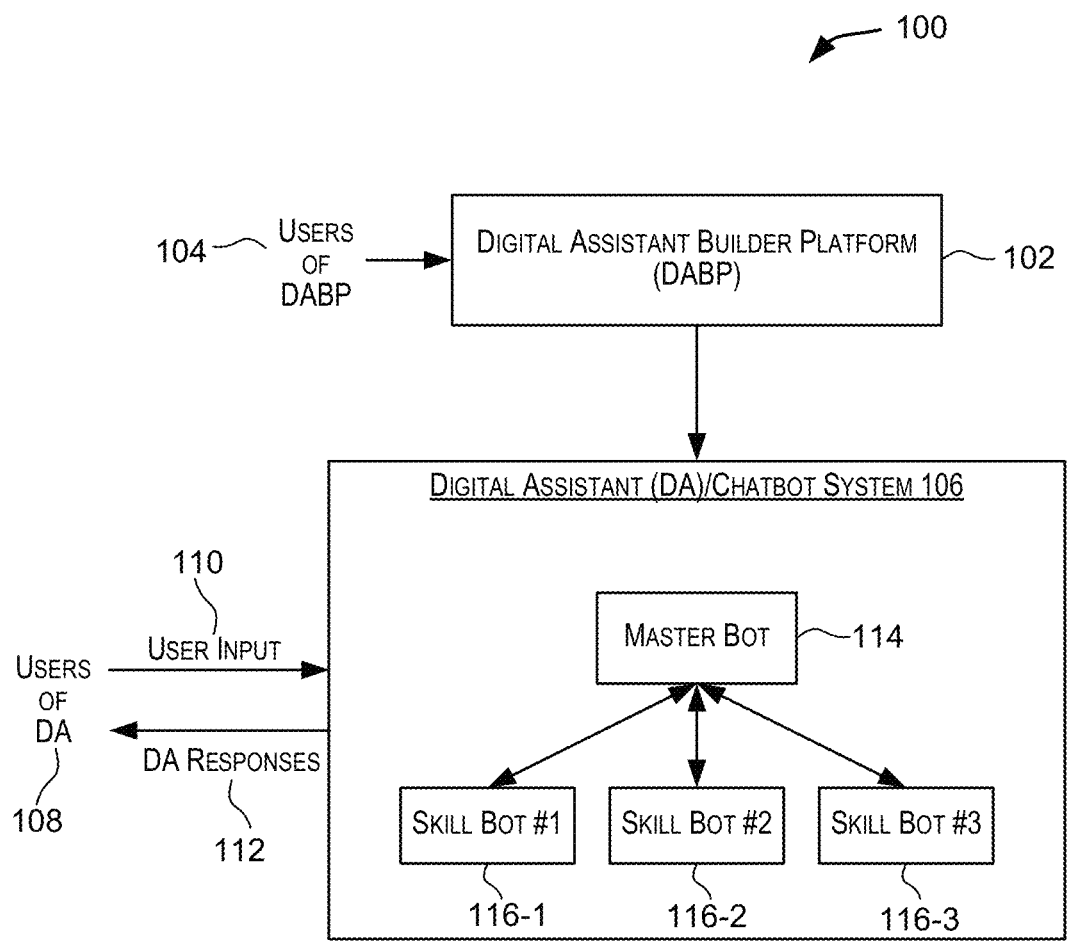
FIG. 1 is a simplified block diagram of a distributed environment according to an embodiment.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

I. INTRODUCTION

The present disclosure relates to machine learning techniques. More particularly, novel model learning techniques described herein are for generating a single multi-task model capable of making predictions of sentiment classes using different sentiment analysis and determination ML algorithms. The techniques described herein enable the multi-task model to be trained such that the trained multi-task model can make predictions using both the sentence-level sentiment analysis (SLSA) (e.g., per sentence sentiment analysis) and aspect-based sentiment analysis (ABSA) (e.g., per aspect sentiment analysis).

Sentiment analysis is the process of analyzing digital text to determine if the emotional tone of the message is positive, negative, mixed, or neutral. For instance, sentiment analysis may be performed on social media to determine overall opinion on a particular trending topic. As another example, companies can utilize sentiment analysis to monitor brand reputation across large volumes of text data, e.g., emails, customer support chat transcripts, social media, reviews, etc.

Recently, the ML techniques have been proposed to perform sentiment analysis on the documents.

In one technique, the sentiment analysis is performed by a single-task model that includes a natural language processing (NLP) model, e.g., a language model, trained to recognize the natural language and a sentiment analysis model trained to perform a sentiment analysis by executing a selected sentiment analysis algorithm on the output provided by the NLP model. However, such sentiment analysis technique suffers from inaccuracies in sentiment recognition.

In another technique, to determine the sentiment more accurately, different single-task models for predicting a sentiment class are used. In this technique, each single-task model is used in a combination with a separate NLP model, where each single-task model is trained to perform a sentiment analysis by executing a different sentiment analysis algorithm. However, such use of the separate single-task models introduces latency on the computer networks. Further, such separate single-task models performing sentiment analysis on the same text occasionally output contradicting predictions.

In an example of the approach where two single-task models are used, one single-task model may be configured to perform a sentence-level sentiment analysis (SLSA) (e.g., per sentence sentiment analysis) and another single-task model may be configured to perform an aspect-based sentiment analysis (ABSA) (e.g., per aspect sentiment analysis).

If the SLSA and the ABSA are incorporated into a single model, the accuracy of the predictions might be reduced. This may be due at least because the SLSA works at the sentence level and is required to consider only a single sentence at a time without considering the context, while the ABSA uses context from previous and/or next sentences to detect the aspect. That is, the SLSA and ABSA tasks have conflicting implementation requirements with regard to the input data.

In order to overcome the above-noted problems and others, various embodiments are for building a multi-task model using context masking, where the built multi-task model can make predictions with high accuracy, e.g., using a combination of the SLSA task and the ABSA task in one model.

In the disclosed techniques, because the SLSA head and the ABSA head are incorporated into a single multi-task model, only one NLP model is used to provide input to both the SLSA head and the ABSA head, thereby decreasing latency and load on the computer networks.

The disclosed techniques provide the multi-task model that reduces the inference latency by approximately 50%, as compared to using two separate single-task models for the ABSA and the SLSA.

In the novel techniques described herein, the multi-task model can receive inputs from the same NLP model and use lightweight heads for performing each of the tasks, with each of the heads receiving different sets of the contextualized embeddings computed by the NLP model.

In the disclosed techniques, the built multi-task model uses selective context masking for the SLSA task. The context masking for the SLSA task increases the accuracy of the SLSA predictions, while the accuracy of the ABSA predictions is maintained or exceeded, as compared to the dedicated single-task models for the SLSA and the ABSA.

In embodiments, by combining the ABSA and SLSA analysis into a single model with context masking, the multi-task model may consider the previous and/or the next sentence context for the ABSA while only considering a current sentence context for the SLSA. Accordingly, the embeddings provided to the multi-task model for the SLSA are not mixed with the embeddings of the neighboring sentence(s), while the multi-task model can be provided with the embeddings of the neighboring sentence(s) that can be used for the ABSA.

Accordingly, in various embodiments, a computer-implemented method is provided that includes accessing a document including sentences, where a configuration flag, which is associated with the document, indicates whether aspect-based sentiment analysis, sentence-level sentiment analysis, or both are to be performed on the document; inputting the document into a language model; and generating, by the language model, chunks of token embeddings for the document, where each of the chunks includes a predefined total number of token embeddings including token embeddings from a main sentence and at least one of token embeddings from a sentence before the main sentence, token embeddings from a sentence after the main sentence, or a combination thereof, and, for each of the chunks, a number of the token embeddings from the sentence before the main sentence and a number of the token embeddings from the sentence after the main sentence are restricted to a predefined limit number of token embeddings.

When the configuration flag indicates the aspect-based sentiment analysis is to be performed, a first process is executed that includes performing, using a multi-task model, the aspect-based sentiment analysis on the document, where the aspect-based sentiment analysis is performed based on the token embeddings from the main sentence and the at least one of the token embeddings from the sentence before the main sentence, the token embeddings from the sentence after the main sentence, or the combination thereof in each chunk. When the configuration flag indicates the sentence-level sentiment analysis is to be performed, a second process is executed that includes masking, for each of the chunks, the at least one of the token embeddings from the sentence before the main sentence, the token embeddings from the sentence after the main sentence, or the combination thereof, and performing, using the multi-task model, the sentence-level sentiment analysis on each of the sentences in the document based on the token embeddings from the main sentence of each chunk associated with each of the sentences. When the configuration flag indicates both the aspect-based sentiment analysis and the sentence-level sentiment analysis are to be performed, both the first process and the second process are performed.

As described herein, a single multi-task model is built that can make predictions using both the ABSA and the SLSA with high levels of accuracy. The offering of a single multi-task model with improved accuracy results in efficient use of computational resources due to at least partially in decrease of the latency of the model.

The multi-task model of various embodiments can be implemented in chatbots that may perform accurately on sentiment analysis of utterances in various context.

A. Bot and Analytic Systems

A bot (also referred to as a skill, chatbot, chatterbot, or talkbot) is a computer program that can perform conversations with end users. The bot can respond to natural-language messages (e.g., questions or comments) through a messaging application that uses natural-language messages. Enterprises may use one or more bot systems to communicate with end users through a messaging application. The messaging application, which may be referred to as a channel, may be an end user preferred messaging application that the end user has already installed and familiar with. Thus, the end user does not need to download and install new applications in order to chat with the bot system. The messaging application may include, for example, over-the-top (OTT) messaging channels (such as Facebook Messenger, Facebook WhatsApp, WeChat, Line, Kik, Telegram, Talk, Skype, Slack, or SMS), virtual private assistants (such as Amazon Dot, Echo, or Show, Google Home, Apple HomePod, etc.), mobile and web app extensions that extend native or hybrid/responsive mobile applications or web applications with chat capabilities, or voice based input (such as devices or applications with interfaces that use Siri, Cortana, Google Voice, or other speech input for interaction).

In some examples, a bot system may be associated with a Uniform Resource Identifier (URI). The URI may identify the bot system using a string of characters. The URI may be used as a webhook for one or more messaging application systems. The URI may include, for example, a Uniform Resource Locator (URL) or a Uniform Resource Name (URN). The bot system may be designed to receive a message (e.g., a hypertext transfer protocol (HTTP) post call message) from a messaging application system. The HTTP post call message may be directed to the URI from the messaging application system. In some embodiments, the message may be different from a HTTP post call message. For example, the bot system may receive a message from a Short Message Service (SMS). While discussion herein may refer to communications that the bot system receives as a message, it should be understood that the message may be an HTTP post call message, a SMS message, or any other type of communication between two systems.

End users may interact with the bot system through a conversational interaction (sometimes referred to as a conversational user interface (UI)), just as interactions between people. In some cases, the interaction may include the end user saying "Hello" to the bot and the bot responding with a "Hi" and asking the end user how it can help. In some cases, the interaction may also be a transactional interaction with, for example, a banking bot, such as transferring money from one account to another; an informational interaction with, for example, a HR bot, such as checking for vacation balance; or an interaction with, for example, a retail bot, such as discussing returning purchased goods or seeking technical support.

In some embodiments, the bot system may intelligently handle end user interactions without interaction with an administrator or developer of the bot system. For example, an end user may send one or more messages to the bot system in order to achieve a desired goal. A message may include certain content, such as text, emojis, audio, image, video, or other method of conveying a message. In some embodiments, the bot system may convert the content into a standardized form (e.g., a representational state transfer (REST) call against enterprise services with the proper parameters) and generate a natural language response. The bot system may also prompt the end user for additional input parameters or request other additional information. In some embodiments, the bot system may also initiate communication with the end user, rather than passively responding to end user utterances. Described herein are various techniques for identifying an explicit invocation of a bot system and determining an input for the bot system being invoked. In certain embodiments, explicit invocation analysis is performed by a master bot based on detecting an invocation name in an utterance. In response to detection of the invocation name, the utterance may be refined for input to a skill bot associated with the invocation name.

A conversation with a bot may follow a specific conversation flow including multiple states. The flow may define what would happen next based on an input. In some embodiments, a state machine that includes user defined states (e.g., end user intents) and actions to take in the states or from state to state may be used to implement the bot system. A conversation may take different paths based on the end user input, which may impact the decision the bot makes for the flow. For example, at each state, based on the end user input or utterances, the bot may determine the end user's intent in order to determine the appropriate next action to take. As used herein and in the context of an utterance, the term "intent" refers to an intent of the user who provided the utterance. For example, the user may intend to engage a bot in conversation for ordering pizza, so that the user's intent could be represented through the utterance "Order pizza." A user intent can be directed to a particular task that the user wishes a chatbot to perform on behalf of the user. Therefore, utterances can be phrased as questions, commands, requests, and the like, that reflect the user's intent. An intent may include a goal that the end user would like to accomplish.

In the context of the configuration of a chatbot, the term "intent" is used herein to refer to configuration information for mapping a user's utterance to a specific task/action or category of task/action that the chatbot can perform. In order to distinguish between the intent of an utterance (i.e., a user intent) and the intent of a chatbot, the latter is sometimes referred to herein as a "bot intent." A bot intent may include a set of one or more utterances associated with the intent. For instance, an intent for ordering pizza can be communicated by various permutations of utterances that express a desire to place an order for pizza. These associated utterances can be used to train an intent classifier of the chatbot to enable the intent classifier to subsequently determine whether an input utterance from a user matches the order pizza intent. A bot intent may be associated with one or more dialog flows for starting a conversation with the user and in a certain state. For example, the first message for the order pizza intent could be the question "What kind of pizza would you like?" In addition to associated utterances, a bot intent may further include named entities that relate to the intent. For example, the order pizza intent could include variables or parameters used to perform the task of ordering pizza, e.g., topping 1, topping 2, pizza type, pizza size, pizza quantity, and the like. The value of an entity is typically obtained through conversing with the user.

FIG. 1 is a simplified block diagram of an environment 100 incorporating a chatbot system according to certain embodiments. Environment 100 includes a digital assistant builder platform (DABP) 102 that enables users of DABP 102 to create and deploy digital assistants or chatbot systems. DABP 102 can be used to create one or more digital assistants (or DAs) or chatbot systems. For example, as shown in FIG. 1, user 104 representing a particular enterprise can use DABP 102 to create and deploy a digital assistant 106 for users of the particular enterprise. For example, DABP 102 can be used by a bank to create one or more digital assistants for use by the bank's customers. The same DABP 102 platform can be used by multiple enterprises to create digital assistants. As another example, an owner of a restaurant (e.g., a pizza shop) may use DABP 102 to create and deploy a digital assistant that enables customers of the restaurant to order food (e.g., order pizza).

For purposes of this disclosure, a "digital assistant" is an entity that helps users of the digital assistant accomplish various tasks through natural language conversations. A digital assistant can be implemented using software only (e.g., the digital assistant is a digital entity implemented using programs, code, or instructions executable by one or more processors), using hardware, or using a combination of hardware and software. A digital assistant can be embodied or implemented in various physical systems or devices, such as in a computer, a mobile phone, a watch, an appliance, a vehicle, and the like. A digital assistant is also sometimes referred to as a chatbot system. Accordingly, for purposes of this disclosure, the terms digital assistant and chatbot system are interchangeable.

A digital assistant, such as digital assistant 106 built using DABP 102, can be used to perform various tasks via natural language-based conversations between the digital assistant and its users 108. As part of a conversation, a user may provide one or more user inputs 110 to digital assistant 106 and get responses 112 back from digital assistant 106. A conversation can include one or more of inputs 110 and responses 112. Via these conversations, a user can request one or more tasks to be performed by the digital assistant and, in response, the digital assistant is configured to perform the user-requested tasks and respond with appropriate responses to the user.

User inputs 110 can be in a natural language form and are referred to as utterances. A user utterance 110 can be in text form, such as when a user types in a sentence, a question, a text fragment, or even a single word and provides it as input to digital assistant 106. In some embodiments, a user utterance 110 can be in audio input or speech form, such as when a user says or speaks something that is provided as input to digital assistant 106. The utterances are typically in a language spoken by the user 108. For example, the utterances may be in English, or some other language. When an utterance is in speech form, the speech input is converted to text form utterances in that particular language and the text utterances are then processed by digital assistant 106. Various speech-to-text processing techniques may be used to convert a speech or audio input to a text utterance, which is then processed by digital assistant 106. In some embodiments, the speech-to-text conversion may be done by digital assistant 106 itself.

An utterance, which may be a text utterance or a speech utterance, can be a fragment, a sentence, multiple sentences, one or more words, one or more questions, combinations of the aforementioned types, and the like. Digital assistant 106 is configured to apply natural language understanding (NLU) techniques to the utterance to understand the meaning of the user input. As part of the NLU processing for an utterance, digital assistant 106 is configured to perform processing to understand the meaning of the utterance, which involves identifying one or more intents and one or more entities corresponding to the utterance. Upon understanding the meaning of an utterance, digital assistant 106 may perform one or more actions or operations responsive to the understood meaning or intents. In an embodiment, the utterances are text that has been provided directly by a user 108 of digital assistant 106 or are the results of conversion of input speech utterances to text form. This however is not intended to be limiting or restrictive in any manner.

For example, a user 108 input may request a pizza to be ordered by providing an utterance such as "I want to order a pizza." Upon receiving such an utterance, digital assistant 106 is configured to understand the meaning of the utterance and take appropriate actions. The appropriate actions may involve, for example, responding to the user with questions requesting user input on the type of pizza the user desires to order, the size of the pizza, any toppings for the pizza, and the like. The responses provided by digital assistant 106 may also be in natural language form and typically in the same language as the input utterance. As part of generating these responses, digital assistant 106 may perform natural language generation (NLG). For the user ordering a pizza, via the conversation between the user and digital assistant 106, the digital assistant may guide the user to provide all the requisite information for the pizza order, and then at the end of the conversation cause the pizza to be ordered. Digital assistant 106 may end the conversation by outputting information to the user indicating that the pizza has been ordered.

At a conceptual level, digital assistant 106 performs various processing in response to an utterance received from a user. In some embodiments, this processing involves a series or pipeline of processing steps including, for example, understanding the meaning of the input utterance (sometimes referred to as Natural Language Understanding (NLU), determining an action to be performed in response to the utterance, where appropriate causing the action to be performed, generating a response to be output to the user responsive to the user utterance, outputting the response to the user, and the like. The NLU processing can include parsing the received input utterance to understand the structure and meaning of the utterance, refining and reforming the utterance to develop a better understandable form (e.g., logical form) or structure for the utterance. Generating a response may include using NLG techniques.

The NLU processing performed by a digital assistant, such as digital assistant 106, can include various NLP related processing such as sentence parsing (e.g., tokenizing, lemmatizing, identifying part-of-speech tags for the sentence, identifying named entities in the sentence, generating dependency trees to represent the sentence structure, splitting a sentence into clauses, analyzing individual clauses, resolving anaphoras, performing chunking, and the like). In certain embodiments, the NLU processing or portions thereof is performed by digital assistant 106 itself. In some other embodiments, digital assistant 106 may use other resources to perform portions of the NLU processing. For example, the syntax and structure of an input utterance sentence may be identified by processing the sentence using a parser, a part-of-speech tagger, and/or a named entity recognizer. In one implementation, for the English language, a parser, a part-of-speech tagger, and a named entity recognizer such as ones provided by the Stanford Natural Language Processing (NLP) Group are used for analyzing the sentence structure and syntax. These are provided as part of the Stanford CoreNLP toolkit.

While the various examples provided in this disclosure show utterances in the English language, this is meant only as an example. In certain embodiments, digital assistant 106 is also capable of handling utterances in languages other than English. Digital assistant 106 may provide subsystems (e.g., components implementing NLU functionality) that are configured for performing processing for different languages. These subsystems may be implemented as pluggable units that can be called using service calls from an NLU core server. This makes the NLU processing flexible and extensible for each language, including allowing different orders of processing. A language pack may be provided for individual languages, where a language pack can register a list of subsystems that can be served from the NLU core server.

A digital assistant, such as digital assistant 106 depicted in FIG. 1, can be made available or accessible to its users 108 through a variety of different channels, such as but not limited to, via certain applications, via social media platforms, via various messaging services and applications, and other applications or channels. A single digital assistant can have several channels configured for it so that it can be run on and be accessed by different services simultaneously.

A digital assistant or chatbot system contains or is associated with one or more skills. In certain embodiments, these skills are individual chatbots (referred to as skill bots) that are configured to interact with users and fulfill specific types of tasks, such as tracking inventory, submitting timecards, creating expense reports, ordering food, checking a bank account, making reservations, buying a widget, and the like. For example, for the embodiment depicted in FIG. 1, digital assistant or chatbot system 106 includes skills 116-1, 116-2, and so on. For purposes of this disclosure, the terms "skill" and "skills" are used synonymously with the terms "skill bot" and "skill bots," respectively.

Each skill associated with a digital assistant helps a user of the digital assistant complete a task through a conversation with the user, where the conversation can include a combination of text or audio inputs provided by the user and responses provided by the skill bots. These responses may be in the form of text or audio messages to the user and/or using simple user interface elements (e.g., select lists) that are presented to the user for the user to make selections.

There are various ways in which a skill or skill bot can be associated or added to a digital assistant. In some instances, a skill bot can be developed by an enterprise and then added to a digital assistant using DABP 102. In other instances, a skill bot can be developed and created using DABP 102 and then added to a digital assistant created using DABP 102. In yet other instances, DABP 102 provides an online digital store (referred to as a "skills store") that offers multiple skills directed to a wide range of tasks. The skills offered through the skills store may also expose various cloud services. In order to add a skill to a digital assistant being generated using DABP 102, a user of DABP 102 can access the skills store via DABP 102, select a desired skill, and indicate that the selected skill is to be added to the digital assistant created using DABP 102. A skill from the skills store can be added to a digital assistant as is or in a modified form (for example, a user of DABP 102 may select and clone a particular skill bot provided by the skills store, make customizations or modifications to the selected skill bot, and then add the modified skill bot to a digital assistant created using DABP 102).

Various different architectures may be used to implement a digital assistant or chatbot system. For example, in certain embodiments, the digital assistants created and deployed using DABP 102 may be implemented using a master bot/child (or sub) bot paradigm or architecture. According to this paradigm, a digital assistant is implemented as a master bot that interacts with one or more child bots that are skill bots. For example, in the embodiment depicted in FIG. 1, digital assistant 106 includes a master bot 114 and skill bots 116-1, 116-2, etc. that are child bots of master bot 114. In certain embodiments, digital assistant 106 is itself considered to act as the master bot.

A digital assistant implemented according to the master-child bot architecture enables users of the digital assistant to interact with multiple skills through a unified user interface, namely via the master bot. When a user engages with a digital assistant, the user input is received by the master bot. The master bot then performs processing to determine the meaning of the user input utterance. The master bot then determines whether the task requested by the user in the utterance can be handled by the master bot itself, else the master bot selects an appropriate skill bot for handling the user request and routes the conversation to the selected skill bot. This enables a user to converse with the digital assistant through a common single interface and still provide the capability to use several skill bots configured to perform specific tasks. For example, for a digital assistance developed for an enterprise, the master bot of the digital assistant may interface with skill bots with specific functionalities, such as a customer relationship management (CRM) bot for performing functions related to CRM, an enterprise resource planning (ERP) bot for performing functions related to ERP, an human capital management (HCM) bot for performing functions related to HCM, etc. This way the end user or consumer of the digital assistant need only know how to access the digital assistant through the common master bot interface and behind the scenes multiple skill bots are provided for handling the user request.

In certain embodiments, in a master bot/child bots infrastructure, the master bot is configured to be aware of the available list of skill bots. The master bot may have access to metadata that identifies the various available skill bots, and for each skill bot, the capabilities of the skill bot including the tasks that can be performed by the skill bot. Upon receiving a user request in the form of an utterance, the master bot is configured to, from the multiple available skill bots, identify or predict a specific skill bot that can best serve or handle the user request. The master bot then routes the utterance (or a portion of the utterance) to that specific skill bot for further handling. Control thus flows from the master bot to the skill bots. The master bot can support multiple input and output channels. In certain embodiments, routing may be performed with the aid of processing performed by one or more available skill bots. For example, as discussed below, a skill bot can be trained to infer an intent for an utterance and to determine whether the inferred intent matches an intent with which the skill bot is configured. Thus, the routing performed by the master bot can involve the skill bot communicating to the master bot an indication of whether the skill bot has been configured with an intent suitable for handling the utterance.

While the embodiment in FIG. 1 shows digital assistant 106 including a master bot 114 and skill bots 116-1, 116-2, and 116-3, this is not intended to be limiting. A digital assistant can include various other components (e.g., other systems and subsystems) that provide the functionalities of the digital assistant. These systems and subsystems may be implemented only in software (e.g., code, instructions stored on a computer-readable medium and executable by one or more processors), in hardware only, or in implementations that use a combination of software and hardware.

DABP 102 provides an infrastructure and various services and features that enable a user of DABP 102 to create a digital assistant including one or more skill bots associated with the digital assistant. In some instances, a skill bot can be created by cloning an existing skill bot, for example, cloning a skill bot provided by the skills store. As previously indicated, DABP 102 provides a skills store or skills catalog that offers multiple skill bots for performing various tasks. A user of DABP 102 can clone a skill bot from the skills store. As needed, modifications or customizations may be made to the cloned skill bot. In some other instances, a user of DABP 102 created a skill bot from scratch using tools and services offered by DABP 102. As previously indicated, the skills store or skills catalog provided by DABP 102 may offer multiple skill bots for performing various tasks.

In certain embodiments, at a high level, creating or customizing a skill bot involves the following steps:
(1) Configuring settings for a new skill bot
(2) Configuring one or more intents for the skill bot
(3) Configuring one or more entities for one or more intents
(4) Training the skill bot
(5) Creating a dialog flow for the skill bot
(6) Adding custom components to the skill bot as needed
(7) Testing and deploying the skill bot Each of the above steps is briefly described below.
(1) Configuring settings for a new skill bot—Various settings may be configured for the skill bot. For example, a skill bot designer can specify one or more invocation names for the skill bot being created. These invocation names can then be used by users of a digital assistant to explicitly invoke the skill bot. For example, a user can input an invocation name in the user's utterance to explicitly invoke the corresponding skill bot.
(2) Configuring one or more intents and associated example utterances for the skill bot—The skill bot designer specifies one or more intents (also referred to as bot intents) for a skill bot being created. The skill bot is then trained based upon these specified intents. These intents represent categories or classes that the skill bot is trained to infer for input utterances. Upon receiving an utterance, a trained skill bot infers an intent for the utterance, where the inferred intent is selected from the predefined set of intents used to train the skill bot. The skill bot then takes an appropriate action responsive to an utterance based upon the intent inferred for that utterance. In some instances, the intents for a skill bot represent tasks that the skill bot can perform for users of the digital assistant. Each intent is given an intent identifier or intent name. For example, for a skill bot trained for a bank, the intents specified for the skill bot may include "CheckBalance," "TransferMoney," "DepositCheck," and the like.

For each intent defined for a skill bot, the skill bot designer may also provide one or more example utterances that are representative of and illustrate the intent. These example utterances are meant to represent utterances that a user may input to the skill bot for that intent. For example, for the CheckBalance intent, example utterances may include "What's my savings account balance?", "How much is in my checking account?", "How much money do I have in my account," and the like. Accordingly, various permutations of typical user utterances may be specified as example utterances for an intent.

The intents and their associated example utterances are used as training data to train the skill bot. Various different training techniques may be used. As a result of this training, a predictive model is generated that is configured to take an utterance as input and output an intent inferred for the utterance by the predictive model. In some instances, input utterances are provided to an intent analysis engine, which is configured to use the trained model to predict or infer an intent for the input utterance. The skill bot may then take one or more actions based upon the inferred intent.

(3) Configuring entities for one or more intents of the skill bot—In some instances, additional context may be needed to enable the skill bot to properly respond to a user utterance. For example, there may be situations where a user input utterance resolves to the same intent in a skill bot. For instance, in the above example, utterances "What's my savings account balance?" and "How much is in my checking account?" both resolve to the same CheckBalance intent, but these utterances are different requests asking for different things. To clarify such requests, one or more entities are added to an intent. Using the banking skill bot example, an entity called AccountType, which defines values called "checking" and "saving" may enable the skill bot to parse the user request and respond appropriately. In the above example, while the utterances resolve to the same intent, the value associated with the AccountType entity is different for the two utterances. This enables the skill bot to perform possibly different actions for the two utterances in spite of them resolving to the same intent. One or more entities can be specified for certain intents configured for the skill bot. Entities are thus used to add context to the intent itself. Entities help describe an intent more fully and enable the skill bot to complete a user request.

In certain embodiments, there are two types of entities: (a) built-in entities provided by DABP 102, and (2) custom entities that can be specified by a skill bot designer. Built-in entities are generic entities that can be used with a wide variety of bots. Examples of built-in entities include, without limitation, entities related to time, date, addresses, numbers, email addresses, duration, recurring time periods, currencies, phone numbers, URLs, and the like. Custom entities are used for more customized applications. For example, for a banking skill, an AccountType entity may be defined by the skill bot designer that enables various banking transactions by checking the user input for keywords like checking, savings, and credit cards, etc.

(4) Training the skill bot—A skill bot is configured to receive user input in the form of utterances parse or otherwise process the received input, and identify or select an intent that is relevant to the received user input. As indicated above, the skill bot has to be trained for this. In certain embodiments, a skill bot is trained based upon the intents configured for the skill bot and the example utterances associated with the intents (collectively, the training data), so that the skill bot can resolve user input utterances to one of its configured intents. In certain embodiments, the skill bot uses a predictive model that is trained using the training data and allows the skill bot to discern what users say (or in some cases, are trying to say). DABP 102 provides various different training techniques that can be used by a skill bot designer to train a skill bot, including various ML based training techniques, rules-based training techniques, and/or combinations thereof. In certain embodiments, a portion (e.g., 80%) of the training data is used to train a skill bot model and another portion (e.g., the remaining 20%) is used to test or verify the model. Once trained, the trained model (also sometimes referred to as the trained skill bot) can then be used to handle and respond to user utterances. In certain cases, a user's utterance may be a question that requires only a single answer and no further conversation. In order to handle such situations, a Q&A (question-and-answer) intent may be defined for a skill bot. This enables a skill bot to output replies to user requests without having to update the dialog definition. Q&A intents are created in a similar manner as regular intents. The dialog flow for Q&A intents can be different from that for regular intents.

(5) Creating a dialog flow for the skill bot—A dialog flow specified for a skill bot describes how the skill bot reacts as different intents for the skill bot are resolved responsive to received user input. The dialog flow defines operations or actions that a skill bot will take, e.g., how the skill bot responds to user utterances, how the skill bot prompts users for input, how the skill bot returns data. A dialog flow is like a flowchart that is followed by the skill bot. The skill bot designer specifies a dialog flow using a language, such as markdown language. In certain embodiments, a version of YAML called OBotML may be used to specify a dialog flow for a skill bot. The dialog flow definition for a skill bot acts as a model for the conversation itself, one that lets the skill bot designer choreograph the interactions between a skill bot and the users that the skill bot services.

In certain embodiments, the dialog flow definition for a skill bot contains three sections:

(a) a context section
(b) a default transitions section
(c) a states section

Context section—The skill bot designer can define variables that are used in a conversation flow in the context section. Other variables that may be named in the context section include, without limitation: variables for error handling, variables for built-in or custom entities, user variables that enable the skill bot to recognize and persist user preferences, and the like.

Default transitions section—Transitions for a skill bot can be defined in the dialog flow states section or in the default transitions section. The transitions defined in the default transition section act as a fallback and get triggered when there are no applicable transitions defined within a state, or the conditions required to trigger a state transition cannot be met. The default transitions section can be used to define routing that allows the skill bot to gracefully handle unexpected user actions.

States section—A dialog flow and its related operations are defined as a sequence of transitory states, which manage the logic within the dialog flow. Each state node within a dialog flow definition names a component that provides the functionality needed at that point in the dialog. States are thus built around the components. A state contains component-specific properties and defines the transitions to other states that get triggered after the component executes.

Special case scenarios may be handled using the states sections. For example, there might be times when you want to provide users the option to temporarily leave a first skill they are engaged with to do something in a second skill within the digital assistant. For example, if a user is engaged in a conversation with a shopping skill (e.g., the user has made some selections for purchase), the user may want to jump to a banking skill (e.g., the user may want to ensure that he/she has enough money for the purchase), and then return to the shopping skill to complete the user's order. To address this, an action in the first skill can be configured to initiate an interaction with the second different skill in the same digital assistant and then return to the original flow.

(6) Adding custom components to the skill bot—As described above, states specified in a dialog flow for a skill bot name components that provide the functionality needed corresponding to the states. Components enable a skill bot to perform functions. In certain embodiments, DABP 102 provides a set of preconfigured components for performing a wide range of functions. A skill bot designer can select one of more of these preconfigured components and associate them with states in the dialog flow for a skill bot. The skill bot designer can also create custom or new components using tools provided by DABP 102 and associate the custom components with one or more states in the dialog flow for a skill bot.

(7) Testing and deploying the skill bot—DABP 102 provides several features that enable the skill bot designer to test a skill bot being developed. The skill bot can then be deployed and included in a digital assistant.

While the description above describes how to create a skill bot, similar techniques may also be used to create a digital assistant (or the master bot). At the master bot or digital assistant level, built-in system intents may be configured for the digital assistant. These built-in system intents are used to identify general tasks that the digital assistant itself (i.e., the master bot) can handle without invoking a skill bot associated with the digital assistant. Examples of system intents defined for a master bot include: (1) Exit: applies when the user signals the desire to exit the current conversation or context in the digital assistant; (2) Help: applies when the user asks for help or orientation; and (3) UnresolvedIntent: applies to user input that doesn't match well with the exit and help intents. The digital assistant also stores information about the one or more skill bots associated with the digital assistant. This information enables the master bot to select a particular skill bot for handling an utterance.

At the master bot or digital assistant level, when a user inputs a phrase or utterance to the digital assistant, the digital assistant is configured to perform processing to determine how to route the utterance and the related conversation. The digital assistant determines this using a routing model, which can be rules-based, AI-based, or a combination thereof. The digital assistant uses the routing model to determine whether the conversation corresponding to the user input utterance is to be routed to a particular skill for handling, is to be handled by the digital assistant or master bot itself per a built-in system intent, or is to be handled as a different state in a current conversation flow.

In certain embodiments, as part of this processing, the digital assistant determines if the user input utterance explicitly identifies a skill bot using its invocation name. If an invocation name is present in the user input, then it is treated as explicit invocation of the skill bot corresponding to the invocation name. In such a scenario, the digital assistant may route the user input to the explicitly invoked skill bot for further handling. If there is no specific or explicit invocation, in certain embodiments, the digital assistant evaluates the received user input utterance and computes confidence scores for the system intents and the skill bots associated with the digital assistant. The score computed for a skill bot or system intent represents how likely the user input is representative of a task that the skill bot is configured to perform or is representative of a system intent. Any system intent or skill bot with an associated computed confidence score exceeding a threshold value (e.g., a Confidence Threshold routing parameter) is selected as a candidate for further evaluation. The digital assistant then selects, from the identified candidates, a particular system intent or a skill bot for further handling of the user input utterance. In certain embodiments, after one or more skill bots are identified as candidates, the intents associated with those candidate skills are evaluated (according to the intent model for each skill) and confidence scores are determined for each intent. In general, any intent that has a confidence score exceeding a threshold value (e.g., 70%) is treated as a candidate intent. If a particular skill bot is selected, then the user utterance is routed to that skill bot for further processing. If a system intent is selected, then one or more actions are performed by the master bot itself according to the selected system intent.

Figure 2:
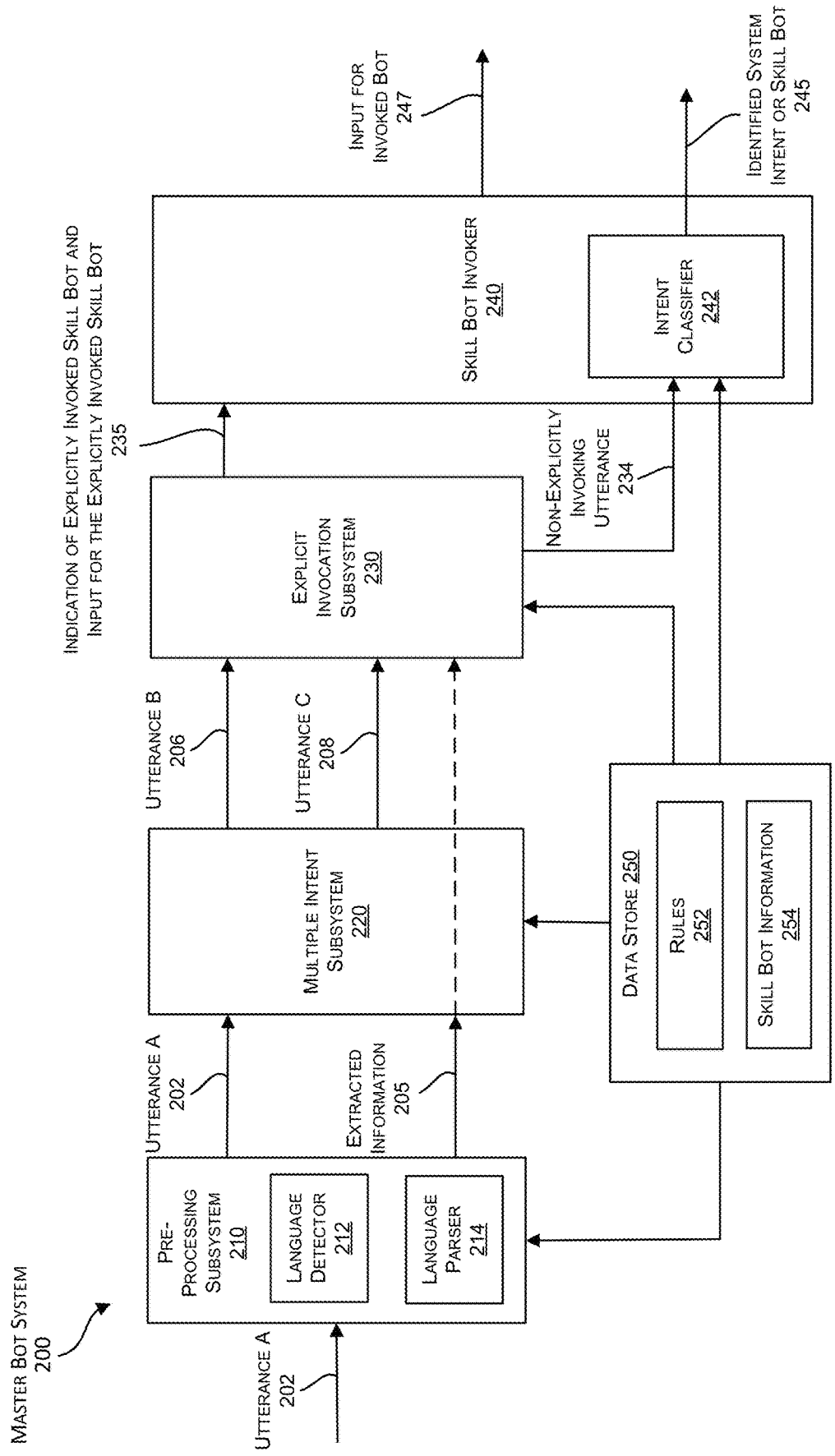
FIG. 2 is a simplified block diagram of a computing system implementing a master bot according to certain embodiments.

FIG. 2 is a simplified block diagram of a master bot (MB) system 200 according to certain embodiments. MB system 200 can be implemented in software only, hardware only, or a combination of hardware and software. MB system 200 includes a pre-processing subsystem 210, a multiple intent subsystem (MIS) 220, an explicit invocation subsystem (EIS) 230, a skill bot invoker 240, and a data store 250. MB system 200 depicted in FIG. 2 is merely an example of an arrangement of components in a master bot. One of ordinary skill in the art would recognize many possible variations, alternatives, and modifications. For example, in some implementations, MB system 200 may have more or fewer systems or components than those shown in FIG. 2, may combine two or more subsystems, or may have a different configuration or arrangement of subsystems.

Pre-processing subsystem 210 receives an utterance "A" 202 from a user and processes the utterance through a language detector 212 and a language parser 214. As indicated above, an utterance can be provided in various ways including audio or text. The utterance 202 can be a sentence fragment, a complete sentence, multiple sentences, and the like. Utterance 202 can include punctuation. For example, if the utterance 202 is provided as audio, the pre-processing subsystem 210 may convert the audio to text using a speech-to-text converter (not shown) that inserts punctuation marks into the resulting text, e.g., commas, semicolons, periods, etc.

Language detector 212 detects the language of the utterance 202 based on the text of the utterance 202. The manner in which the utterance 202 is handled depends on the language since each language has its own grammar and semantics. Differences between languages are taken into consideration when analyzing the syntax and structure of an utterance.

Language parser 214 parses the utterance 202 to extract part of speech (POS) tags for individual linguistic units (e.g., words) in the utterance 202. POS tags include, for example, noun (NN), pronoun (PN), verb (VB), and the like. Language parser 214 may also tokenize the linguistic units of the utterance 202 (e.g., to convert each word into a separate token) and lemmatize words. A lemma is the main form of a set of words as represented in a dictionary (e.g., "run" is the lemma for run, runs, ran, running, etc.). Other types of pre-processing that the language parser 214 can perform include chunking of compound expressions, e.g., combining "credit" and "card" into a single expression "credit card." Language parser 214 may also identify relationships between the words in the utterance 202. For example, in some embodiments, the language parser 214 generates a dependency tree that indicates which part of the utterance (e.g. a particular noun) is a direct object, which part of the utterance is a preposition, and so on. The results of the processing performed by the language parser 214 form extracted information 205 and are provided as input to MIS 220 together with the utterance 202 itself.

As indicated above, the utterance 202 can include more than one sentence. For purposes of detecting multiple intents and explicit invocation, the utterance 202 can be treated as a single unit even if it includes multiple sentences. However, in certain embodiments, pre-processing can be performed, e.g., by the pre-processing subsystem 210, to identify a single sentence among multiple sentences for multiple intents analysis and explicit invocation analysis. In general, the results produced by MIS 220 and EIS 230 are substantially the same regardless of whether the utterance 202 is processed at the level of an individual sentence or as a single unit including multiple sentences.

Figure 3:
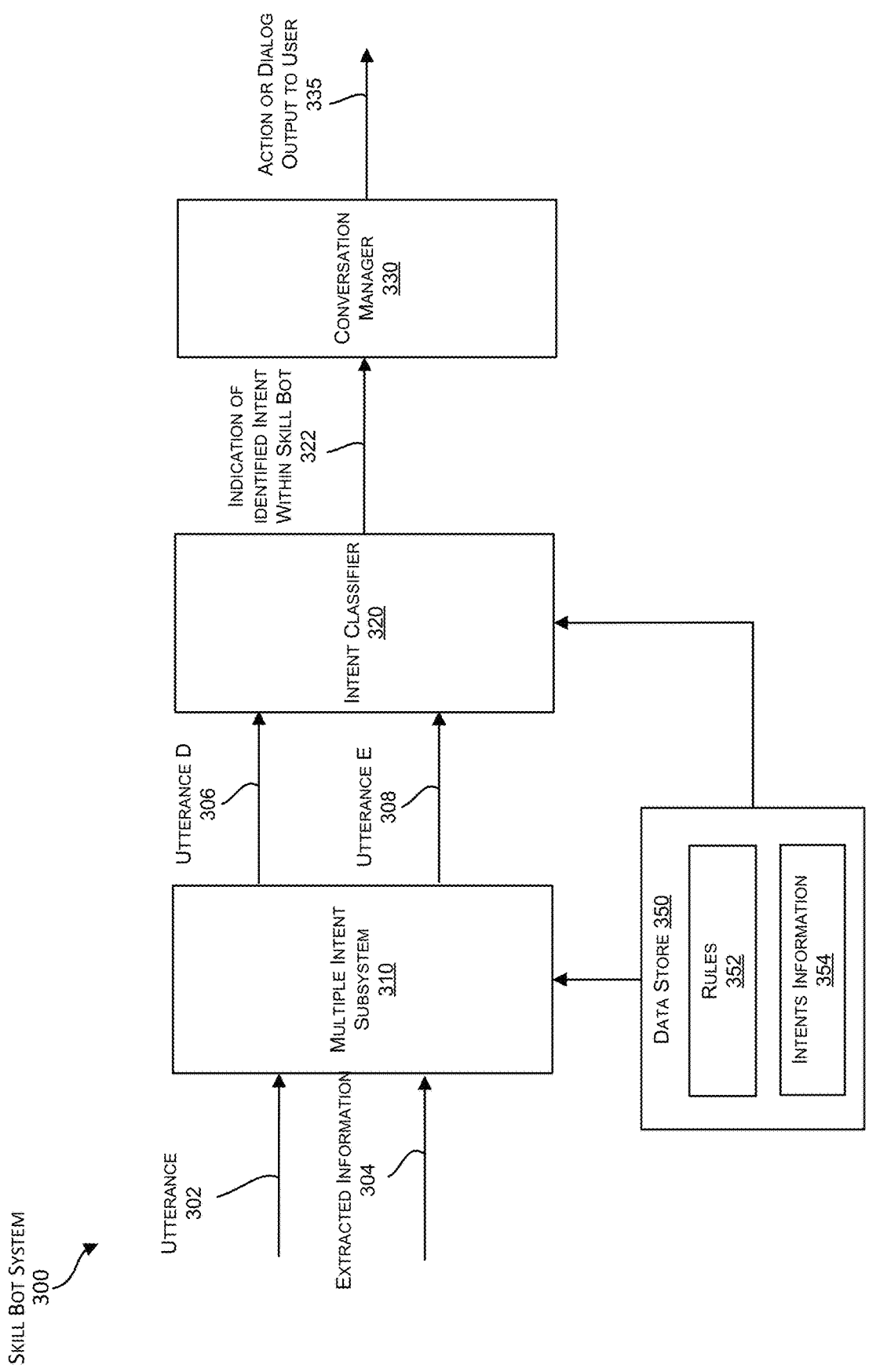
FIG. 3 is a simplified block diagram of a computing system implementing a skill bot according to certain embodiments.

MIS 220 determines whether the utterance 202 represents multiple intents. Although MIS 220 can detect the presence of multiple intents in the utterance 202, the processing performed by MIS 220 does not involve determining whether the intents of the utterance 202 match to any intents that have been configured for a bot. Instead, processing to determine whether an intent of the utterance 202 matches a bot intent can be performed by an intent classifier 242 of the MB system 200 or by an intent classifier of a skill bot (e.g., as shown in the embodiment of FIG. 3). The processing performed by MIS 220 assumes that there exists a bot (e.g., a particular skill bot or the master bot itself) that can handle the utterance 202. Therefore, the processing performed by MIS 220 does not require knowledge of what bots are in the chatbot system (e.g., the identities of skill bots registered with the master bot) or knowledge of what intents have been configured for a particular bot.

To determine that the utterance 202 includes multiple intents, the MIS 220 applies one or more rules from a set of rules 252 in the data store 250. The rules applied to the utterance 202 depend on the language of the utterance 202 and may include sentence patterns that indicate the presence of multiple intents. For example, a sentence pattern may include a coordinating conjunction that joins two parts (e.g., conjuncts) of a sentence, where both parts correspond to a separate intent. If the utterance 202 matches the sentence pattern, it can be inferred that the utterance 202 represents multiple intents. It should be noted that an utterance with multiple intents does not necessarily have different intents (e.g., intents directed to different bots or to different intents within the same bot). Instead, the utterance could have separate instances of the same intent, e.g. "Place a pizza order using payment account X, then place a pizza order using payment account Y."

As part of determining that the utterance 202 represents multiple intents, the MIS 220 also determines what portions of the utterance 202 are associated with each intent. MIS 220 constructs, for each intent represented in an utterance containing multiple intents, a new utterance for separate processing in place of the original utterance, e.g., an utterance "B" 206 and an utterance "C" 208, as depicted in FIG. 2. Thus, the original utterance 202 can be split into two or more separate utterances that are handled one at a time. MIS 220 determines, using the extracted information 205 and/or from analysis of the utterance 202 itself, which of the two or more utterances should be handled first. For example, MIS 220 may determine that the utterance 202 contains a marker word indicating that a particular intent should be handled first. The newly formed utterance corresponding to this particular intent (e.g., one of utterance 206 or utterance 208) will be the first to be sent for further processing by EIS 230. After a conversation triggered by the first utterance has ended (or has been temporarily suspended), the next highest priority utterance (e.g., the other one of utterance 206 or utterance 208) can then be sent to the EIS 230 for processing.

EIS 230 determines whether the utterance that it receives (e.g., utterance 206 or utterance 208) contains an invocation name of a skill bot. In certain embodiments, each skill bot in a chatbot system is assigned a unique invocation name that distinguishes the skill bot from other skill bots in the chatbot system. A list of invocation names can be maintained as part of skill bot information 254 in data store 250. An utterance is deemed to be an explicit invocation when the utterance contains a word match to an invocation name. If a bot is not explicitly invoked, then the utterance received by the EIS 230 is deemed a non-explicitly invoking utterance 234 and is input to an intent classifier (e.g., intent classifier 242) of the master bot to determine which bot to use for handling the utterance. In some instances, the intent classifier 242 will determine that the master bot should handle a non-explicitly invoking utterance. In other instances, the intent classifier 242 will determine a skill bot to route the utterance to for handling.

The explicit invocation functionality provided by the EIS 230 has several advantages. It can reduce the amount of processing that the master bot has to perform. For example, when there is an explicit invocation, the master bot may not have to do any intent classification analysis (e.g., using the intent classifier 242), or may have to do reduced intent classification analysis for selecting a skill bot. Thus, explicit invocation analysis may enable selection of a particular skill bot without resorting to intent classification analysis.

Also, there may be situations where there is an overlap in functionalities between multiple skill bots. This may happen, for example, if the intents handled by the two skill bots overlap or are very close to each other. In such a situation, it may be difficult for the master bot to identify which of the multiple skill bots to select based upon intent classification analysis alone. In such scenarios, the explicit invocation disambiguates the particular skill bot to be used.

In addition to determining that an utterance is an explicit invocation, the EIS 230 is responsible for determining whether any portion of the utterance should be used as input to the skill bot being explicitly invoked. In particular, EIS 230 can determine whether part of the utterance is not associated with the invocation. The EIS 230 can perform this determination through analysis of the utterance and/or analysis of the extracted information 205. EIS 230 can send the part of the utterance not associated with the invocation to the invoked skill bot in lieu of sending the entire utterance that was received by the EIS 230. In some instances, the input to the invoked skill bot is formed simply by removing any portion of the utterance associated with the invocation. For example, "I want to order pizza using Pizza Bot" can be shortened to "I want to order pizza" since "using Pizza Bot" is relevant to the invocation of the pizza bot, but irrelevant to any processing to be performed by the pizza bot. In some instances, EIS 230 may reformat the part to be sent to the invoked bot, e.g., to form a complete sentence. Thus, the EIS 230 determines not only that there is an explicit invocation, but also what to send to the skill bot when there is an explicit invocation. In some instances, there may not be any text to input to the bot being invoked. For example, if the utterance was "Pizza Bot", then the EIS 230 could determine that the pizza bot is being invoked, but there is no text to be processed by the pizza bot. In such scenarios, the EIS 230 may indicate to the skill bot invoker 240 that there is nothing to send.

Skill bot invoker 240 invokes a skill bot in various ways. For instance, skill bot invoker 240 can invoke a bot in response to receiving an indication 235 that a particular skill bot has been selected as a result of an explicit invocation. The indication 235 can be sent by the EIS 230 together with the input for the explicitly invoked skill bot. In this scenario, the skill bot invoker 240 will turn control of the conversation over to the explicitly invoked skill bot. The explicitly invoked skill bot will determine an appropriate response to the input from the EIS 230 by treating the input as a stand-alone utterance. For example, the response could be to perform a specific action or to start a new conversation in a particular state, where the initial state of the new conversation depends on the input sent from the EIS 230.

Another way in which skill bot invoker 240 can invoke a skill bot is through implicit invocation using the intent classifier 242. The intent classifier 242 can be trained, using ML and/or rules-based training techniques, to determine a likelihood that an utterance is representative of a task that a particular skill bot is configured to perform. The intent classifier 242 is trained on different classes, one class for each skill bot. For instance, whenever a new skill bot is registered with the master bot, a list of example utterances associated with the new skill bot can be used to train the intent classifier 242 to determine a likelihood that a particular utterance is representative of a task that the new skill bot can perform. The parameters produced as result of this training (e.g., a set of values for parameters of a ML model) can be stored as part of skill bot information 254.

In certain embodiments, the intent classifier 242 is implemented using a ML model, as described in further detail herein. Training of the ML model may involve inputting at least a subset of utterances from the example utterances associated with various skill bots to generate, as an output of the ML model, inferences as to which bot is the correct bot for handling any particular training utterance. For each training utterance, an indication of the correct bot to use for the training utterance may be provided as ground truth information. The behavior of the ML model can then be adapted (e.g., through back-propagation) to minimize the difference between the generated inferences and the ground truth information.

In certain embodiments, the intent classifier 242 determines, for each skill bot registered with the master bot, a confidence score indicating a likelihood that the skill bot can handle an utterance (e.g., the non-explicitly invoking utterance 234 received from EIS 230). The intent classifier 242 may also determine a confidence score for each system level intent (e.g., help, exit) that has been configured. If a particular confidence score meets one or more conditions, then the skill bot invoker 240 will invoke the bot associated with the particular confidence score. For example, a threshold confidence score value may need to be met. Thus, an output 245 of the intent classifier 242 is either an identification of a system intent or an identification of a particular skill bot. In some embodiments, in addition to meeting a threshold confidence score value, the confidence score must exceed the next highest confidence score by a certain win margin. Imposing such a condition would enable routing to a particular skill bot when the confidence scores of multiple skill bots each exceed the threshold confidence score value.

After identifying a bot based on evaluation of confidence scores, the skill bot invoker 240 hands over processing to the identified bot. In the case of a system intent, the identified bot is the master bot. Otherwise, the identified bot is a skill bot. Further, the skill bot invoker 240 will determine what to provide as input 247 for the identified bot. As indicated above, in the case of an explicit invocation, the input 247 can be based on a part of an utterance that is not associated with the invocation, or the input 247 can be nothing (e.g., an empty string). In the case of an implicit invocation, the input 247 can be the entire utterance.

Data store 250 includes one or more computing devices that store data used by the various subsystems of the master bot system 200. As explained above, the data store 250 includes rules 252 and skill bot information 254. The rules 252 include, for example, rules for determining, by MIS 220, when an utterance represents multiple intents and how to split an utterance that represents multiple intents. The rules 252 further include rules for determining, by EIS 230, which parts of an utterance that explicitly invokes a skill bot to send to the skill bot. The skill bot information 254 includes invocation names of skill bots in the chatbot system, e.g., a list of the invocation names of all skill bots registered with a particular master bot. The skill bot information 254 can also include information used by intent classifier 242 to determine a confidence score for each skill bot in the chatbot system, e.g., parameters of a ML model.

FIG. 3 is a simplified block diagram of a skill bot system 300 according to certain embodiments. Skill bot system 300 is a computing system that can be implemented in software only, hardware only, or a combination of hardware and software. In certain embodiments such as the embodiment depicted in FIG. 1, skill bot system 300 can be used to implement one or more skill bots within a digital assistant.

Skill bot system 300 includes an MIS 310, an intent classifier 320, and a conversation manager 330. The MIS 310 is analogous to the MIS 220 in FIG. 2 and provides similar functionality, including being operable to determine, using rules 352 in a data store 350: (1) whether an utterance represents multiple intents and, if so, (2) how to split the utterance into a separate utterance for each intent of the multiple intents. In certain embodiments, the rules applied by MIS 310 for detecting multiple intents and for splitting an utterance are the same as those applied by MIS 220. The MIS 310 receives an utterance 302 and extracted information 304. The extracted information 304 is analogous to the extracted information 205 in FIG. 1 and can be generated using the language parser 214 or a language parser local to the skill bot system 300.

Intent classifier 320 can be trained in a similar manner to the intent classifier 242 discussed above in connection with the embodiment of FIG. 2 and as described in further detail herein. For instance, in certain embodiments, the intent classifier 320 is implemented using a ML model. The ML model of the intent classifier 320 is trained for a particular skill bot, using at least a subset of example utterances associated with that particular skill bot as training utterances. The ground truth for each training utterance would be the particular bot intent associated with the training utterance.

The utterance 302 can be received directly from the user or supplied through a master bot. When the utterance 302 is supplied through a master bot, e.g., as a result of processing through MIS 220 and EIS 230 in the embodiment depicted in FIG. 2, the MIS 310 can be bypassed so as to avoid repeating processing already performed by MIS 220. However, if the utterance 302 is received directly from the user, e.g., during a conversation that occurs after routing to a skill bot, then MIS 310 can process the utterance 302 to determine whether the utterance 302 represents multiple intents. If so, then MIS 310 applies one or more rules to split the utterance 302 into a separate utterance for each intent, e.g., an utterance "D" 306 and an utterance "E" 308. If utterance 302 does not represent multiple intents, then MIS 310 forwards the utterance 302 to intent classifier 320 for intent classification and without splitting the utterance 302.

Intent classifier 320 is configured to match a received utterance (e.g., utterance 306 or 308) to an intent associated with skill bot system 300. As explained above, a skill bot can be configured with one or more intents, each intent including at least one example utterance that is associated with the intent and used for training a classifier. In the embodiment of FIG. 2, the intent classifier 242 of the master bot system 200 is trained to determine confidence scores for individual skill bots and confidence scores for system intents. Similarly, intent classifier 320 can be trained to determine a confidence score for each intent associated with the skill bot system 300. Whereas the classification performed by intent classifier 242 is at the bot level, the classification performed by intent classifier 320 is at the intent level and therefore finer grained. The intent classifier 320 has access to intents information 354. The intents information 354 includes, for each intent associated with the skill bot system 300, a list of utterances that are representative of and illustrate the meaning of the intent and are typically associated with a task performable by that intent. The intents information 354 can further include parameters produced as a result of training on this list of utterances.

Conversation manager 330 receives, as an output of intent classifier 320, an indication 322 of a particular intent, identified by the intent classifier 320, as best matching the utterance that was input to the intent classifier 320. In some instances, the intent classifier 320 is unable to determine any match. For example, the confidence scores computed by the intent classifier 320 could fall below a threshold confidence score value if the utterance is directed to a system intent or an intent of a different skill bot. When this occurs, the skill bot system 300 may refer the utterance to the master bot for handling, e.g., to route to a different skill bot. However, if the intent classifier 320 is successful in identifying an intent within the skill bot, then the conversation manager 330 will initiate a conversation with the user.

The conversation initiated by the conversation manager 330 is a conversation specific to the intent identified by the intent classifier 320. For instance, the conversation manager 330 may be implemented using a state machine configured to execute a dialog flow for the identified intent. The state machine can include a default starting state (e.g., for when the intent is invoked without any additional input) and one or more additional states, where each state has associated with it actions to be performed by the skill bot (e.g., executing a purchase transaction) and/or dialog (e.g., questions, responses) to be presented to the user. Thus, the conversation manager 330 can determine an action/dialog 335 upon receiving the indication 322 identifying the intent, and can determine additional actions or dialog in response to subsequent utterances received during the conversation.

Data store 350 includes one or more computing devices that store data used by the various subsystems of the skill bot system 300. As depicted in FIG. 3, the data store 350 includes the rules 352 and the intents information 354. In certain embodiments, data store 350 can be integrated into a data store of a master bot or digital assistant, e.g., the data store 250 in FIG. 2.

B. Prediction Model(s)

Figure 4:
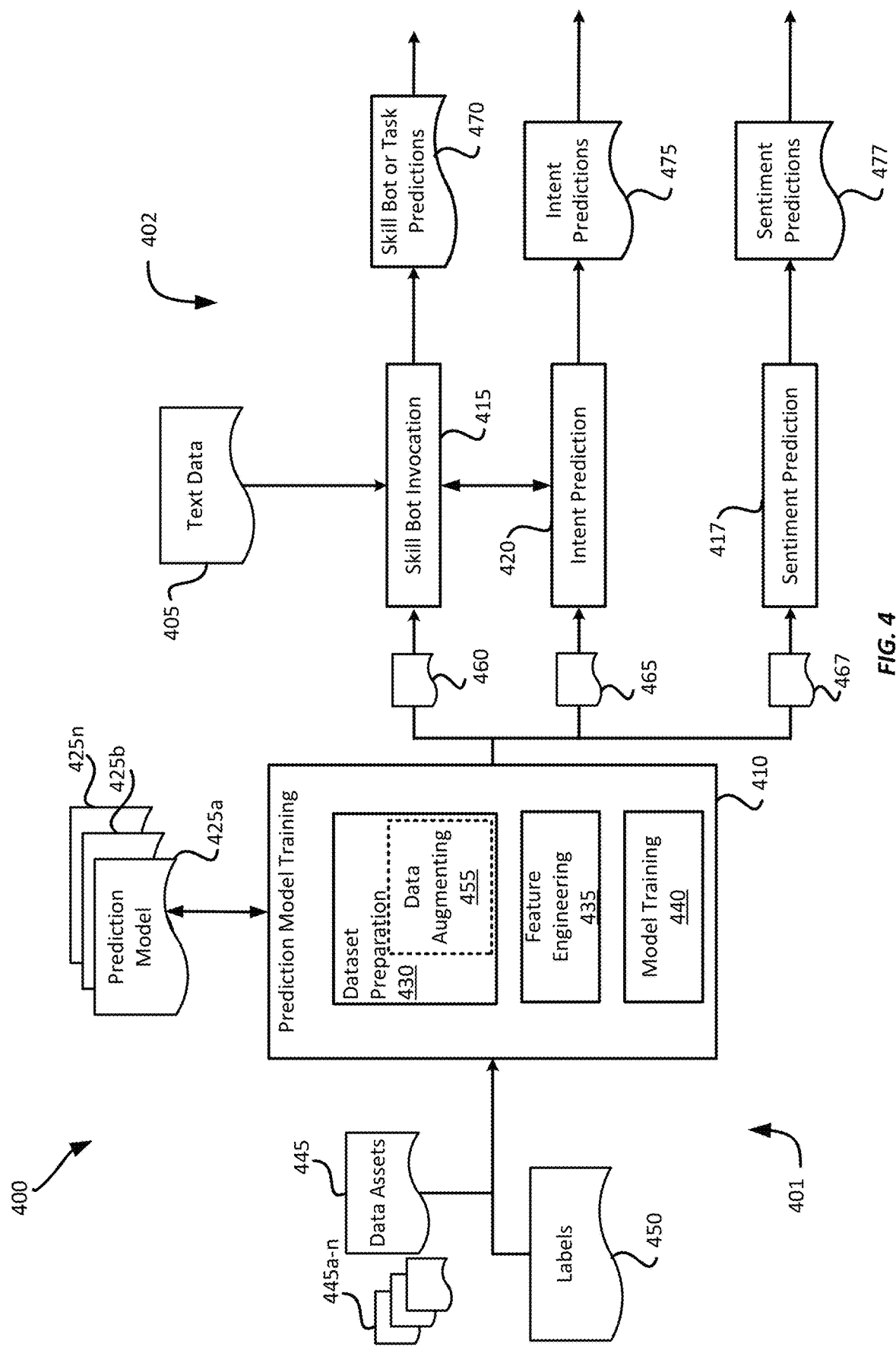
FIG. 4 is a simplified block diagram of a chatbot training and deployment system in accordance with various embodiments.

FIG. 4 shows a block diagram illustrating aspects of a system 400 according to at least one embodiment. As an example, the system 400 may be used in training models and utilizing the trained models in a chatbot system. For example, the system 400 may include a prediction model training stage 401 and an implementation (e.g., deployment) stage 402.

In certain implementations, the system 400 is configured to train and utilize classifiers based on text data 405. As shown in FIG. 4, the text classification performed by the system 400 in this example includes various stages: a prediction model training stage 410, a skill bot invocation stage 415 to determine a likelihood that an utterance (e.g., text) is representative of a task that a particular skill bot is configured to perform, a sentiment prediction stage 417 for classifying utterances (e.g., text) into sentiments, and an intent prediction stage 420 for classifying utterances (e.g., text) as one or more intents. The prediction model training stage 410 builds and trains one or more prediction models 425a-425n ('n' represents any natural number) to be used by the other stages. Herein, the prediction models 425a-425n may be referred to the prediction model 425 or the prediction models 425, for simplicity.

For example, the prediction models 425 can include a model for determining a likelihood that an utterance is representative of a task that a particular skill bot is configured to perform, another model for predicting a sentiment from an utterance, another model for predicting an intent from an utterance for a first type of skill bot, and another model for predicting an intent from an utterance for a second type of skill bot. Still other types of prediction models may be implemented in other examples according to this disclosure.

A prediction model 425 can be an ML model. As used herein, a "machine learning model," "ML model," or a "model" can refer to a software module configured to be run on one or more processors to provide a classification or numerical value of a property of one or more samples. An example type of model is supervised learning that can be used with embodiments of the present disclosure. Example supervised learning models may include different approaches and algorithms including analytical learning, artificial neural network, backpropagation, boosting (meta-algorithm), Bayesian statistics, case-based reasoning, decision tree learning, inductive logic programming, Gaussian process regression, genetic programming, group method of data handling, kernel estimators, learning automata, learning classifier systems, minimum message length (decision trees, decision graphs, etc.), multilinear subspace learning, naive Bayes classifier, maximum entropy classifier, conditional random field, nearest neighbor algorithm, probably approximately correct learning (PAC) learning, ripple down rules, a knowledge acquisition methodology, symbolic machine learning algorithms, subsymbolic machine learning algorithms, minimum complexity machines (MCM), random forests, ensembles of classifiers, ordinal classification, statistical relational learning, or Proaftn, a multicriteria classification algorithm.

The model may include linear regression, logistic regression, deep recurrent neural network (e.g., long short term memory, LSTM), hidden Markov model (HMM), linear discriminant analysis (LDA), k-means clustering, density-based spatial clustering of applications with noise (DBSCAN), random forest algorithm, support vector machine (SVM), or any model described herein. Supervised learning models can be trained in various ways using various cost/ loss functions that define the error from the known label (e.g., least squares and absolute difference from known classification) and various optimization techniques, e.g., using backpropagation, steepest descent, conjugate gradient, and Newton and quasi-Newton techniques.

In some embodiments, the ML models could include, but not limited to, convolutional neural network (CNN), linear regression, logistic regression, deep recurrent neural network (e.g., fully-connected recurrent neural network (RNN), Gated Recurrent Unit (GRU), long short-term memory, (LSTM)), transformer-based methods (e.g. XLNet, BERT, XLM, RoBERTa), Bayes' classifier, hidden Markov model (HMM), linear discriminant analysis (LDA), k-means clustering, density-based spatial clustering of applications with noise (DBSCAN), random forest algorithm, adaptive boosting (AdaBoost), eXtreme Gradient Boosting (XGBoost), support vector machine (SVM), or a composite model including one or more models mentioned above.

Examples of the ML models further include a residual neural network (Resnet), variants of Deep Neural Networks ("DNN") (e.g., a multi-label n-binary DNN classifier or multi-class DNN classifier for single intent classification), a Naive Bayes Classifier, Linear Classifier, Support Vector Machine, Bagging Models such as Random Forest Model, Boosting Models, Shallow Neural Networks, or combinations of one or more of techniques—e.g., CNN-HMM or Multi-Scale CNN.

The system 400 may employ the same type of prediction model or different types of prediction models for determining a likelihood of a task that a particular skill bot is configured to perform, sentiment analysis and predicting a sentiment for an utterance, predicting an intent from an utterance for a first type of skill bot, and predicting an intent from an utterance for a second type of skill bot. Still other types of prediction models may be implemented in other examples according to this disclosure.

To train the various prediction models 425, the prediction model training stage 410 may include three components: dataset preparation 430, feature engineering 435, and model training 440. The dataset preparation 430 includes the process of loading data assets 445, splitting the data assets 445 into training and validation sets 445a-n so that the system can train and test the prediction models 425, and performing basic pre-processing. The data assets 445 may include at least a subset of utterances from example utterances associated with various skill bots. As indicated above, an utterance can be provided in various ways including audio or text. The utterance can be a sentence fragment, a complete sentence, multiple sentences, and the like. For example, if the utterance is provided as audio, the dataset preparation 430 may convert the audio to text using a speech-to-text converter (not shown) that inserts punctuation marks into the resulting text, e.g., commas, semicolons, periods, etc. In some instances, the example utterances are provided by a client or customer. In other instances, the example utterances are automatically generated from prior libraries of utterances (e.g., identifying utterances from a library that are specific to a skill that a chatbot is to learn). The data assets 445 for a prediction model 425 can include input text or audio (or input features of text or audio frames) and labels 450 corresponding to the input text or audio (or input features) as a matrix or table of values. For example, for each training utterance, an indication of the correct bot to use for the training utterance may be provided as ground truth information for labels 450. The behavior of the prediction model 425 can then be adapted (e.g., through back-propagation) to minimize the difference between the generated inferences and the ground truth information. Alternatively, a prediction model 425 may be trained for a particular skill bot, using at least a subset of example utterances associated with that particular skill bot as training utterances. The ground truth information for labels 450 for each training utterance may be a sentiment or a particular bot intent associated with the training utterance.

In some instances, additional augmentation may be applied to the data assets 445 (with augmentation). For example, Easy Data Augmentation (EDA) techniques may be used for boosting performance on text classification tasks. EDA includes four operations: synonym replacement, random insertion, random swap, and random deletion that prevent overfitting and helping train more robust models. The EDA operations in general: (i) obtain words from the original text, and (ii) incorporate the words within each data asset 445 relative to the original text. For example, synonym replacement operation includes randomly selecting n words from the original sentence (e.g., utterance) that are not stop words, and replacing each of these words with one of its synonyms chosen at random. The random insertion operation includes—n times—finding a random synonym of a random word in the original sentence that is not a stop word and inserting that synonym into a random position in the sentence. The random swap operation includes—n times— randomly choosing two words in the sentence and swapping their positions. The random deletion operation includes randomly removing each word in the sentence with probability p.

In various embodiments, the feature engineering 435 includes transforming the data assets 445 (with augmentation) into feature vectors and/or creating new features will be created using the data assets 445 (with augmentation). The feature vectors may include count vectors as features, TF-IDF vectors as features such as word level, n-gram level or character level, word embedding as features, text/NLP as features, topic models as features, or a combination thereof. Count vector is a matrix notation of the data assets 445 in which every row represents an utterance, every column represents a term from the utterance, and every cell represents the frequency count of a particular term in a utterance. TF-IDF score represents the relative importance of a term in the utterance. A word embedding is a form of representing words and utterances using a dense vector representation. The position of a word within the vector space is learned from text and is based on the words that surround the word when it is used. Text/NLP based features may include word count in the utterance, character count in the utterance, average word density, punctuation count, upper case count, title word count, frequency distribution of part of speech tags (e.g., nouns and verbs), or any combination thereof. Topic modelling is a technique to identify the groups of words (called a topic) from a collection of utterances that contains best information in the collection.

In various embodiments, the model training 440 includes training a classifier using the feature vectors and/or new features created in the feature engineering 435. In some instances, the training process includes iterative operations to find a set of parameters for the prediction model 425 that minimizes a loss or error function for the prediction models 425. Each iteration can involve finding a set of parameters for the prediction model 425 so that the value of the cost function such as loss or error function using the set of parameters is smaller or larger than the value of the cost function using another set of parameters in a previous iteration. The cost function can be constructed to measure the difference between the outputs predicted using the prediction models 425 and the labels 450 contained in the data assets 445. Once the set of parameters are identified, the prediction model 425 has been trained and can be utilized for prediction as designed.

In addition to the data assets 445, labels 450, the feature vectors and/or new features, other techniques and information can also be employed to refine the training process of the prediction models 425. For example, the feature vectors and/or new features may be combined together to help to improve the accuracy of the classifier or model. Additionally or alternatively, the hyperparameters may be tuned or optimized, for example, a number of parameters such as tree length, leaves, network parameters etc. can be fine-tuned to get a best fit model. Although the training mechanisms described herein mainly focus on training a prediction model 425, these training mechanisms can also be utilized to fine tune existing prediction models 425 trained from other data assets. For example, in some cases, a prediction model 425 might have been pre-trained using utterance specific to another skill bot. In those cases, the prediction models 425 can be retrained using the data assets 445 (with augmentation) as discussed herein.

The prediction model training stage 410 outputs trained prediction models 425 including one or more task prediction models 460, one or more intent prediction models 465, and/or one or more sentiment prediction models 467 to be used in the implementation (e.g., deployment) stage 402.

For example, the task prediction models 460 may be used in the skill bot invocation stage 415 to determine a likelihood that an utterance is representative of a task that a particular skill bot 470 is configured to perform, the intent prediction models 465 may be used in the intent prediction stage 420 for classifying utterances as one or more intents 475, and the sentiment prediction models 467 may be used in the sentiment prediction stage 417 for classifying utterances with a sentiment 477. In some instances, the skill bot invocation stage 415 and the intent prediction stage 420 may proceed independently in some examples with separate models. For example, trained intent prediction models 465 may be used in the intent prediction stage 420 to predict intents for skill bots without first identifying the skill bots in the skill bot invocation stage 415. Similarly, the task prediction models 460 may be used in the skill bot invocation stage 415 to predict tasks or skill bots to be used for utterances without identifying the intent of the utterances in the intent prediction stage 420. Similarly, the sentiment prediction models 467 may be used in the sentiment prediction stage 417 to predict sentiment 477 of utterances without identifying the intent of the utterances in the intent prediction stage 420 and/or without first identifying the skill bots in the skill bot invocation stage 415.

Alternatively, the skill bot invocation stage 415, the sentiment prediction stage 417, and the intent prediction stage 420 may be conducted sequentially with one stage using the outputs of the other as inputs or one stage being invokes in a particular manner for a specific skill bot based on the outputs of the other. For instance, for a given text data 405, a skill bot invoker can invoke a skill bot through implicit invocation using the skill bot invocation stage 415 and the task prediction models 460. The task prediction models 460 can be trained, using ML and/or rules-based training techniques, to determine a likelihood that an utterance is representative of a task that a particular skill bot 470 is configured to perform. Then for an identified or invoked skill bot and a given text data 405, the sentiment prediction stage 417 and sentiment prediction models 467 can be used to classify the sentiment of an utterance (e.g., utterance within given data asset 445). Then for an identified or invoked skill bot and a given text data 405, the intent prediction stage 420 and intent prediction models 465 can be used to match a received utterance (e.g., utterance within given data asset 445) to an intent 475 associated with skill bot. As explained herein, a skill bot can be configured with one or more intents, each intent including at least one example utterance that is associated with the intent and used for training a classifier. In some embodiments, the skill bot invocation stage 415 and the task prediction models 460 used in the master bot system are trained to determine confidence scores for individual skill bots and confidence scores for system intents. Similarly, the intent prediction stage 420 and intent prediction models 465 can be trained to determine a confidence score for each intent associated with the skill bot system. Whereas the classification performed by the skill bot invocation stage 415 and the task prediction models 460 is at the bot level, the classification performed by the intent prediction stage 420 and intent prediction models 465 is at the intent level and therefore finer grained.

The embodiments described above with reference to FIG. 4 are equally applicable to embodiments described below with reference to FIGS. 5A-5C, 7A, and 7B.

II. MULTI-TASK MODEL TRAINING SYSTEM

The techniques disclosed herein create a multi-task model that can accurately predict the sentiment of an input text sequence. In some embodiments, the multi-task model can perform sentiment analysis using an aspect-based sentiment analysis (ABSA) and a sentence-level sentiment analysis (SLSA).

As described in detail below, embodiments can use contextual embeddings provided by a natural language processing model and use the contextual embeddings to train a first head configured to perform the ABSA and a second head configured to perform the SLSA to generate a single multi-task model capable of predicting sentiment using different techniques, e.g., predicting an aspect and a sentiment for the aspect using the ABSA and predicting a sentiment per sentence using the SLSA.

For the ABSA, the task is to locate aspects (e.g., features) in an input document and determine the sentiments expressed toward the aspects through sequence labeling. An aspect can include any term, phrase, entity, etc. that has sentiment expressed toward it excluding pronouns such as he, she, it, etc. In the ABSA, one or more of the previous sentences and one or more of the following sentences, e.g., the sentences neighboring the main sentence, may be considered in addition to the main sentence. As an example, the aspect may be located in a first sentence "I bought coffee from this store," while the sentiment can be expressed in a second sentence "It was terrible." The ABSA analyzes both sentences, detects an aspect "coffee," and determines that the sentiment for the coffee is "negative," based on the word "terrible."

The ABSA may predict sentiments from four classes: positive, negative, neutral, and mixed, as shown in Table 1 below. The bold words in the column "Examples" indicate the aspect or a feature with respect to which the sentiment is determined.

TABLE 1

(ABSA):

| Sentiment | Definition | Examples |
|---|---|---|
| Positive | The expressed sentiment is clearly positive. | The store is awesome! |
| Negative | The expressed sentiment is clearly negative. | The service was terrible. |
| Mixed | Both positive and negative sentiments are expressed toward an aspect. | The pizza was a bit salty for me but it was really good. |
| Neutral | The expressed sentiment is neutral. (Sentiment should still be expressed. If no sentiment is expressed, the class cannot be equal to neutral). | The interface is so so. |

For the SLSA, the task is to predict the sentiments of an individual sentence in an input document through sentiment classification, by analyzing that sentence. If the input document is a combination of a plurality of sentences, the input document is split into separate sentences, the SLSA analyzes each sentence, and outputs a prediction for each individual sentence. Similarly to the ABSA, the SLSA may predict sentiments from four classes: positive, negative, neutral, and mixed, as shown in Table 2 below.

TABLE 2

(SLSA):

| Sentiment | Definition | Examples |
|---|---|---|
| Positive | All or some aspects of the text express a positive opinion, attitude or mood. There is no aspect that is negative. | I love this new phone. |
| Negative | All or some aspects of the text express a negative opinion, attitude or mood. There is no aspect that is positive. | They'll have to improve their customer service if they want to attract more customers. |
| Mixed | Some aspects of the text express a positive opinion, attitude or mood, while other aspects express a negative opinion, attitude or mood. | The steak was great but the fries were cold. |
| Neutral | Either no opinion is expressed (the text is purely informative), or, when an opinion is expressed, it is neutral (neither positive nor negative). | I drop by this store occasionally on the way to work. |

Figure 5A:
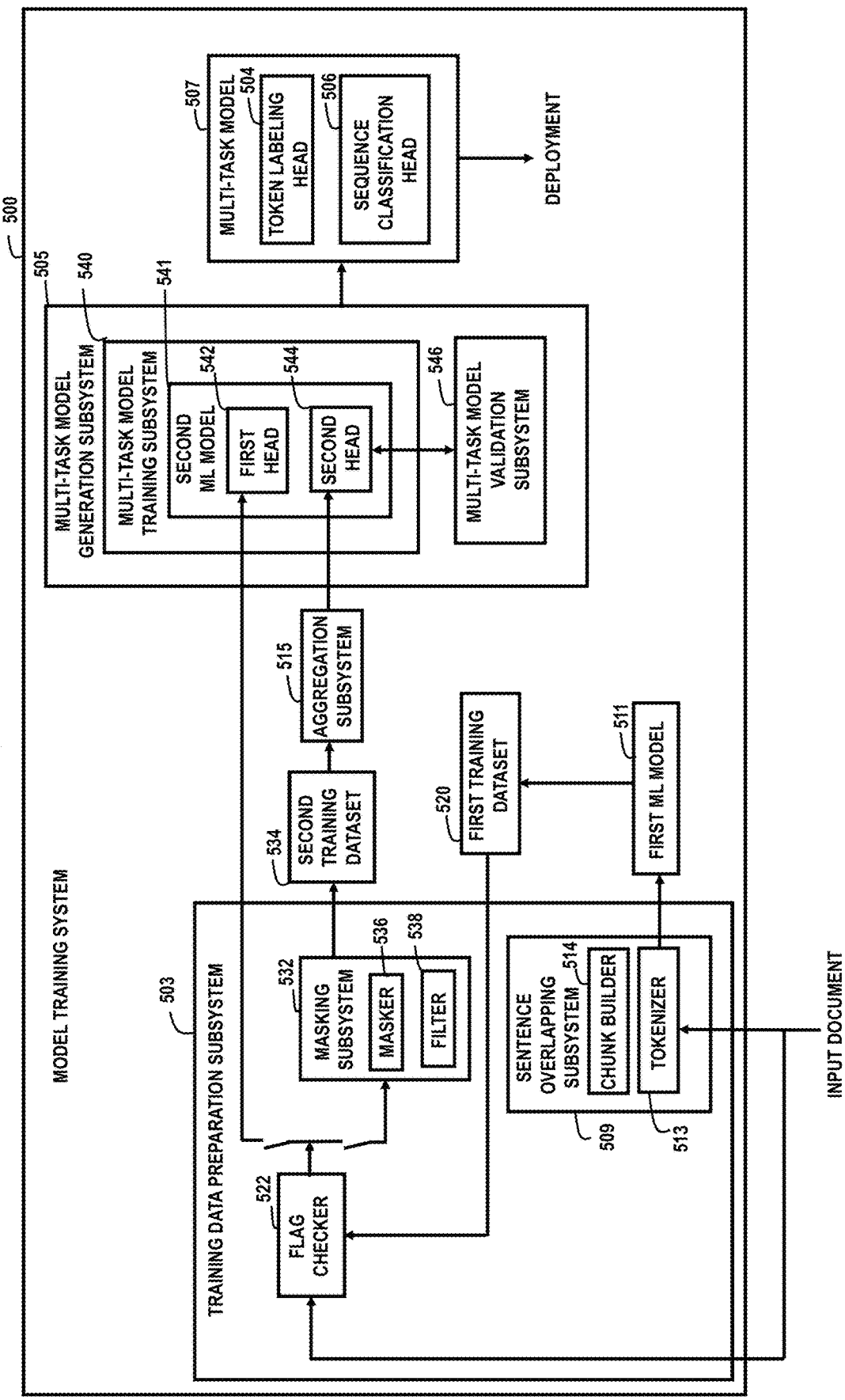
FIG. 5A is a simplified block diagram of a model training system according to various embodiments.

FIG. 5A is a simplified block diagram of a model training system 500 according to certain embodiments. The model training system 500 may be implemented using one or more computer systems, each computer system having one or more processors. The model training system 500 may include multiple components and subsystems communicatively coupled to each other via one or more communication mechanisms. For example, in the embodiment shown in FIG. 5A, the model training system 500 includes a training data preparation subsystem 503 and a multi-task model generation subsystem 505. These subsystems may be implemented as one or more computer systems. The systems, subsystems, and other components shown in FIG. 5A may be implemented in software (e.g., code, instructions, program) executed by one or more processing units (e.g., processors, cores) of the respective systems, using hardware, or combinations thereof. The software may be stored on a non-transitory storage medium (e.g., on a memory device). The model training system 500 shown in FIG. 5A is merely an example and is not intended to unduly limit the scope of embodiments. Many variations, alternatives, and modifications are possible. For example, in some implementations, the model training system 500 may have more or fewer subsystems or components than those shown in FIG. 5A may combine two or more subsystems, or may have a different configuration or arrangement of subsystems. The model training system 500 and subsystems shown in FIG. 5A may be implemented using one or more computer systems, such as the computer system shown in FIG. 12. In some implementations, at least some of the functionalities and operations of the model training system 500 may correspond to the prediction model training stage 401 of FIG. 4.

A. Training Data Preparation

In an embodiment, the training data preparation subsystem 503 may receive, e.g., obtain or access, one or more input documents. For purposes of this disclosure, an input document (or a document) may be a text document including a text-based document or a document image. The document image is an imaged-based document including pixels. A document image may be generated using an imaging device such as a scanner (e.g., by scanning a document) or a camera (e.g., by a camera capturing an image of a document), and the like. A document image is different from a text-based document, which is a document created using a text editor (e.g., Microsoft WORD, EXCEL) and in which the contents of the document, such as words, tables, etc., are preserved in the document and are easily extractable from the document. In contrast, in a document image, the words, tables, etc., are lost and not preserved—instead, a document image includes pixels and the contents of the document are embedded in the values of the pixels. Different file formats may be used to store documents images. Some examples include files with ".jpeg", ".gif", ".png", or ".tiff" file name extensions.

The training data preparation subsystem 503 may further receive configuration information associated with each input document, e.g., a configuration flag or a flag. The operations performed by the training data preparation subsystem 503 are described in detail below.

In embodiments, the model training system 500 may include a first machine learning (ML) model 511, e.g., a language model, that is configured to perform processing on the input document. The first ML model 511 may be a transformer-based model suitable to be used for the NLP tasks. For example, the first ML model 511 may be a BERT model that is pre-trained for a sentiment classification. However, this is not intended to be limiting and various machine learning models are described above. For example, the first ML model 511 may be Embeddings from Language Model (ELMo), Generative Pretrained Transformer 2 (GPT-2), GPT-3, etc.

Generally, the transformer-based language models cannot be applied to long sequences such as stories, scientific articles, and long documents due to their quadratic complexity. Accordingly, in certain embodiments, the training data preparation subsystem 503 may perform the long-text processing.

1. Long-Text Processing

In some embodiments, the training data preparation subsystem 503 may include a sentence overlapping subsystem 509. The sentence overlapping subsystem 509 is configured to receive, as an input, a document and perform certain processing on the document so that the document is broken into smaller portions of text, e.g., chunks, by using a long-text processing method described below.

In some embodiments, the sentence overlapping subsystem 509 may include a tokenizer 513. The tokenizer 513 may receive an input document and parse the input document into tokens, e.g., words.

The sentence overlapping subsystem 509 may further include a chunk builder 514. The chunk builder may receive tokens of each sentence and arrange the tokens of each sentence in one or more chunks. For example, the tokens of each sentence form a token group.

In embodiments, the chunk builder 514 may use a long-text processing method.

Figure 6A:
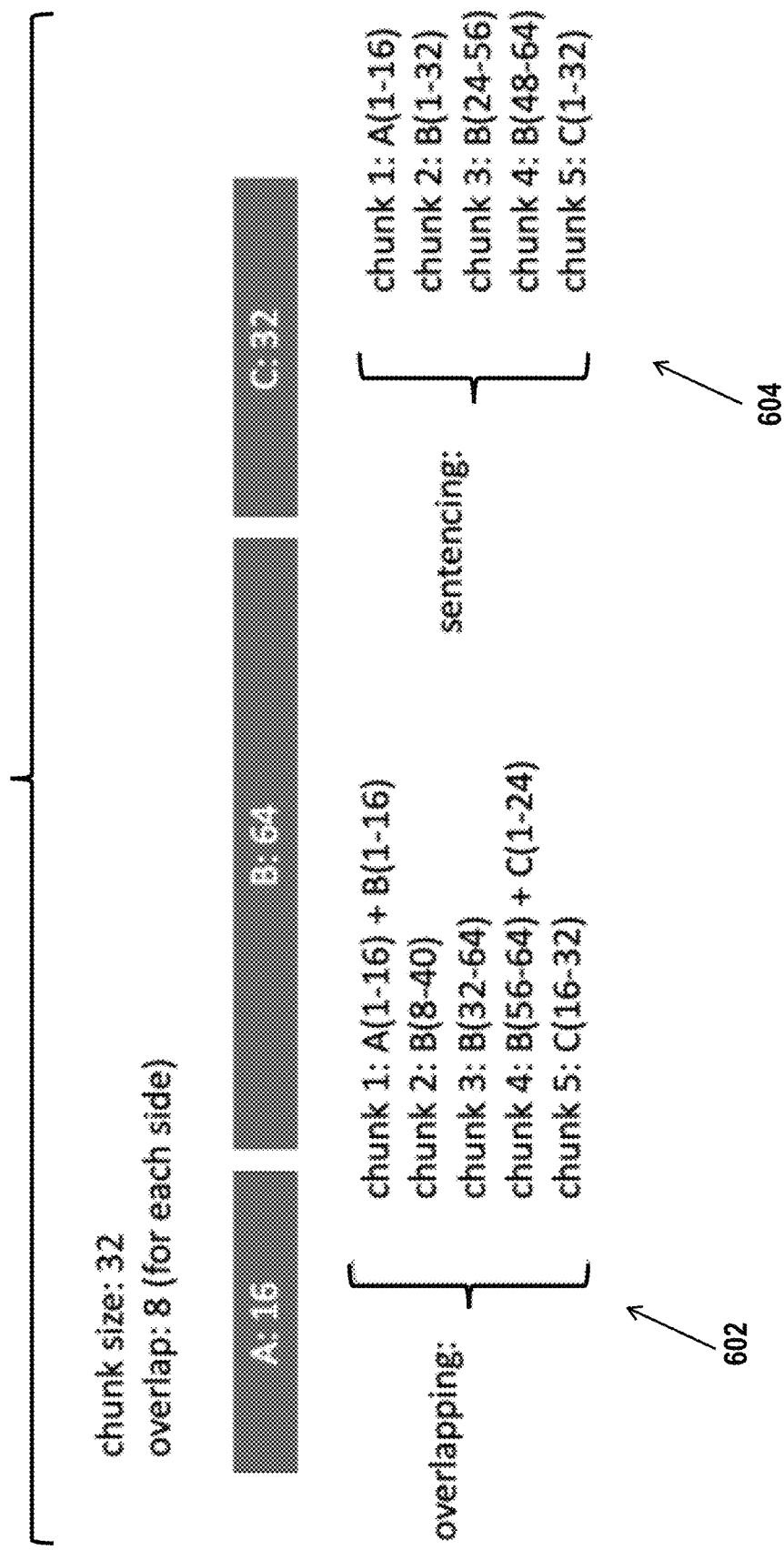
FIGS. 6A and 6B are simplified diagrams of long-text processing methods in accordance with various embodiments.
Figure 6B:
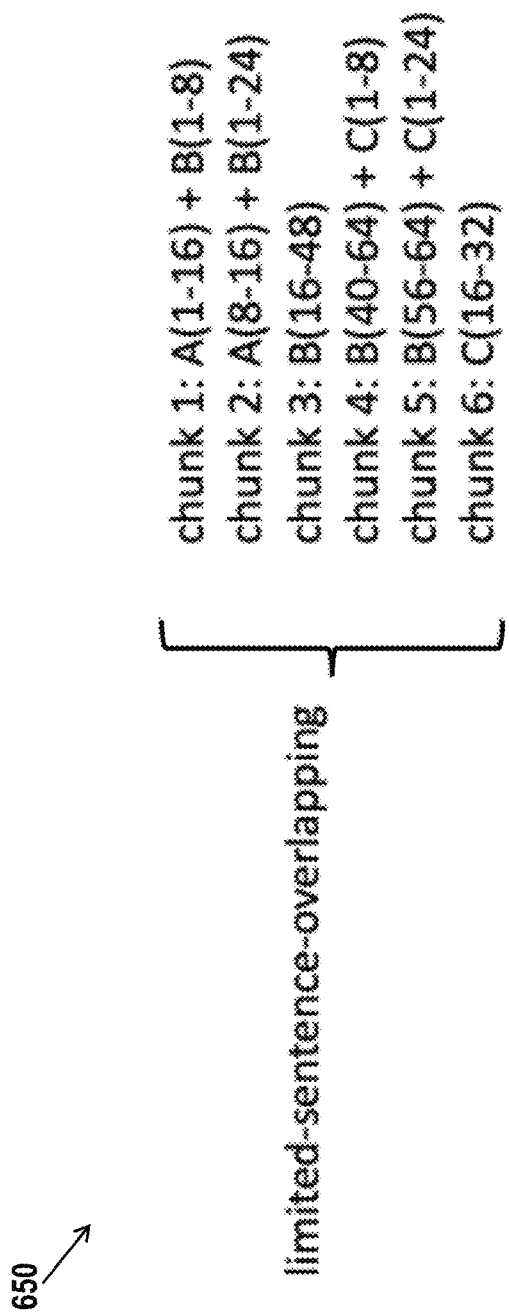

FIGS. 6A and 6B are simplified diagrams of long-text processing methods in accordance with various embodiments.

FIG. 6A shows a first long-text processing method 602 and a second long-text processing method 604. The first long-text processing method 602 is an example of the long-text processing with overlapping. The second long-text processing method 604 is an example of the long-text processing by sentences.

In an example of FIG. 6A, the tokenizer 513 may split the text sequence into a sentence A having 16 tokens (e.g., words), a sentence B having 64 tokens, and a sentence C having 32 tokens.

In some embodiments, the chunk builder 514 uses the first long-text processing method 602, to arrange the tokens of each sentence into chunks of a fixed size having overlapping tokens. The chunk size refers to how many tokens are included in each chunk and overlapping refers to the practice of allowing adjacent chunks to share some amount of data. The "chunk overlap" is the number of tokens that adjacent chunks have in common. In the first long-text processing method 602, the chunk overlap is 8 tokens for each of the adjacent chunks.

In a non-limiting example, the chunk size may be fixed, e.g., 32 tokens. The chunk builder 514 may apportion 16 tokens of the sentence A and first 16 tokens of the sentence B into chunk 1. In this example, because sentence A is 16 tokens and the chunk size is 32 tokens, the chunk builder 514 may apportion 16 tokens of the sentence B to the chunk 1. Further, the chunk builder 514 may apportion tokens 8 to 40 of the sentence B to the chunk 2. I.e., the chunk builder 514 creates an overlap of 8 tokens of the sentence B between the chunk 2 and the chunk 1. The similar methodology is followed for chunks 3, 4, and 5.

In some embodiments, the chunk builder 514 uses the second long-text processing method 604, to arrange the tokens of each sentence into chunks, where a chunk size is a variable size not greater than 32 tokens. Some of the chunks may have overlapping tokens, e.g., the neighboring tokens from the same sentence. For example, the chunk builder 514 may arrange all 16 tokens of the sentence A into chunk 1, first 32 tokens of the sentence B into chunk 2, and all 32 tokens of sentence C into chunk 5. As shown, the chunk builder 514 creates an overlap of 8 tokens for each of chunks 3 and 4. That is, in the second long-text processing method 604, the chunk overlap may be 8 tokens for each of the adjacent chunks within the sentence.

In various embodiments, the goal of the model training system 500 is to generate a multi-task model capable of predicting sentiments by using the ABSA and the SLSA. While the first long-text processing method 602, i.e., the long-text processing method with overlapping, can be used in the ABSA implementations, this method can cause inaccuracies in the SLSA implementations because the SLSA task is to analyze each sentence of the text individually. For example, the shorter sentences may be dominated by the tokens from their neighboring sentences, which is harmful for text classification because neighboring sentences dominate the shorter sentences.

Likewise, while the second long-text processing method 604, i.e., the long-text processing method by sentences, can be used in the SLSA implementations, this method can cause inaccuracies in the ABSA implementations because the ABSA task is to analyze the text for aspect and its associated sentiment, e.g., it is desirable to have context from one or more of adjacent sentences.

Accordingly, various embodiments use a novel long-text processing with a limited sentence overlapping where a chunk size is variable and some of the chunks of different sentences may have a limited overlap.

Referring to FIG. 6B, a third long-text processing method 650 is an example of the long-text processing with the limited sentence overlapping where some of the chunks of different sentences may have an overlap of 8 tokens. In the third long-text processing method 650, a number of tokens from one token group (e.g., a sentence that is not a "main" sentence) to be included in the chunk is controlled so that the tokens of this token group do not affect the analysis results. Implementing a limited overlap of tokens from different token groups, e.g., different sentences, helps to prevent a sentence to be dominated by another sentence.

For example, as depicted in FIG. 6B, the chunk builder 514 may apportion 16 tokens of the sentence A and first 8 tokens of the sentence B into the chunk 1; $8^{th}$ to $16^{th}$ tokens of the sentence A and first 24 tokens of the sentence B into the chunk 2; $16^{th}$ to $48^{th}$ tokens of the sentence B to the chunk 3; $40^{th}$ to $64^{th}$ tokens of the sentence B and first 8 tokens of the sentence C to the chunk 4; etc. That is, in the third long-text processing method 650, e.g., in the long-text processing with limited sentence overlapping, the chunk builder 514 apportions tokens from the token groups of the neighboring (e.g., adjacent) chunks so that the main sentence is not dominated by the neighboring sentences.

In the example of FIG. 6B, the main sentence of chunk 1 is the sentence A, the main sentence of chunks 2, 3, and 4 is the sentence B, and the main sentence of chunk 5 is the sentence C.

In some embodiments, the number of tokens from the main sentence can be limited by a maximum chunk size, while the number of tokens from neighboring sentences can be limited by the overlap size.

In certain implementations, after receiving the tokens from the tokenizer 513, the chunk builder 514 may form a plurality of chunks, where each of the plurality of chunks includes tokens from the adjacent sentences. For example, the chunk builder 514 may form a plurality of chunks, where each of the plurality of chunks includes tokens from a token group corresponding to a main sentence and tokens from one or more token groups corresponding to one or more neighboring sentences, as described above. The chunk builder 514 may include a limited amount of tokens from the token groups of the adjacent sentences, to form a plurality of chunk each including token strings with a limited token overlap, according to the third long-text processing method 650 of FIG. 6B. Each token string may include tokens from the main sentence and tokens from the neighboring sentence(s), where a number of tokens from the main sentence is greater than a number of tokens from the neighboring sentence.

The plurality of token strings may be then successively provided to the first ML model 511 for generating a first training dataset, as described in detail below. However, this is not intended to be limiting. In some implementations, the token strings may be provided to the first ML model 511 at least partially in parallel.

2. Training Datasets Generation

The first ML model 511 is configured to receive one or more token strings generated by the sentence overlapping subsystem 509 and generate contextualized embeddings for the token strings. The contextual embeddings assign each word, e.g., a token, a representation based on its context and position in the sentence. The contextual embeddings represent the sentences in the neural space, e.g., vector space. For example, using contextual embeddings, words that are close in meaning are grouped near one another in the vector space. For example, while representing a word such as a frog, the nearest neighbors of a frog in the vector space may be frogs, toad, and toads.

A collection of the contextualized embeddings output by the first ML model 511 forms a first training dataset 520. Herein, the contextualized embeddings corresponding to a token string may be referred to as a group of the contextualized embeddings.

In some embodiments, the training data preparation subsystem 503 may include a flag checker 522. The flag checker 522 may receive the flag that is associated with the input document and determine a value of the flag. The value of the flag may indicate to perform the sentiment analysis using the SLSA or the ABSA. In some implementations, the value of the flag may indicate to perform the sentiment analysis using both the ABSA and the SLSA.

In various embodiments, if the value of the flag indicates to perform the ABSA, the flag checker 522 passes the first training dataset 520 to a multi-task model generation subsystem 505. If the value of the flag indicates to perform the SLSA, the flag checker 522 passes the first training dataset 520 to a masking subsystem 532. Although in FIG. 5A the masking subsystem 532 is shown as a part of the training data preparation subsystem 503, this is not intended to be limiting. In some embodiments, the masking subsystem 532 may be a separate component.

The masking subsystem 532 performs certain processing on the first training dataset 520 that results in the generation of a second training dataset 534 that is then passed on to the multi-task model generation subsystem 505. The multi-task model generation subsystem 505 performs processing on the first training dataset 520 and/or the second training dataset 534 to generate the multi-task model 507.

In some embodiments, the masking subsystem 532 may include a masker 536. The masker 536 receives the contextualized embeddings included in the first training dataset 520. The contextualized embeddings correspond to the tokens of the token strings provided to the first ML model 511 by the sentence overlapping subsystem 509. The plurality of contextualized embeddings may be arranged in chunks of contextualized embeddings, each of the chunks of contextualized embeddings corresponding to the tokens of a particular token string.

Also, as described above, each token string may include tokens from one sentence or from a plurality of sentences. If the contextualized embeddings group corresponds to the token string that includes tokens from the plurality of sentences, the masker 536 masks the contextualized embeddings from a less significant sentence for a particular token string, by applying a masking value to the contextualized embeddings from the less significant sentence. The masking value may be any predefined value, e.g., "*", "0", etc. For example, the masker 536 masks the contextualized embeddings that correspond to the tokens, the number of which is smaller in a corresponding token string, so that a main sentence having a greater number of tokens in the token string is emphasized.

In some embodiments, the masking subsystem 532 may further include a filter 538. The filter 538 may receive the contextualized embeddings, where some of the contextualized embeddings, e.g., first contextualized embeddings, are masked, and some of the contextualized embeddings, e.g., second contextualized embeddings, are unmasked. The filter 538 may detect the first contextualized embeddings by identifying the masking values. The filter 538 may filter out the first contextualized embeddings and provide, to the multi-task model generation subsystem 505, the remaining contextualized embeddings, e.g., the second contextualized embeddings. The second contextualized embeddings may be referred herein as the second training dataset 534.

In some embodiments, the contextualized embeddings corresponding to the tokens of the main sentence may be included into two or more token strings, e.g., two or more chunks of the contextualized embeddings. Optionally, the model training system 500 may include an aggregation subsystem 515. The aggregation subsystem 515 may perform one of aggregation methods to generate a main string that includes the contextualized embeddings corresponding to the tokens of the main sentence. For example, in one of the aggregation methods, the contextualized embeddings corresponding to the tokens of the main sentence can be aggregated and the duplicates can be eliminated. The main string may be then provided to the second head 544.

Although in FIG. 5A the aggregation subsystem 515 is shown as a separate component, this is not intended to be limiting. In some embodiments, the aggregation subsystem 515 may be included in the multi-task model generation subsystem 505.

In certain embodiments, the flag may indicate to perform sentiment prediction by using both the SLSA and ABSA. In this case, both the first training dataset 520 and the second training dataset 534 may be provided to the multi-task model generation subsystem 505, sequentially, in parallel, or at least partially in parallel.

B. Multi-Task Model Generation

In certain implementations, the multi-task model generation subsystem 505 may include a multi-task model training subsystem 540. The multi-task model training subsystem 540 is configured to receive at least one from among the first training dataset 520 and the second training dataset 534 and perform model training using the first training dataset 520 and/or the second training dataset 534 to output one or more versions of the multi-task model.

As a part of the model training, the multi-task model training subsystem 540 is configured to receive an input from the first training dataset 520 and/or the second training dataset 534 and iteratively train a second ML model 541 using the first training dataset 520 and/or the second training dataset 534, to generate one or more multi-task model versions.

In various embodiments, the multi-task model training subsystem 540 may include a first head 542 and a second head 544. In comparison to the first ML model 511, the first head 542 and the second head 544 are lightweight heads, e.g., using fewer parameters than the first ML model 511.

In some embodiments, the architecture of the first head 542 is similar to the architecture of the named entity recognition (NER) model and may be for performing the ABSA.

The first head 542 is configured to receive an input from the first training dataset 520 and be trained using the first training dataset 520, to identify the aspect and a sentiment for that aspect. The first training dataset 520 includes training datapoints, each training datapoint including an input, e.g., one or more token string from the first training dataset 520, and a corresponding output corresponding to the input, and the output is a label for an aspect and a class identifying a sentiment class for that aspect.

For example, the first head 542 can identify one or more words or tokens in each training datapoint of the first training dataset 520 as named entities and classify the named entities into one or more named entity classes such as PERSON, ORGANIZATION, FOOD ITEM, etc. (the classifying includes tagging the named entities with the appropriate classification).

In embodiments, the first head 542 may predict a label for each input word, e.g., token. For example, in the phrase "the Italian cheese was amazing." The first head 542 output may be "O B-Pos I-Pos O O". The labels mean I-Pos=Intermediary Positive, B-Pos=Beginning Positive, and O=Ignored. Accordingly, the word "Italian" is the beginning for a positive aspect (i.e., B-Pos) and the word "cheese" is the intermediary positive (i.e., I-Pos). Then, a post-processing component can output the aspect "Italian cheese" as the positive class, e.g., a positive aspect, for the sentence. The post-processing component may be a part of the first head 542 or may be a component separate from the first head 542.

The second head 544 is configured to receive an input from the second training dataset 534 and be trained using the second training dataset 534, to identify a sentiment class in each sentence. The second training dataset 534 includes training datapoints, each training datapoint including an input, e.g., a token string, and a corresponding output corresponding to the input, where the output is a class label identifying a sentiment class.

For example, if the input to the second head 544 is "the food was good," the expected prediction of the sentiment class is "positive" for the sentence.

As a result of the iterative training performed on the first head 542 and the second head 544, the multi-task model training subsystem 540 generates one or more multi-task model versions.

In some implementations, the training datapoints included in each of the first training dataset 520 and the second training dataset 534 may be split into a first portion including first datapoints to be used for the training phase and a second portion including second datapoints or validation datapoints to be used for the validation phase. In embodiments, the first datapoints may be different from the second datapoints. However, this is not intended to be limiting, and the first datapoints may partially overlap the second datapoints. For example, in some embodiments, the second datapoints may be obtained by sampling the first training dataset 520 and the second training dataset 534, e.g., by sampling the training datapoints or training examples. In some implementations, the first datapoints may be of one set of input documents and the second datapoints may be of another set of input documents.

The multi-task model generation subsystem 505 may further include a multi-task model validation subsystem 546. The multi-task model training subsystem 540 may perform training using the first head 542, the second head 544, the first training dataset 520, and the second training dataset 534, and the multi-task model validation subsystem 546 may perform a validation of the result of the training performed by the multi-task model training subsystem 540 using the second datapoints based on validation criteria, such as a stopping criterion, of one or more multi-task model versions. When one of multi-task model versions satisfies the validation, that particular multi-task model version is output as the multi-task model 507, e.g., a final multi-task model.

Similarly to what is described above with reference to FIG. 4, the training process includes iterative operations to find a set of parameters for the second ML model 541 that minimizes a loss or error function for the second ML model 541. Each iteration can involve finding a set of parameters so that the value of the cost function such as loss or error function using the set of parameters is smaller or larger than the value of the cost function using another set of parameters in a previous iteration. The cost function can be constructed to measure the difference between the outputs predicted using the second ML model 541 and the labels contained in the first training dataset 520 and the second training dataset 534. Once the set of parameters is identified, the second ML model 541 is considered to be trained and can be deployed as the multi-task model 507.

The final multi-task model 507 may include a token labeling head 504 and a sequence classification head 506. The token labeling head 504 corresponds to the first head 542 that has been trained as described above. The sequence classification head 506 corresponds to the second head 544 that has been trained as described above.

In certain implementations, the token labeling head 504 and the sequence classification head 506 are configured by training the first head 542 and the second head 544, respectively, using an early stop training approach that includes: training the first head and the second head using token embeddings from a first set of documents (e.g., first datapoints), optimizing hyperparameters including weights associated with a first performance metric for the first head and a second performance metric for the second head, validating the first head and the second head using token embeddings from a second set of documents (e.g., second datapoints), evaluating performance of the first head and the second head based on the second set of documents using a combination of the first performance metric, the second performance metric, and associated weights, and stopping the training of the first head and the second head when the performance of the first head and the second head on the second set of documents begins to degrade as determined based on the evaluating.

The loss function and early stopping criterion are described below.

1. Multi-Task Model Training Loss

In some embodiments, the model parameters can be incrementally updated by minimizing a loss function over randomly sampled batches of training examples, e.g., the training datapoints. Each group of the ABSA or SLSA training examples is fetched to the first head 542 or second head 544 to compute the combination loss. As such, both ABSA and SLSA parameters and shared parameters are simultaneously updated in each optimization step, e.g., each iteration. In some embodiments, the disclosed techniques can use a weighted combination of ABSA and SLSA losses as the final loss.

$$\text{final\_loss} = w_{SLSA} \times \text{SLSA\_loss} + w_{ABSA} \times \text{ABSA\_loss}$$

where $w_{SLSA}$ and $w_{ABSA}$ can be set manually or using hyper-tuning. The SLSA cross-entropy loss of input texts x in SLSA training set $D_{SLSA}$:

$$\text{SLSA\_loss} = \sum_{x \in D_{SLSA}} XE_{SLSA}(\theta, x, c) = -\sum_i c_i \log[p_i(x, \theta)]$$

where
- $\theta$ is the model parameters to be learned,
- C is the correct sentiment label vector of text input x,
- i is the index over four possible sentiment classes. Only one $c_i=1$ if i is correct label sentiment for x while the others $c_i=0$.
- $p_i(x, \theta)$ is the model's SLSA prediction probability that x belongs to the sentiment i.

The ABSA cross-entropy loss of input texts of n words $x=(x_1, \ldots, x_n)$ with corresponding labels $y=(y_1, \ldots, y_n)$ in ABSA training set $D_{ABSA}$:

$$\text{ABSA\_loss} = \sum_{(x,y) \in D_{ABSA}} XE_{ABSA}(\theta, x, y) = -\sum_{j=1}^{n}\sum_i I(y_j = i)\log[q_i(x_j, \theta)]$$

where
- i is the index over all possible aspect sentiment label classes. The identity function $I(y_j=i)$ is 1 if i is the correct aspect sentiment label for the word $x_j$. Otherwise, it is zero. $q_i(x_j, \theta)$ is the model's ABSA prediction probability that the word $x_j$ belongs to the aspect sentiment label class i. A Conditional random fields (CRF) layer is used to estimate the probabilities of the sequence predictions.

CRFs are a class of statistical modeling methods used for structured prediction. For example, a classifier predicts a label for a single sample without considering "neighboring" samples, and a CRF can take context into account.

2. Multi-Task Model Training Early Stopping

In some embodiments, an early stopping technique to prevent from overfitting is implemented. The early stopping technique is provided such that one task in the model does not dominate over the other task(s). For the multi-task model implementing the ABSA and the SLSA, an embodiment implements a weighted combination of metrics from different tasks:

$$\alpha \times F1_{ABSA} + (1-\alpha) \times \text{Accuracy}_{SLSA} \qquad (4)$$

where:
- $F1_{ABSA}$ is the F1 score of the ABSA validation set,
- $\text{Accuracy}_{SLSA}$ is the accuracy score of the SLSA validation set,
- $\alpha$ is a hyper-parameter that can be tuned using the hyper-tuning system to identify the appropriate weighting between the two metrics.

The F1 score is a measure of the test's accuracy. F1 score is the harmonic mean calculated from the precision and recall of the test, where the precision is the number of true positive results divided by the number of all positive results, including those not identified correctly, and the recall is the number of true positive results divided by the number of all samples that should have been identified as positive.

The accuracy score is calculated by dividing the number of correct predictions by the total prediction number.

Accordingly, in an embodiment, the F1 score for the ABSA and the accuracy for the SLSA are used, instead of using a same metric for both tasks, and combined as a weighted average. The hyper-tuner is used to find the proper weight for each of the F1 score for the ABSA and the accuracy for the SLSA.

III. SENTIMENT ANALYSIS SYSTEM(S)

Figure 5B:
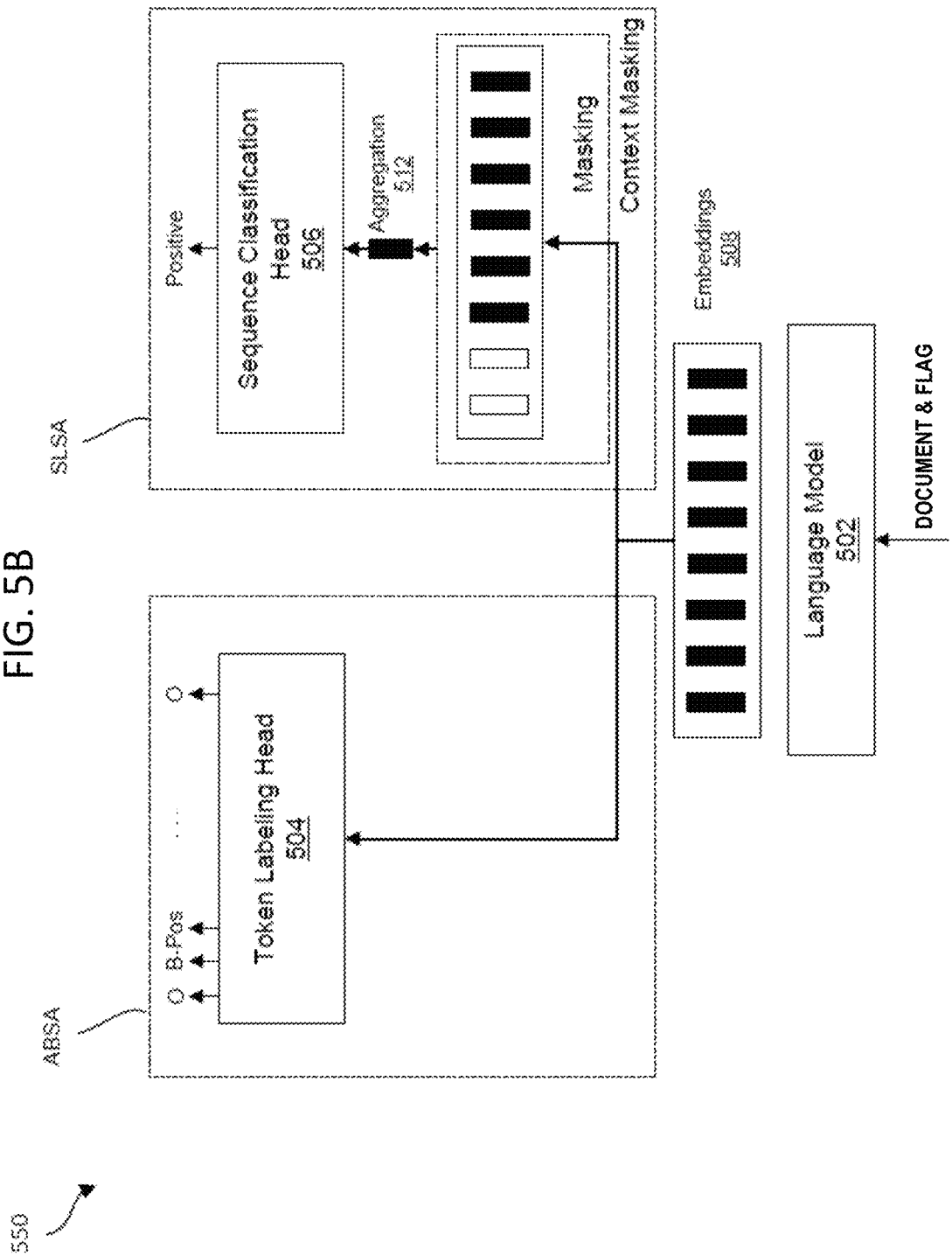
FIG. 5B is a simplified block diagram of a portion of a sentiment analysis system in accordance with various embodiments.
Figure 5C:
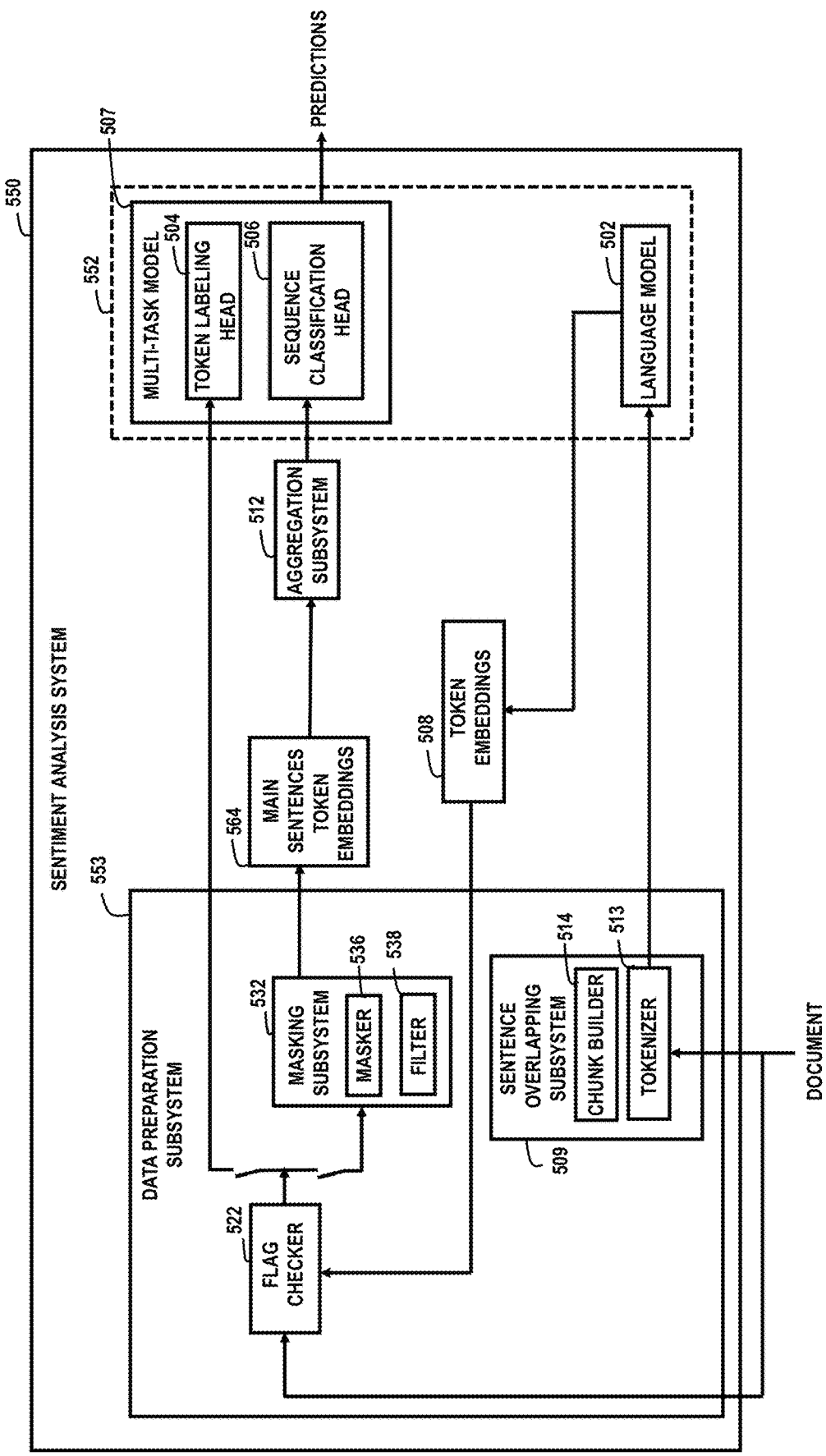
FIG. 5C is a simplified block diagram of a sentiment analysis system in accordance with various embodiments.

FIGS. 5B and 5C are simplified block diagrams of a sentiment analysis system 550 deploying the multi-task model 507 according to certain embodiments. The sentiment analysis system 550 may be implemented using one or more computer systems, each computer system having one or more processors. The sentiment analysis system 550 may include multiple components and subsystems communicatively coupled to each other via one or more communication mechanisms. For example, in the embodiment shown in FIGS. 5B and 5C, the sentiment analysis system 550 includes a data preparation subsystem 553, the language model 502, and the multi-task model 507 including a token labeling head 504 and a sequence classification head 506. The data preparation subsystem 553 corresponds to the training data preparation subsystem 503, the language model 502 corresponds to the first ML model 511, the token labeling head 504 corresponds to the first head 542 that has been trained as described above, and the sequence classification head 506 corresponds to the second head 544 that has been trained as described above. In embodiments, the language model 502 and the multi-task model 507 including the token labeling head 504 and the sequence classification head 506 may be included in a sentiment analysis network 552, e.g., a neural network.

The systems and components shown in FIGS. 5B and 5C may be implemented in software (e.g., code, instructions, program) executed by one or more processing units (e.g., processors, cores) of the respective systems, using hardware, or combinations thereof. The software may be stored on a non-transitory storage medium (e.g., on a memory device). The sentiment analysis system 550 is merely an example and is not intended to unduly limit the scope of embodiments. Many variations, alternatives, and modifications are possible. For example, in some implementations, the sentiment analysis system 550 may have more or fewer components than those shown in FIGS. 5B and 5C, may combine two or more components, or may have a different configuration or arrangement of components. The sentiment analysis system 550 and components shown in FIGS. 5B and 5C may be implemented using one or more computer systems, such as the computer system shown in FIG. 12. In some implementations, at least some functionalities and operations of the sentiment analysis system 550 may correspond to the sentiment prediction stage 417 of the implementation stage 402 of FIG. 4.

Figure 12:
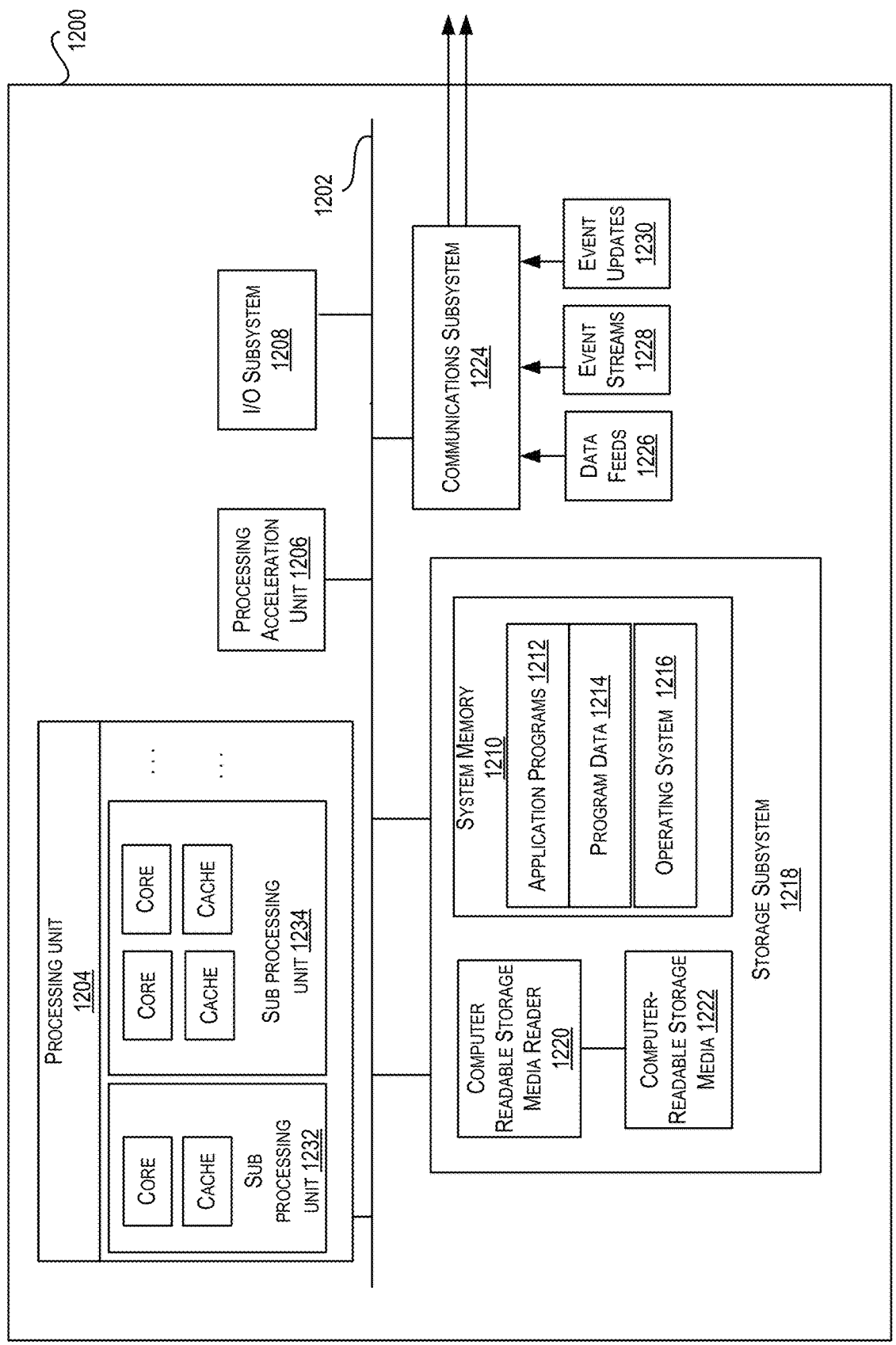
FIG. 12 is a block diagram illustrating an example computer system, according to at least one embodiment.
Figure 13:
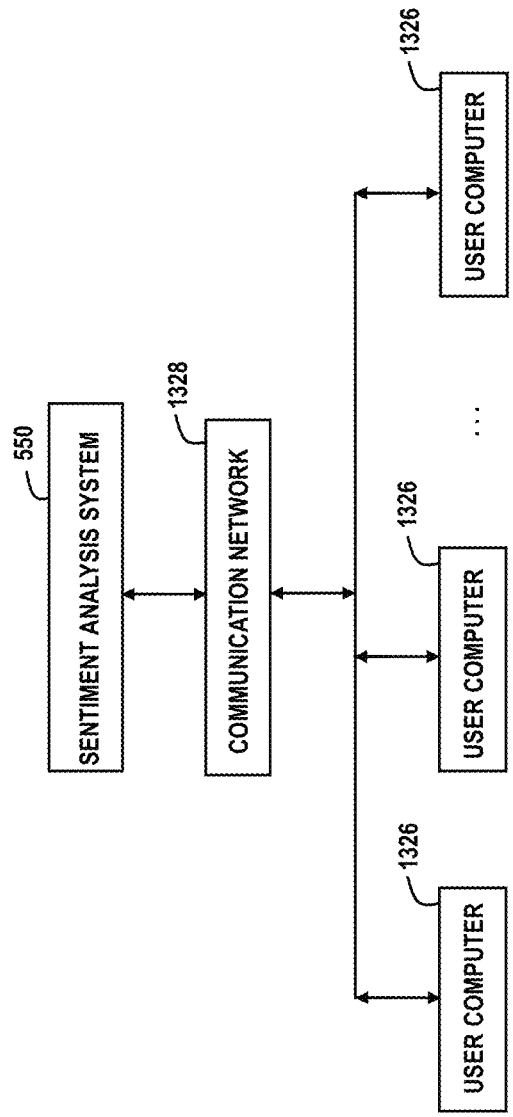
FIG. 13 is a simplified block diagram of a sentiment analysis system in a distributed computing environment according to various embodiments.

As shown in FIG. 13, the sentiment analysis system 550 can be provided as a part of a distributed computing environment, where the sentiment analysis system 550 is connected to one or more user computers 1326 via a communication network 1328. An example of a distributed computing environment is depicted in FIG. 12 and described in detail below.

Figure 14:
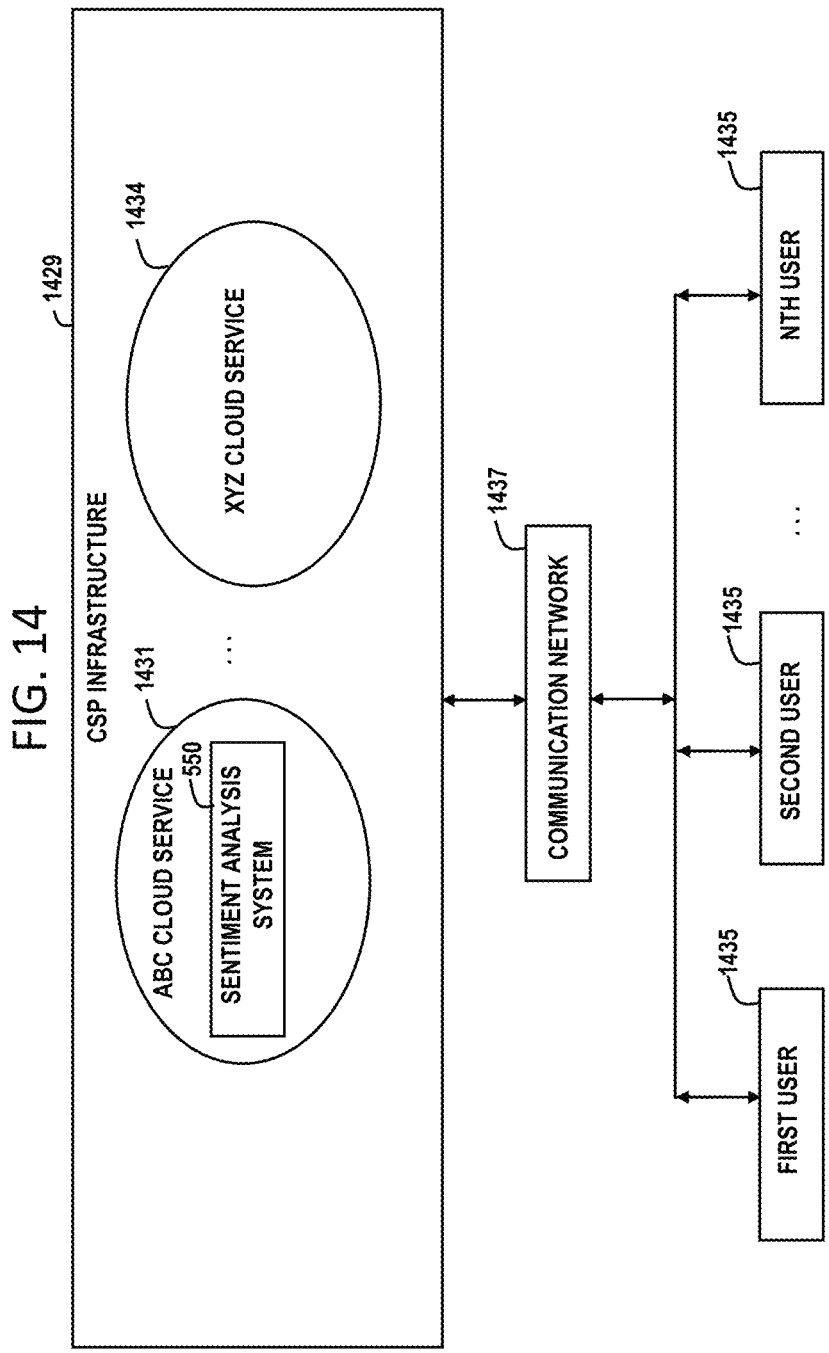
FIG. 14 is a simplified block diagram of a sentiment analysis system in a cloud service provider (CSP) infrastructure according to various embodiments.

As shown in FIG. 14, the sentiment analysis system 550 may be a part of a CSP infrastructure 1429 provided by a CSP for providing one or more cloud services. For example, the one or more cloud services may include ABC cloud service 1431 to XYZ cloud service 1434 connected to computers of one or more users 1435 via a communication network 1437. For example, the sentiment analysis system 550 may be a part of the ABC cloud service 1431.

An example of a cloud infrastructure architecture provided by the CSP is depicted in FIGS. 8-11 and described in detail below.

As mentioned above, the sentiment analysis system 550 may include the data preparation subsystem 553. In an embodiment, the data preparation subsystem 553 may receive, e.g., access or obtain, one or more input documents (or documents) to be processed for sentiment analysis.

The data preparation subsystem 553 may further receive configuration information associated with each input document, e.g., a flag or configuration flag. The operations performed by the data preparation subsystem 553 are similar to the operations performed by the training data preparation subsystem 503 that are described above with reference to FIG. 5A.

In embodiments, the data preparation subsystem 553 may use a language model 502, to perform processing on the input document. The language model 502 may correspond to the first ML model 511 described above with reference to FIG. 5A.

For example, the language model 502 is shared between two tasks for which the multi-task model 507 is trained, e.g., the ABSA and the SLSA. In an embodiment, the multi-task model 507 uses a separate lightweight head for each of the ABSA and the SLSA, e.g., the token labeling head 504 and the sequence classification head 506. The ABSA and the SLSA are described in detail above.

In some embodiments, the data preparation subsystem 553 may include a sentence overlapping subsystem 509. The sentence overlapping subsystem 509 is configured to receive, as an input, a document and perform certain processing on the document so that the document is broken into smaller portions of text, e.g., chunks, by using a long-text processing method described above with reference to FIGS. 5A and 6B.

In some embodiments, the sentence overlapping subsystem 509 may include a tokenizer 513. The tokenizer 513 may receive the document and parse the document into tokens, e.g., words.

The sentence overlapping subsystem 509 may further include a chunk builder 514. The chunk builder may receive tokens of the sentences and arrange the tokens in chunks by using the third long-text processing method 650 described above with reference to FIGS. 5A and 6B.

In certain implementations, after receiving the tokens from the tokenizer 513, the chunk builder 514 may form a plurality of chunks, where each of the plurality of chunks includes tokens from one or more token groups corresponding to one or more of the plurality of sentences, as described above. The chunk builder 514 may include different amounts of tokens from the token groups of the adjacent sentences, to form a plurality of token strings with a limited token overlap, according to the third long-text processing method 650 of FIG. 6B. Each token string may include tokens from the main sentence and tokens from the neighboring sentence(s), e.g., one or more preceding sentences and/or one or more following sentences with respect to the main sentence, where a number of tokens from the main sentence is greater than a number of tokens from the neighboring sentence(s).

The plurality of token strings may be then provided to the language model 502 for generating token embeddings 508, e.g., the contextualized embeddings. For each chunk, all of the tokens are input into the language model 502 (e.g., BERT) that outputs the token embeddings 508 that can be used for both the ABSA and the SLSA.

The data preparation subsystem 553 may further include a flag checker 522. The flag checker 522 may receive the flag that is associated with the document and determine a value of the flag. The value of the flag may indicate to perform the sentiment analysis using the SLSA and/or the ABSA.

In various embodiments, if the value of the flag indicates to perform the ABSA, the sentiment analysis system 550 performs a first process. The first process may include performing aspect-based sentiment analysis on the document using the token labeling head 504, where the aspect-based sentiment analysis is performed based on the token embeddings from the main sentence, the token embeddings from the sentence before the main sentence, the token embeddings from the sentence after the main sentence, or any combination thereof in each chunk.

In an example, the token labeling head 504 receives all the token embeddings 508, e.g., the contextualized embeddings, that are computed by the language model 502 based on the provided document or documents.

The token labeling head 504 is for the ABSA task where the token labeling head 504 can find the aspects and their sentiments in one or more sentences. For example, the task of the token labeling head 504 is to classify the sentiment corresponding to the words and/or phrases in the text, with respect to an aspect. For example, if a user inputs the utterance "the food was good," the token labeling head 504 may return the aspect for "food" as a positive class of the sentiments. In another example, for the sentence, "the food was bad, but the coffee was good," the token labeling head 504 can classify the aspect "food" as a negative class of the sentiments and classify the aspect "coffee" as a positive class of the sentiments.

The token labeling head 504 may predict a label for each input word, e.g., in the phrase "the Italian cheese was amazing." The token labeling head 504 output may be "O B-Pos I-Pos O O". The labels mean I-Pos=Intermediary Positive, B-Pos=Beginning Positive, and O=Ignored. Accordingly, the word "Italian" is the beginning for a positive aspect (i.e., B-Pos) and the word "cheese" is the intermediary positive (i.e., I-Pos). Then, a post-processing component can output the aspect "Italian cheese" as the positive class, e.g., a positive aspect, for the sentence.

If the value of the flag indicates to perform the SLSA, the sentiment analysis system 550 performs a second process.

In the second process, the masker 536 receives the token embeddings output by the language model 502. As described above, each token string may include tokens from one sentence or from a plurality of sentences. The masker 536 masks one or more token embeddings that come from a less significant sentence for a particular token string. For example, the masker 536 masks the token embeddings that correspond to the tokens the number of which is smaller in a corresponding token string, so that a main sentence having a greater number of tokens is emphasized.

In some embodiments, the masking subsystem 532 may further include a filter 538. The filter 538 may remove the masked token embeddings output from the masker 536.

As a result of operations performed by the masking subsystem 532, the masking system may output main sentences token embeddings 564.

An aggregation subsystem 512 corresponds to the aggregation subsystem 515. The aggregation subsystem 512 may perform one of aggregation methods to obtain and output the contextualized embeddings corresponding to the tokens of each of the main sentences. The contextualized embeddings corresponding to the tokens of each of the main sentences may be then provided to the sequence classification head 506.

Although in FIG. 5C the aggregation subsystem 512 is shown as a separate component, this is not intended to be limiting. In some embodiments, the aggregation subsystem 512 may be included in the multi-task model 507 or in the sequence classification head 506.

The sequence classification head 506 is for the SLSA tasks where the sequence classification head 506 predicts the sentiment of a current sentence. The prediction for the sentence can be positive, negative, neutral, etc. For the SLSA, only some of the token embeddings 508, which are considered to correspond to the tokens of the main sentence in the chunk are input to the sequence classification head 506.

In some embodiments, the masking subsystem 532 filters out the embeddings from the neighboring sentence or sentences, e.g., excludes from further processing the masked embeddings. Then, the aggregation (e.g., an aggregation method) is applied on the remaining token embeddings 508, to obtain the embeddings that belong to the same sentence, e.g., a main sentence.

Accordingly, in the second process, the sentiment analysis system 550 masks, for each of the chunks, the token embeddings from the sentence before the main sentence and/or token embeddings from a sentence after the main sentence, and the multi-task model 507 performs sentence-level sentiment analysis on each of the sentences in the document using the sequence classification head 506, based on the token embeddings from the main sentence in each chunk that is associated with each of the sentences.

In some implementations, where the flag indicates to perform sentiment prediction by using both the SLSA and ABSA, the sentiment analysis system 550 performs both the first process and the second process, sequentially, in parallel, or at least partially in parallel.

IV. PERFORMANCE RESULTS

In a first experiment, the accuracy of the multi-task model 507 utilizing the context masking was tested in comparison to a separate model. As used herein, a separate model or a single-task model refers to a combination of a language model and one head performing either ABSA or SLSA.

For the ABSA, the results provided by the multi-task model 507 utilizing the context masking were on par with the results provided by the related art single-task model for making the predictions using ABSA.

For the SLSA, the results provided by the multi-task model 507 utilizing the context masking show that the accuracy was improved as compared to the single-task model and the multi-task model without context masking, as shown in Table 3 below.

TABLE 3

(SLSA results)

| | Baseline - Manually break the document into sentences | Multi-task Model (Document input without context masking for SLSA) | Multi-task Model (Document input with context masking for SLSA) |
|---|---|---|---|
| English Text | 0.775 | 0.693 | 0.783 |

As shown in Table 3, the baseline, which was a single-task model for the SLSA, has the performance accuracy on the English text of 77.5%. By using the multi-task model without the context masking, the performance dropped to 69.3%, e.g., around 8% drop in the performance. By using the multi-task model with the context masking, the performance increased to 78%. This result is higher than the single-task model. Accordingly, the context masking method of embodiments used together with the multi-model model trained according to embodiments improves accuracy of the predictions for SLSA.

In a second experiment, the latency of using two separate single-task models as compared to a single multi-task model provided by various embodiments was tested. As described above, one single-task model was a combination of a language model and one head performing the ABSA and another single-task model was a combination of a language model and one head performing the SLSA. The loading test results as a part of the latency analysis are provided in Table 4 below, where the label "two separate single-task models" indicates that two separate single-task models were used to separately perform the ABSA and the SLSA.

TABLE 4

| Ave Character Length per document | Model Type | User Latency | Splat Latency | Model Latency | Chunk size | Requests per second |
|---|---|---|---|---|---|---|
| 300 | 2 Separate Single-Task Models | 331 ms | 297 ms | 175 ms | 128 | 90 |
| 300 | Multi-Task | 170 ms | 142 ms | 108 ms | 128 | 100 |
| 1000 | 2 Separate Single-Task Models | 480 ms | 446 ms | 395 ms | 128 | 30 |
| 1000 | Multi-Task | 430 ms | 353 ms | 298 ms | 128 | 60 |
| 5000 | 2 Separate Single-Task Models | 1805 ms | 1658 ms | 1537 ms | 128 | 5 |
| 5000 | Multi-Task | 1007 ms | 978 ms | 938 ms | 128 | 10 |

Table 4 above shows three experimental examples. In a first example, each of the single-task models was provided with 90 requests (e.g., documents) per second. The latency experienced by user was 331 ms, SPLAT latency was 297 ms, and single-task models latency was 175 ms. For comparison, the multi-task model was provided with 100 requests per second, the latency experienced by user was 170 ms, SPLAT latency was 142 ms, and multi-task model latency was 108 ms. In the first example, the latency experienced by user was cut by almost a half, while requests per second were increased. The other two examples are self-explanatory. It is worth noting that in the last example, the latency experienced by user was cut by close to a half, while requests per second were increased twice with the multi-task model.

As shown, the single-task models have higher user latency, higher model latency, and can process fewer requests per second as compared to the multi-task model of embodiments. Additionally, the multi-task model has a higher overall accuracy of predictions.

V. METHODS

Figure 7A:
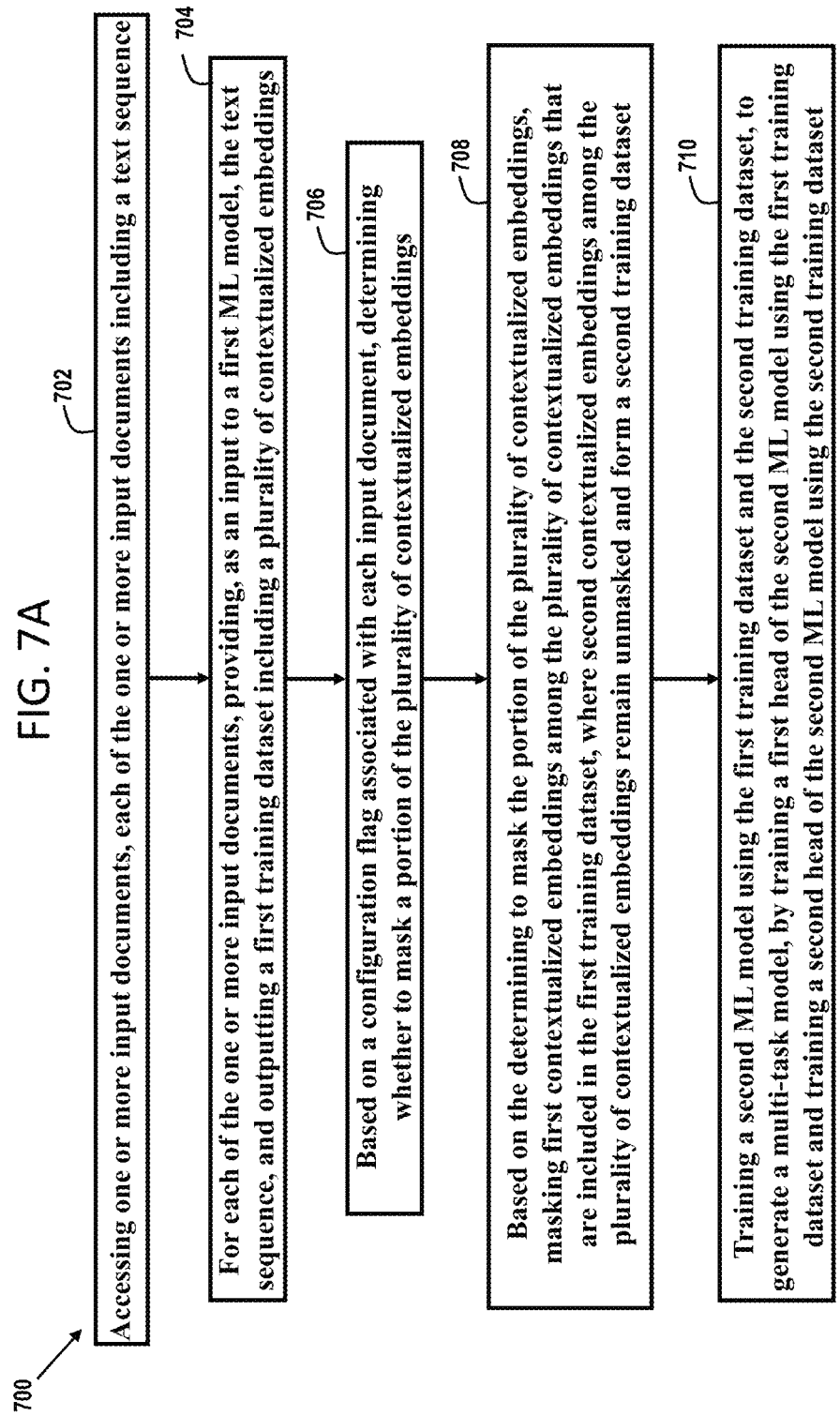
FIG. 7A is a flowchart of a method in accordance with various embodiments.

FIG. 7A depicts processing according to various embodiments. For example, the processing 700 depicted in FIG. 7A may be performed by the training data preparation subsystem 503, the multi-task model generation subsystem 505, and the first ML model 511.

The processing 700 depicted in FIG. 7A may be implemented in software (e.g., code, instructions, program) executed by one or more processing units (e.g., processors, cores) of the respective subsystems, using hardware, or combinations thereof. The software may be stored on a non-transitory storage medium (e.g., on a memory device). The method presented in FIG. 7A and described below is intended to be illustrative and non-limiting. Although FIG. 7A depicts the various processing operations occurring in a particular sequence or order, this is not intended to be limiting. In certain alternative embodiments, the processing 700 may be performed in some different order or some operations may be performed at least partially in parallel.

With continuing reference to FIG. 7A, at operation 702, the training data preparation subsystem 503 may access one or more input documents, each of the one or more input documents including a text sequence.

At operation 704, for each of the one or more input documents, the text sequence may be provided, as an input to the first ML model 511. Based at least in part on the text sequence, the first ML model 511 may output a first training dataset 520 including a plurality of contextualized embeddings.

In some implementations, the first ML model 511 is a natural language processing (NLP) model. For example, the first ML model 511 is BERT.

The text sequence may include a plurality of sentences, and, for each of the one or more input documents, the training data preparation subsystem 503 tokenizes each of the plurality of sentences into tokens and forms a plurality of chunks, each of the plurality of chunks including tokens of a token group corresponding to a main sentence and tokens of one or more adjacent sentences.

In some implementations, the training data preparation subsystem 503 may overlap different amounts of tokens from the token groups of the adjacent sentences, to form a plurality of token strings, and successively provide, as the input to the first ML model 511, each of the plurality of token strings in each of a plurality of processing cycles, where each of the plurality of processing cycles results in outputting, by the first ML model 511, contextualized embeddings for a corresponding token string among the plurality of token strings.

The training data preparation subsystem 503 may perform overlapping by forming a first token string among the plurality of token strings to include a first number of the first tokens of the first sentence and a second number of the second tokens of the second sentence, the first number of the first tokens being greater than the second number of the second tokens that is greater than 1, and forming a second token string among the plurality of token strings to include a third number of the first tokens of the first sentence and a fourth number of the second tokens of the second sentence, the fourth number of the second tokens being greater than the third number of the first tokens that is greater than 1. In this example, the first token string emphasizes the first sentence as the main sentence, while the second token string emphasizes the second sentence as the main sentence.

At operation 706, based on a configuration flag associated with each input document, the training data preparation subsystem 503 may determine whether to mask a portion of the plurality of contextualized embeddings.

At operation 708, based on the determining to mask the portion of the plurality of contextualized embeddings, the training data preparation subsystem 503 may mask first contextualized embeddings among the plurality of contextualized embeddings included in the first training dataset 520, where second contextualized embeddings among the plurality of contextualized embeddings remain unmasked, so that a second training dataset 534 including the second contextualized embeddings may be formed.

In some embodiments, where the configuration flag indicates to mask the portion of the plurality of contextualized embeddings, the training data preparation subsystem 503 masks, in each of the chunks of contextualized embeddings, contextualized embeddings of a first sentence having a smaller number of contextualized embeddings than a number of contextualized embeddings of a second sentence among the plurality of sentences. For example, the contextualized embeddings of the first sentence correspond to the first contextualized embeddings, and the contextualized embeddings of the second sentence correspond to the second contextualized embeddings.

At operation 710, the multi-task model training subsystem 540 may train a second ML model using the first training dataset 520 and the second training dataset 534, to generate a multi-task model 507, by training a first head 542 of the second ML model 541 using the first training dataset 520 and training a second head 544 of the second ML model 541 using the second training dataset 534.

In some implementations, the first head 542 is configured to perform an aspect-based sentiment analysis (ABSA) configured to predict a sentiment by analyzing at least a part of the plurality of sentences, and the second head 544 is configured to perform a sentence-level sentiment analysis (SLSA) configured to predict the sentiment by analyzing a respective sentence among the plurality of sentences, where the generated multi-task model 507 is capable of predicting one or more sentiments using at least one from among the ABSA and the SLSA.

In some implementations, the determining whether to mask the portion of the plurality of contextualized embeddings includes determining whether the configuration flag associated with a particular input document indicates to train the second ML model 541 to predict the sentiment using the SLSA, the ABSA, or the SLSA and the ABSA. Based on the determining that the configuration flag indicates to train the second ML model 541 to predict the sentiment using the SLSA or the SLSA and the ABSA, the masking of the first contextualized embeddings is performed to provide the second training dataset 534 to train the second head 544. Based on the determining that the configuration flag indicates to predict the sentiment using the ABSA or the SLSA and the ABSA, the first training dataset 520 is provided to train the first head 542 without masking any of the contextualized embeddings included therein.

In an example, the training data preparation subsystem 503 may access a single input document having an associated configuration flag indicating to train the second ML model 541 to predict the sentiment using both the SLSA and the ABSA.

In another example, the training data preparation subsystem 503 may access a first input document and a second input document. The training data preparation subsystem 503 may determine that the configuration flag associated with the first input document indicates to train the second ML model 541 to predict the sentiment using the SLSA and may proceed with the process of masking to train the second head 544. The training data preparation subsystem 503 may determine that the configuration flag associated with the second input document indicates to train the second ML model 541 to predict the sentiment using the ABSA and proceed by providing all the contextualized embeddings generated by the first ML model 511 to train the first head 542.

FIG. 7B depicts processing according to various embodiments. For example, the processing 750 depicted in FIG. 7B may be performed by the sentiment analysis system 550, e.g., the data preparation subsystem 533, the language model 502, and the multi-task model 507.

The processing 750 depicted in FIG. 7B may be implemented in software (e.g., code, instructions, program) executed by one or more processing units (e.g., processors, cores) of the respective subsystems, using hardware, or combinations thereof. The software may be stored on a non-transitory storage medium (e.g., on a memory device). The method presented in FIG. 7B and described below is intended to be illustrative and non-limiting. Although FIG. 7B depicts the various processing operations occurring in a particular sequence or order, this is not intended to be limiting. In certain alternative embodiments, the processing 750 may be performed in some different order or some operations may be performed at least partially in parallel.

With continuing reference to FIG. 7B, at operation 752, the data preparation subsystem 533 may access a document including sentences, where a configuration flag is associated with the document and indicates whether aspect-based sentiment analysis, sentence-level sentiment analysis, or both are to be performed on the document.

At operation 754, the document may be input into the language model 502.

At operation 756, the language model 502 may generate chunks of token embeddings for the document, where each of the chunks includes a predefined total number of token embeddings including token embeddings from a main sentence, token embeddings from a sentence before the main sentence, token embeddings from a sentence after the main sentence, or any combination thereof, and, for each of the chunks, a number of token embeddings from the sentence before the main sentence and a number of token embeddings from a sentence after the main sentence are restricted to a predefined limit number of token embeddings.

In some embodiments, at least one of the chunks includes: token embeddings from the main sentence and at least one from among token embeddings from the sentence before the main sentence and token embeddings from the sentence after the main sentence.

At operation 758, the sentiment analysis system 550 may, when the configuration flag indicates the aspect-based sentiment analysis is to be performed, execute a first process including performing aspect-based sentiment analysis on the document, where the aspect-based sentiment analysis is performed based on the token embeddings from the main sentence, the token embeddings from the sentence before the main sentence, the token embeddings from the sentence after the main sentence, or any combination thereof in each chunk.

In some embodiments, the sentiment analysis system 550 may perform the aspect-based sentiment analysis on the document by inputting the token embeddings from the main sentence, the token embeddings from the sentence before the main sentence, the token embeddings from the sentence after the main sentence, or any combination thereof in each chunk into a token labeling head 504, where the token labeling head 504 may locate one or more aspects in the document based on the token embeddings from the main sentence, the token embeddings from the sentence before the main sentence, the token embeddings from the sentence after the main sentence, or any combination thereof in each chunk, predict a sentiment class expressed toward each of the one or more aspects based on the token embeddings from the main sentence, the token embeddings from the sentence before the main sentence, the token embeddings from the sentence after the main sentence, or any combination thereof in each chunk, and output the sentiment class expressed towards each of the one or more aspects.

At operation 760, the sentiment analysis system 550 may, when the configuration flag indicates the sentence-level sentiment analysis is to be performed, execute a second process including: masking, for each of the chunks, the token embeddings from the sentence before the main sentence and token embeddings from a sentence after the main sentence, and performing sentence-level sentiment analysis on each of the sentences in the document based on the token embeddings from the main sentence of each chunk associated with each of the sentences.

In some embodiments, the sentiment analysis system 550 may apply, for each of the chunks, a mask value to the token embeddings from the sentence before the main sentence and token embeddings from a sentence after the main sentence, and aggregate, for each of the chunks, the token embeddings from the main sentence to generate aggregate token embeddings.

In some embodiments, the sentiment analysis system 550 may perform the sentence-level sentiment analysis on each of the sentences in the document by inputting the aggregate token embeddings from the main sentence in each chunk that is associated with a given sentence into a sequence classification head, where the sequence classification head 506 may predict a sentiment class for the given sentence based on the aggregate token embeddings and output the sentiment class for the given sentence.

At operation 762, the sentiment analysis system 550 may, when the configuration flag indicates both the aspect-based sentiment analysis and the sentence-level sentiment analysis are to be performed, perform both the first process and the second process.

In some implementations, the sentence-level sentiment analysis and the aspect-based sentiment analysis are performed using a sentiment analysis network 552 including the language model 502 configured to generate the chunks of the token embeddings, the sequence classification head 506 configured to perform the sentence-level sentiment analysis, and the token labeling head 504 configured to perform the aspect-based sentiment analysis.

In certain implementations, the token labeling head 504 and the sequence classification head 506 are configured by training the first head 542 and the second head 544, respectively, using an early stop training approach that includes: training the first head 542 and the second head 544 using token embeddings from a first set of documents (e.g., first datapoints), optimizing hyperparameters including weights associated with a first performance metric for the first head 542 and a second performance metric for the second head 544, validating the first head 542 and the second head 544 using token embeddings from a second set of documents (e.g., second datapoints), evaluating performance of the first head 542 and the second head 544 based on the second set of documents using a combination of the first performance metric, the second performance metric, and associated weights, and stopping the training of the first head 542 and the second head 544 when the performance of the first head 542 and the second head 544 on the second set of documents begins to degrade as determined based on the evaluating.

Example Cloud Implementation

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each virtual machine, deploy middleware such as databases, create storage buckets for workloads and backups, and even install enterprise software into that virtual machine. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 8:
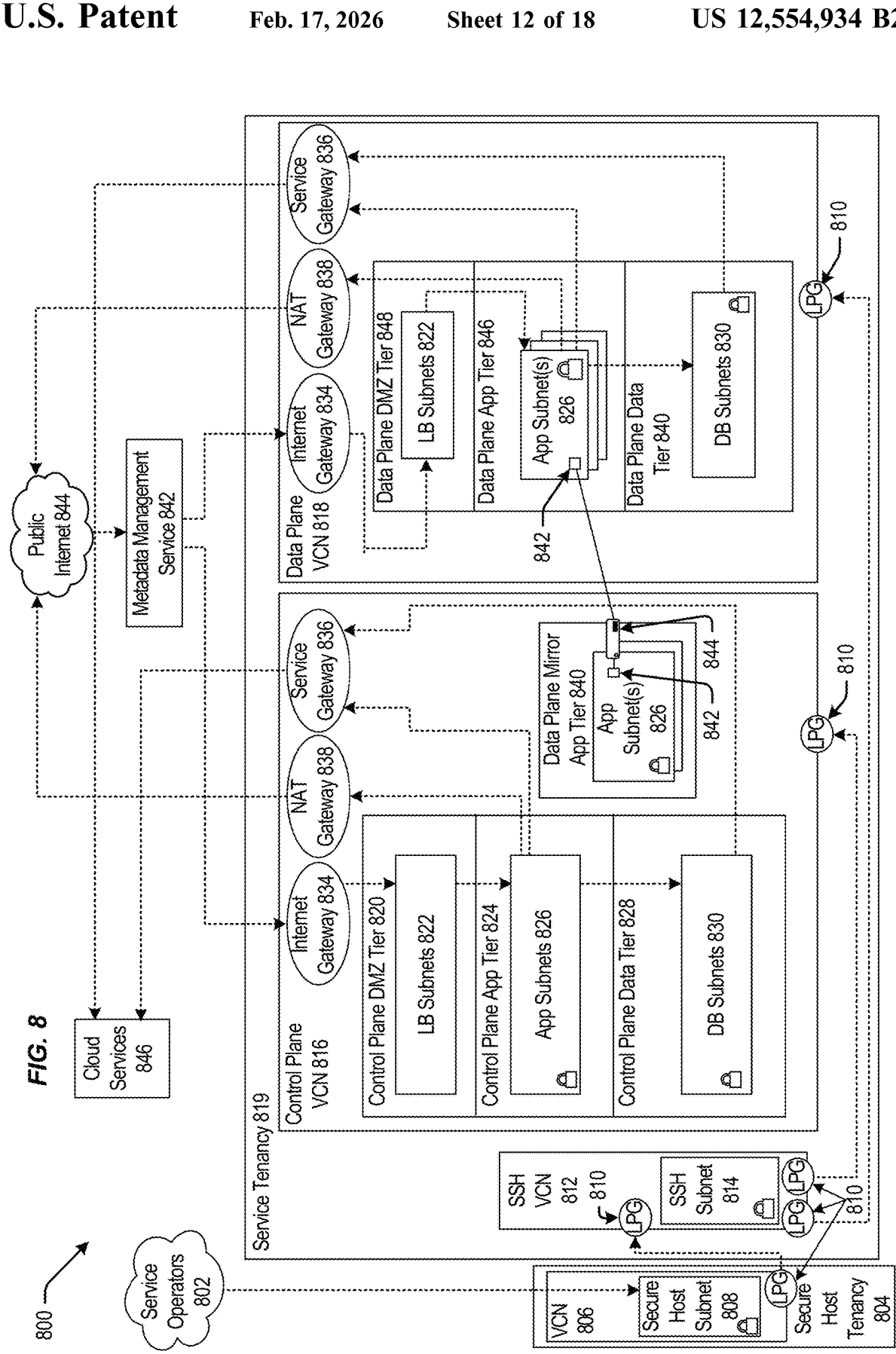
FIG. 8 is a block diagram illustrating one pattern for implementing a cloud infrastructure as a service system, according to at least one embodiment.

FIG. 8 is a block diagram 800 illustrating an example pattern of an IaaS architecture, according to at least one embodiment. Service operators 802 can be communicatively coupled to a secure host tenancy 804 that can include a virtual cloud network (VCN) 806 and a secure host subnet 808. In some examples, the service operators 802 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 806 and/or the Internet.

The VCN 806 can include a local peering gateway (LPG) 810 that can be communicatively coupled to a secure shell (SSH) VCN 812 via an LPG 810 contained in the SSH VCN 812. The SSH VCN 812 can include an SSH subnet 814, and the SSH VCN 812 can be communicatively coupled to a control plane VCN 816 via the LPG 810 contained in the control plane VCN 816. Also, the SSH VCN 812 can be communicatively coupled to a data plane VCN 818 via an LPG 810. The control plane VCN 816 and the data plane VCN 818 can be contained in a service tenancy 819 that can be owned and/or operated by the IaaS provider.

The control plane VCN 816 can include a control plane demilitarized zone (DMZ) tier 820 that acts as a perimeter network (e.g., portions of a corporate network between the corporate intranet and external networks). The DMZ-based servers may have restricted responsibilities and help keep breaches contained. Additionally, the DMZ tier 820 can include one or more load balancer (LB) subnet(s) 822, a control plane app tier 824 that can include app subnet(s) 826, a control plane data tier 828 that can include database (DB) subnet(s) 830 (e.g., frontend DB subnet(s) and/or backend DB subnet(s)). The LB subnet(s) 822 contained in the control plane DMZ tier 820 can be communicatively coupled to the app subnet(s) 826 contained in the control plane app tier 824 and an Internet gateway 834 that can be contained in the control plane VCN 816, and the app subnet(s) 826 can be communicatively coupled to the DB subnet(s) 830 contained in the control plane data tier 828 and a service gateway 836 and a network address translation (NAT) gateway 838. The control plane VCN 816 can include the service gateway 836 and the NAT gateway 838.

The control plane VCN 816 can include a data plane mirror app tier 840 that can include app subnet(s) 826. The app subnet(s) 826 contained in the data plane mirror app tier 840 can include a virtual network interface controller (VNIC) 842 that can execute a compute instance 844. The compute instance 844 can communicatively couple the app subnet(s) 826 of the data plane mirror app tier 840 to app subnet(s) 826 that can be contained in a data plane app tier 846.

The data plane VCN 818 can include the data plane app tier 846, a data plane DMZ tier 848, and a data plane data tier 850. The data plane DMZ tier 848 can include LB subnet(s) 822 that can be communicatively coupled to the app subnet(s) 826 of the data plane app tier 846 and the Internet gateway 834 of the data plane VCN 818. The app subnet(s) 826 can be communicatively coupled to the service gateway 836 of the data plane VCN 818 and the NAT gateway 838 of the data plane VCN 818. The data plane data tier 850 can also include the DB subnet(s) 830 that can be communicatively coupled to the app subnet(s) 826 of the data plane app tier 846.

The Internet gateway 834 of the control plane VCN 816 and of the data plane VCN 818 can be communicatively coupled to a metadata management service 852 that can be communicatively coupled to public Internet 854. Public Internet 854 can be communicatively coupled to the NAT gateway 838 of the control plane VCN 816 and of the data plane VCN 818. The service gateway 836 of the control plane VCN 816 and of the data plane VCN 818 can be communicatively couple to cloud services 856.

In some examples, the service gateway 836 of the control plane VCN 816 or of the data plane VCN 818 can make application programming interface (API) calls to cloud services 856 without going through public Internet 854. The API calls to cloud services 856 from the service gateway 836 can be one-way: the service gateway 836 can make API calls to cloud services 856, and cloud services 856 can send requested data to the service gateway 836. But, cloud services 856 may not initiate API calls to the service gateway 836.

In some examples, the secure host tenancy 804 can be directly connected to the service tenancy 819, which may be otherwise isolated. The secure host subnet 808 can communicate with the SSH subnet 814 through an LPG 810 that may enable two-way communication over an otherwise isolated system. Connecting the secure host subnet 808 to the SSH subnet 814 may give the secure host subnet 808 access to other entities within the service tenancy 819.

The control plane VCN 816 may allow users of the service tenancy 819 to set up or otherwise provision desired resources. Desired resources provisioned in the control plane VCN 816 may be deployed or otherwise used in the data plane VCN 818. In some examples, the control plane VCN 816 can be isolated from the data plane VCN 818, and the data plane mirror app tier 840 of the control plane VCN 816 can communicate with the data plane app tier 846 of the data plane VCN 818 via VNICs 842 that can be contained in the data plane mirror app tier 840 and the data plane app tier 846.

In some examples, users of the system, or customers, can make requests, for example create, read, update, or delete (CRUD) operations, through public Internet 854 that can communicate the requests to the metadata management service 852. The metadata management service 852 can communicate the request to the control plane VCN 816 through the Internet gateway 834. The request can be received by the LB subnet(s) 822 contained in the control plane DMZ tier 820. The LB subnet(s) 822 may determine that the request is valid, and in response to this determination, the LB subnet(s) 822 can transmit the request to app subnet(s) 826 contained in the control plane app tier 824. If the request is validated and requires a call to public Internet 854, the call to public Internet 854 may be transmitted to the NAT gateway 838 that can make the call to public Internet 854. Metadata that may be desired to be stored by the request can be stored in the DB subnet(s) 830.

In some examples, the data plane mirror app tier 840 can facilitate direct communication between the control plane VCN 816 and the data plane VCN 818. For example, changes, updates, or other suitable modifications to configuration may be desired to be applied to the resources contained in the data plane VCN 818. Via a VNIC 842, the control plane VCN 816 can directly communicate with, and can thereby execute the changes, updates, or other suitable modifications to configuration to, resources contained in the data plane VCN 818.

In some embodiments, the control plane VCN 816 and the data plane VCN 818 can be contained in the service tenancy 819. In this case, the user, or the customer, of the system may not own or operate either the control plane VCN 816 or the data plane VCN 818. Instead, the IaaS provider may own or operate the control plane VCN 816 and the data plane VCN 818, both of which may be contained in the service tenancy 819. This embodiment can enable isolation of networks that may prevent users or customers from interacting with other users', or other customers', resources. Also, this embodiment may allow users or customers of the system to store databases privately without needing to rely on public Internet 854, which may not have a desired level of threat prevention, for storage.

In other embodiments, the LB subnet(s) 822 contained in the control plane VCN 816 can be configured to receive a signal from the service gateway 836. In this embodiment, the control plane VCN 816 and the data plane VCN 818 may be configured to be called by a customer of the IaaS provider without calling public Internet 854. Customers of the IaaS provider may desire this embodiment since database(s) that the customers use may be controlled by the IaaS provider and may be stored on the service tenancy 819, which may be isolated from public Internet 854.

Figure 9:
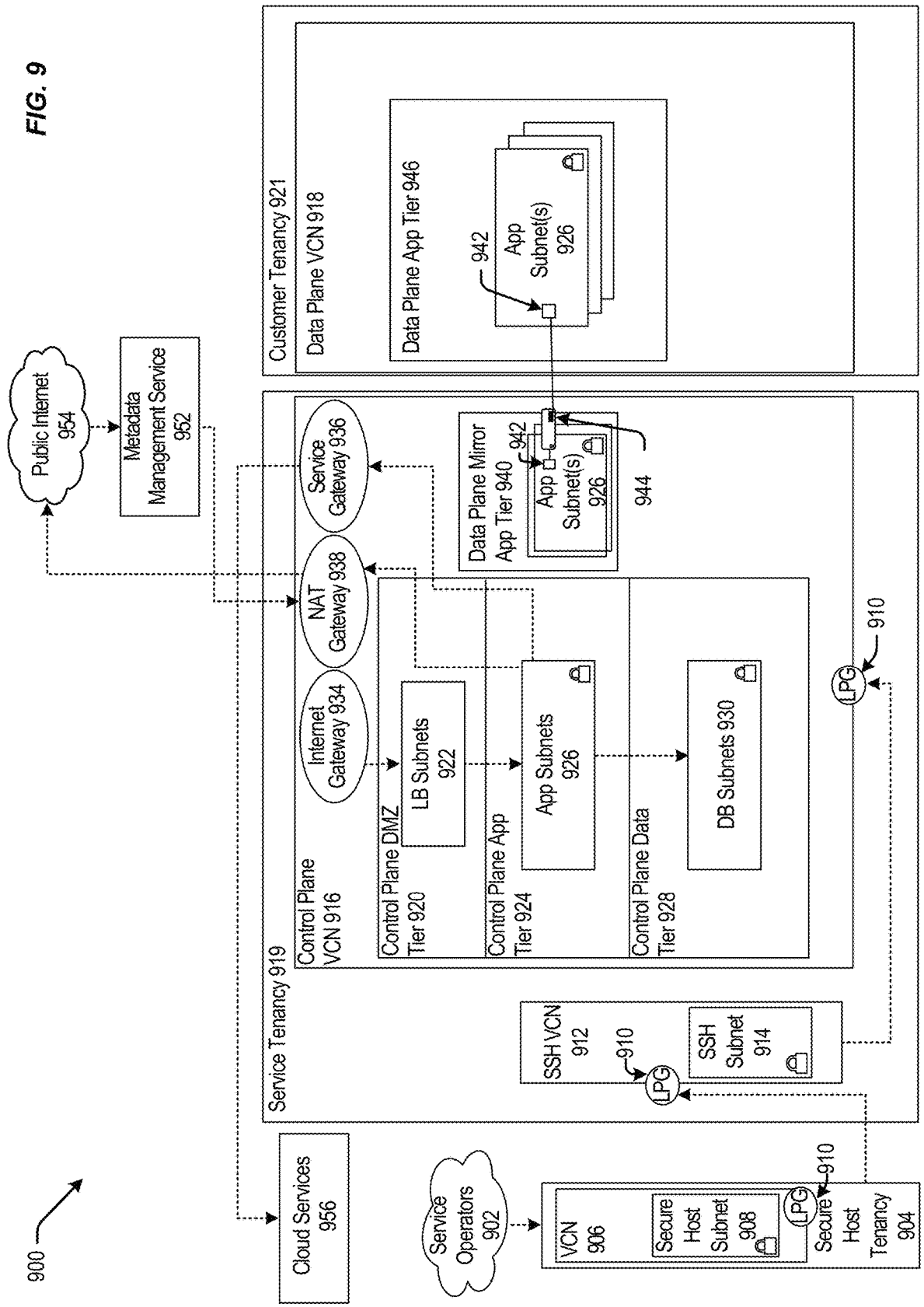
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g., service operators 802 of FIG. 8) can be communicatively coupled to a secure host tenancy 904 (e.g., the secure host tenancy 804 of FIG. 8) that can include a virtual cloud network (VCN) 906 (e.g., the VCN 806 of FIG. 8) and a secure host subnet 908 (e.g., the secure host subnet 808 of FIG. 8). The VCN 906 can include a local peering gateway (LPG) 910 (e.g., the LPG 810 of FIG. 8) that can be communicatively coupled to a secure shell (SSH) VCN 912 (e.g., the SSH VCN 812 of FIG. 8) via an LPG 810 contained in the SSH VCN 912. The SSH VCN 912 can include an SSH subnet 914 (e.g., the SSH subnet 814 of FIG. 8), and the SSH VCN 912 can be communicatively coupled to a control plane VCN 916 (e.g., the control plane VCN 816 of FIG. 8) via an LPG 910 contained in the control plane VCN 916. The control plane VCN 916 can be contained in a service tenancy 919 (e.g., the service tenancy 819 of FIG. 8), and the data plane VCN 918 (e.g., the data plane VCN 818 of FIG. 8) can be contained in a customer tenancy 921 that may be owned or operated by users, or customers, of the system.

The control plane VCN 916 can include a control plane DMZ tier 920 (e.g., the control plane DMZ tier 820 of FIG. 8) that can include LB subnet(s) 922 (e.g., LB subnet(s) 822 of FIG. 8), a control plane app tier 924 (e.g., the control plane app tier 824 of FIG. 8) that can include app subnet(s) 926 (e.g., app subnet(s) 826 of FIG. 8), a control plane data tier 928 (e.g., the control plane data tier 828 of FIG. 8) that can include database (DB) subnet(s) 930 (e.g., similar to DB subnet(s) 830 of FIG. 8). The LB subnet(s) 922 contained in the control plane DMZ tier 920 can be communicatively coupled to the app subnet(s) 926 contained in the control plane app tier 924 and an Internet gateway 934 (e.g., the Internet gateway 834 of FIG. 8) that can be contained in the control plane VCN 916, and the app subnet(s) 926 can be communicatively coupled to the DB subnet(s) 930 contained in the control plane data tier 928 and a service gateway 936 (e.g., the service gateway 836 of FIG. 8) and a network address translation (NAT) gateway 938 (e.g., the NAT gateway 838 of FIG. 8). The control plane VCN 916 can include the service gateway 936 and the NAT gateway 938.

The control plane VCN 916 can include a data plane mirror app tier 940 (e.g., the data plane mirror app tier 840 of FIG. 8) that can include app subnet(s) 926. The app subnet(s) 926 contained in the data plane mirror app tier 940 can include a virtual network interface controller (VNIC) 942 (e.g., the VNIC of 842) that can execute a compute instance 944 (e.g., similar to the compute instance 844 of FIG. 8). The compute instance 944 can facilitate communication between the app subnet(s) 926 of the data plane mirror app tier 940 and the app subnet(s) 926 that can be contained in a data plane app tier 946 (e.g., the data plane app tier 846 of FIG. 8) via the VNIC 942 contained in the data plane mirror app tier 940 and the VNIC 942 contained in the data plane app tier 946.

The Internet gateway 934 contained in the control plane VCN 916 can be communicatively coupled to a metadata management service 952 (e.g., the metadata management service 852 of FIG. 8) that can be communicatively coupled to public Internet 954 (e.g., public Internet 854 of FIG. 8). Public Internet 954 can be communicatively coupled to the NAT gateway 938 contained in the control plane VCN 916. The service gateway 936 contained in the control plane VCN 916 can be communicatively couple to cloud services 956 (e.g., cloud services 856 of FIG. 8).

In some examples, the data plane VCN 918 can be contained in the customer tenancy 921. In this case, the IaaS provider may provide the control plane VCN 916 for each customer, and the IaaS provider may, for each customer, set up a unique compute instance 944 that is contained in the service tenancy 919. Each compute instance 944 may allow communication between the control plane VCN 916, contained in the service tenancy 919, and the data plane VCN 918 that is contained in the customer tenancy 921. The compute instance 944 may allow resources, that are provisioned in the control plane VCN 916 that is contained in the service tenancy 919, to be deployed or otherwise used in the data plane VCN 918 that is contained in the customer tenancy 921.

In other examples, the customer of the IaaS provider may have databases that live in the customer tenancy 921. In this example, the control plane VCN 916 can include the data plane mirror app tier 940 that can include app subnet(s) 926. The data plane mirror app tier 940 can reside in the data plane VCN 918, but the data plane mirror app tier 940 may not live in the data plane VCN 918. That is, the data plane mirror app tier 940 may have access to the customer tenancy 921, but the data plane mirror app tier 940 may not exist in the data plane VCN 918 or be owned or operated by the customer of the IaaS provider. The data plane mirror app tier 940 may be configured to make calls to the data plane VCN 918 but may not be configured to make calls to any entity contained in the control plane VCN 916. The customer may desire to deploy or otherwise use resources in the data plane VCN 918 that are provisioned in the control plane VCN 916, and the data plane mirror app tier 940 can facilitate the desired deployment, or other usage of resources, of the customer.

In some embodiments, the customer of the IaaS provider can apply filters to the data plane VCN 918. In this embodiment, the customer can determine what the data plane VCN 918 can access, and the customer may restrict access to public Internet 954 from the data plane VCN 918. The IaaS provider may not be able to apply filters or otherwise control access of the data plane VCN 918 to any outside networks or databases. Applying filters and controls by the customer onto the data plane VCN 918, contained in the customer tenancy 921, can help isolate the data plane VCN 918 from other customers and from public Internet 954.

In some embodiments, cloud services 956 can be called by the service gateway 936 to access services that may not exist on public Internet 954, on the control plane VCN 916, or on the data plane VCN 918. The connection between cloud services 956 and the control plane VCN 916 or the data plane VCN 918 may not be live or continuous. Cloud services 956 may exist on a different network owned or operated by the IaaS provider. Cloud services 956 may be configured to receive calls from the service gateway 936 and may be configured to not receive calls from public Internet 954. Some cloud services 956 may be isolated from other cloud services 956, and the control plane VCN 916 may be isolated from cloud services 956 that may not be in the same region as the control plane VCN 916. For example, the control plane VCN 916 may be located in "Region 1," and cloud service "Deployment 8," may be located in Region 1 and in "Region 2." If a call to Deployment 8 is made by the service gateway 936 contained in the control plane VCN 916 located in Region 1, the call may be transmitted to Deployment 8 in Region 1. In this example, the control plane VCN 916, or Deployment 8 in Region 1, may not be communicatively coupled to, or otherwise in communication with, Deployment 8 in Region 2.

Figure 10:
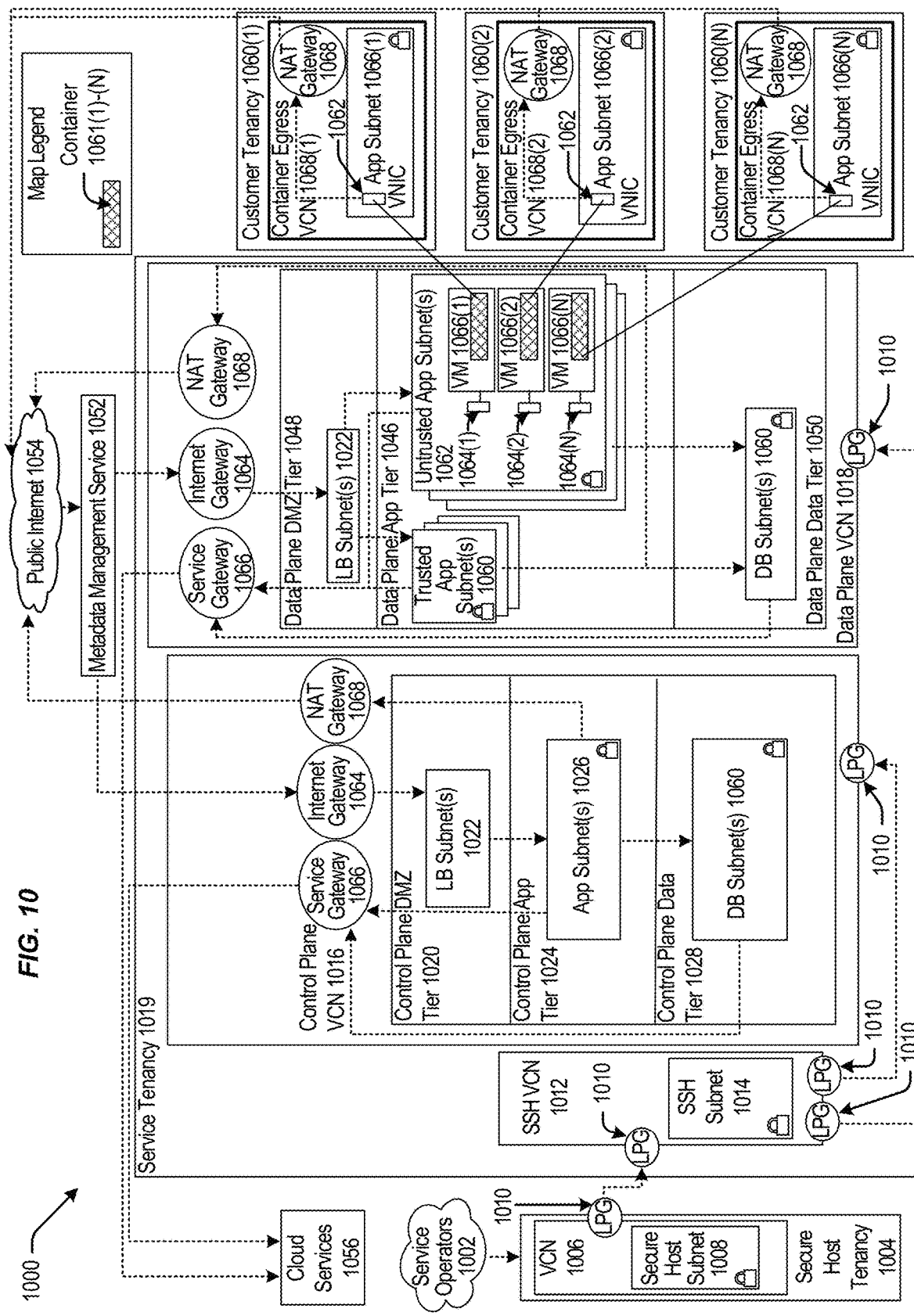
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g., service operators 802 of FIG. 8) can be communicatively coupled to a secure host tenancy 1004 (e.g., the secure host tenancy 804 of FIG. 8) that can include a virtual cloud network (VCN) 1006 (e.g., the VCN 806 of FIG. 8) and a secure host subnet 1008 (e.g., the secure host subnet 808 of FIG. 8). The VCN 1006 can include an LPG 1010 (e.g., the LPG 810 of FIG. 8) that can be communicatively coupled to an SSH VCN 1012 (e.g., the SSH VCN 812 of FIG. 8) via an LPG 1010 contained in the SSH VCN 1012. The SSH VCN 1012 can include an SSH subnet 1014 (e.g., the SSH subnet 814 of FIG. 8), and the SSH VCN 1012 can be communicatively coupled to a control plane VCN 1016 (e.g., the control plane VCN 816 of FIG. 8) via an LPG 1010 contained in the control plane VCN 1016 and to a data plane VCN 1018 (e.g., the data plane 818 of FIG. 8) via an LPG 1010 contained in the data plane VCN 1018. The control plane VCN 1016 and the data plane VCN 1018 can be contained in a service tenancy 1019 (e.g., the service tenancy 819 of FIG. 8).

The control plane VCN 1016 can include a control plane DMZ tier 1020 (e.g., the control plane DMZ tier 820 of FIG. 8) that can include load balancer (LB) subnet(s) 1022 (e.g., LB subnet(s) 822 of FIG. 8), a control plane app tier 1024 (e.g., the control plane app tier 824 of FIG. 8) that can include app subnet(s) 1026 (e.g., similar to app subnet(s) 826 of FIG. 8), a control plane data tier 1028 (e.g., the control plane data tier 828 of FIG. 8) that can include DB subnet(s) 1030. The LB subnet(s) 1022 contained in the control plane DMZ tier 1020 can be communicatively coupled to the app subnet(s) 1026 contained in the control plane app tier 1024 and to an Internet gateway 1034 (e.g., the Internet gateway 834 of FIG. 8) that can be contained in the control plane VCN 1016, and the app subnet(s) 1026 can be communicatively coupled to the DB subnet(s) 1030 contained in the control plane data tier 1028 and to a service gateway 1036 (e.g., the service gateway of FIG. 8) and a network address translation (NAT) gateway 1038 (e.g., the NAT gateway 838 of FIG. 8). The control plane VCN 1016 can include the service gateway 1036 and the NAT gateway 1038.

The data plane VCN 1018 can include a data plane app tier 1046 (e.g., the data plane app tier 846 of FIG. 8), a data plane DMZ tier 1048 (e.g., the data plane DMZ tier 848 of FIG. 8), and a data plane data tier 1050 (e.g., the data plane data tier 850 of FIG. 8). The data plane DMZ tier 1048 can include LB subnet(s) 1022 that can be communicatively coupled to trusted app subnet(s) 1060 and untrusted app subnet(s) 1062 of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include one or more primary VNICs 1064(1)-(N) that can be communicatively coupled to tenant virtual machines (VMs) 1066(1)-(N). Each tenant virtual machine 1066(1)-(N) can be communicatively coupled to a respective app subnet 1067(1)-(N) that can be contained in respective container egress VCNs 1068(1)-(N) that can be contained in respective customer tenancies 1070(1)-(N). Respective secondary VNICs 1072(1)-(N) can facilitate communication between the untrusted app subnet(s) 1062 contained in the data plane VCN 1018 and the app subnet contained in the container egress VCNs 1068(1)-(N). Each container egress VCNs 1068(1)-(N) can include a NAT gateway 1038 that can be communicatively coupled to public Internet 1054 (e.g., public Internet 854 of FIG. 8).

The Internet gateway 1034 contained in the control plane VCN 1016 and contained in the data plane VCN 1018 can be communicatively coupled to a metadata management service 1052 (e.g., the metadata management service 852 of FIG. 8) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively couple to cloud services 1056.

In some embodiments, the data plane VCN 1018 can be integrated with customer tenancies 1070. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1046. Code to run the function may be executed in the virtual machines 1066(1)-(N), and the code may not be configured to run anywhere else on the data plane VCN 1018. Each virtual machine 1066(1)-(N) may be connected to one customer tenancy 1070. Respective containers 1071(1)-(N) contained in the virtual machines 1066(1)-(N) may be configured to run the code. In this case, there can be a dual isolation (e.g., the containers 1071(1)-(N) running code, where the containers 1071(1)-(N) may be contained in at least the virtual machine 1066(1)-(N) that are contained in the untrusted app subnet(s) 1062), which may help prevent incorrect or otherwise undesirable code from damaging the network of the IaaS provider or from damaging a network of a different customer. The containers 1071(1)-(N) may be communicatively coupled to the customer tenancy 1070 and may be configured to transmit or receive data from the customer tenancy 1070. The containers 1071(1)-(N) may not be configured to transmit or receive data from any other entity in the data plane VCN 1018. Upon completion of running the code, the IaaS provider may kill or otherwise dispose of the containers 1071(1)-(N).

In some embodiments, the trusted app subnet(s) 1060 may run code that may be owned or operated by the IaaS provider. In this embodiment, the trusted app subnet(s) 1060 may be communicatively coupled to the DB subnet(s) 1030 and be configured to execute CRUD operations in the DB subnet(s) 1030. The untrusted app subnet(s) 1062 may be communicatively coupled to the DB subnet(s) 1030, but in this embodiment, the untrusted app subnet(s) may be configured to execute read operations in the DB subnet(s) 1030. The containers 1071(1)-(N) that can be contained in the virtual machine 1066(1)-(N) of each customer and that may run code from the customer may not be communicatively coupled with the DB subnet(s) 1030.

In other embodiments, the control plane VCN 1016 and the data plane VCN 1018 may not be directly communicatively coupled. In this embodiment, there may be no direct communication between the control plane VCN 1016 and the data plane VCN 1018. However, communication can occur indirectly through at least one method. An LPG 1010 may be established by the IaaS provider that can facilitate communication between the control plane VCN 1016 and the data plane VCN 1018. In another example, the control plane VCN 1016 or the data plane VCN 1018 can make a call to cloud services 1056 via the service gateway 1036. For example, a call to cloud services 1056 from the control plane VCN 1016 can include a request for a service that can communicate with the data plane VCN 1018.

Figure 11:
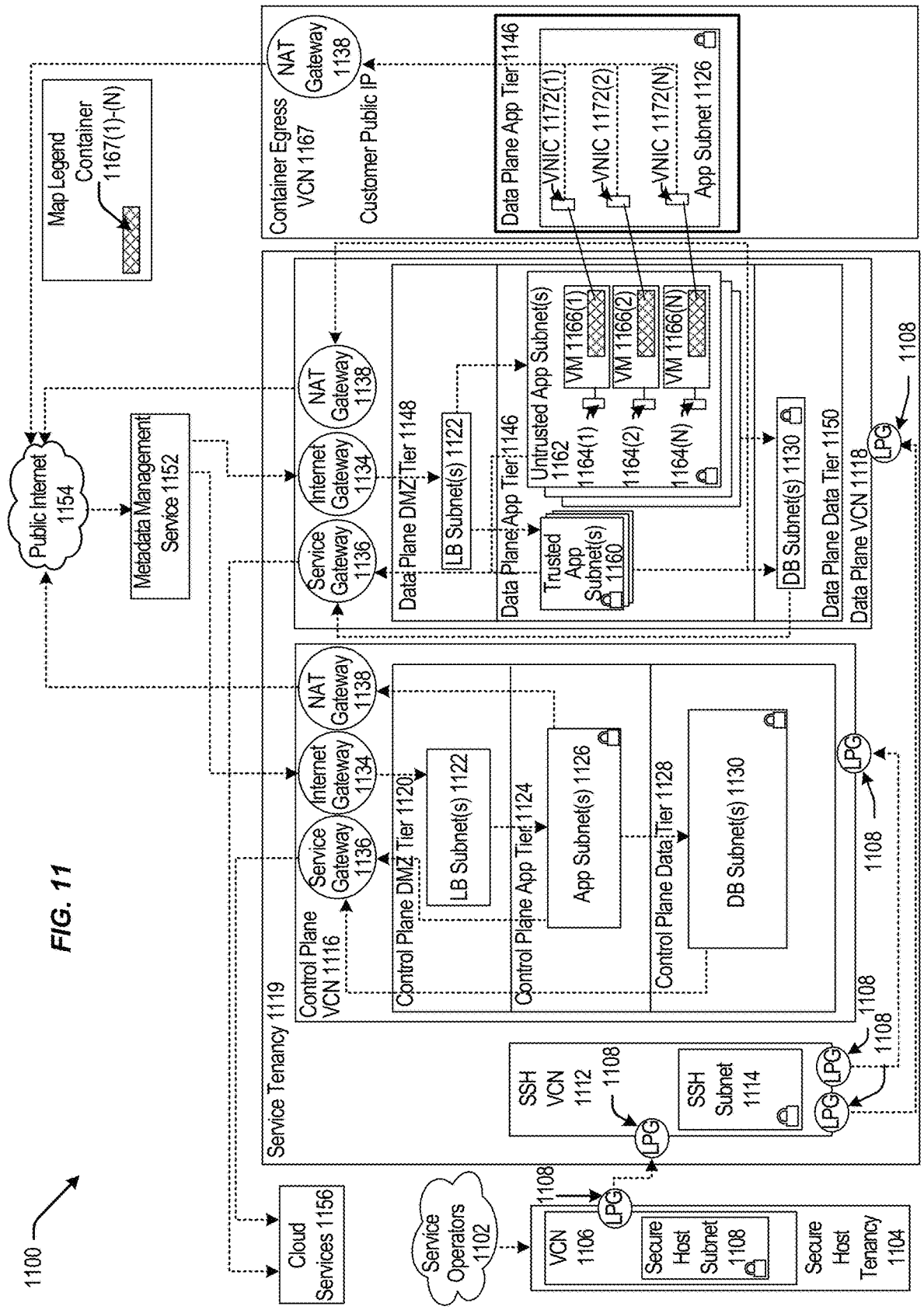
FIG. 11 is a block diagram illustrating another pattern for implementing a cloud infrastructure as a service system, according to at least one embodiment.

FIG. 11 is a block diagram 1100 illustrating another example pattern of an IaaS architecture, according to at least one embodiment. Service operators 1102 (e.g., service operators 802 of FIG. 8) can be communicatively coupled to a secure host tenancy 1104 (e.g., the secure host tenancy 804 of FIG. 8) that can include a virtual cloud network (VCN) 1106 (e.g., the VCN 806 of FIG. 8) and a secure host subnet 1108 (e.g., the secure host subnet 808 of FIG. 8). The VCN 1106 can include an LPG 1110 (e.g., the LPG 810 of FIG. 8) that can be communicatively coupled to an SSH VCN 1112 (e.g., the SSH VCN 812 of FIG. 8) via an LPG 1110 contained in the SSH VCN 1112. The SSH VCN 1112 can include an SSH subnet 1114 (e.g., the SSH subnet 814 of FIG. 8), and the SSH VCN 1112 can be communicatively coupled to a control plane VCN 1116 (e.g., the control plane VCN 816 of FIG. 8) via an LPG 1110 contained in the control plane VCN 1116 and to a data plane VCN 1118 (e.g., the data plane 818 of FIG. 8) via an LPG 1110 contained in the data plane VCN 1118. The control plane VCN 1116 and the data plane VCN 1118 can be contained in a service tenancy 1119 (e.g., the service tenancy 819 of FIG. 8).

The control plane VCN 1116 can include a control plane DMZ tier 1120 (e.g., the control plane DMZ tier 820 of FIG. 8) that can include LB subnet(s) 1122 (e.g., LB subnet(s) 822 of FIG. 8), a control plane app tier 1124 (e.g., the control plane app tier 824 of FIG. 8) that can include app subnet(s) 1126 (e.g., app subnet(s) 826 of FIG. 8), a control plane data tier 1128 (e.g., the control plane data tier 828 of FIG. 8) that can include DB subnet(s) 1130 (e.g., DB subnet(s) 1030 of FIG. 10). The LB subnet(s) 1122 contained in the control plane DMZ tier 1120 can be communicatively coupled to the app subnet(s) 1126 contained in the control plane app tier 1124 and to an Internet gateway 1134 (e.g., the Internet gateway 834 of FIG. 8) that can be contained in the control plane VCN 1116, and the app subnet(s) 1126 can be communicatively coupled to the DB subnet(s) 1130 contained in the control plane data tier 1128 and to a service gateway 1136 (e.g., the service gateway of FIG. 8) and a network address translation (NAT) gateway 1138 (e.g., the NAT gateway 838 of FIG. 8). The control plane VCN 1116 can include the service gateway 1136 and the NAT gateway 1138.

The data plane VCN 1118 can include a data plane app tier 1146 (e.g., the data plane app tier 846 of FIG. 8), a data plane DMZ tier 1148 (e.g., the data plane DMZ tier 848 of FIG. 8), and a data plane data tier 1150 (e.g., the data plane data tier 850 of FIG. 8). The data plane DMZ tier 1148 can include LB subnet(s) 1122 that can be communicatively coupled to trusted app subnet(s) 1160 (e.g., trusted app subnet(s) 1060 of FIG. 10) and untrusted app subnet(s) 1162 (e.g., untrusted app subnet(s) 1062 of FIG. 10) of the data plane app tier 1146 and the Internet gateway 1134 contained in the data plane VCN 1118. The trusted app subnet(s) 1160 can be communicatively coupled to the service gateway 1136 contained in the data plane VCN 1118, the NAT gateway 1138 contained in the data plane VCN 1118, and DB subnet(s) 1130 contained in the data plane data tier 1150. The untrusted app subnet(s) 1162 can be communicatively coupled to the service gateway 1136 contained in the data plane VCN 1118 and DB subnet(s) 1130 contained in the data plane data tier 1150. The data plane data tier 1150 can include DB subnet(s) 1130 that can be communicatively coupled to the service gateway 1136 contained in the data plane VCN 1118.

The untrusted app subnet(s) 1162 can include primary VNICs 1164(1)-(N) that can be communicatively coupled to tenant virtual machines (VMs) 1166(1)-(N) residing within the untrusted app subnet(s) 1162. Each tenant virtual machine 1166(1)-(N) can run code in a respective container 1167(1)-(N), and be communicatively coupled to an app subnet 1126 that can be contained in a data plane app tier 1146 that can be contained in a container egress VCN 1168. Respective secondary VNICs 1172(1)-(N) can facilitate communication between the untrusted app subnet(s) 1162 contained in the data plane VCN 1118 and the app subnet contained in the container egress VCN 1168. The container egress VCN can include a NAT gateway 1138 that can be communicatively coupled to public Internet 1154 (e.g., public Internet 854 of FIG. 8).

The Internet gateway 1134 contained in the control plane VCN 1116 and contained in the data plane VCN 1118 can be communicatively coupled to a metadata management service 1152 (e.g., the metadata management service 852 of FIG. 8) that can be communicatively coupled to public Internet 1154. Public Internet 1154 can be communicatively coupled to the NAT gateway 1138 contained in the control plane VCN 1116 and contained in the data plane VCN 1118. The service gateway 1136 contained in the control plane VCN 1116 and contained in the data plane VCN 1118 can be communicatively couple to cloud services 1156.

In some examples, the pattern illustrated by the architecture of block diagram 1100 of FIG. 11 may be considered an exception to the pattern illustrated by the architecture of block diagram 1000 of FIG. 10 and may be desirable for a customer of the IaaS provider if the IaaS provider cannot directly communicate with the customer (e.g., a disconnected region). The respective containers 1167(1)-(N) that are contained in the virtual machines 1166(1)-(N) for each customer can be accessed in real-time by the customer. The containers 1167(1)-(N) may be configured to make calls to respective secondary VNICs 1172(1)-(N) contained in app subnet(s) 1126 of the data plane app tier 1146 that can be contained in the container egress VCN 1168. The secondary VNICs 1172(1)-(N) can transmit the calls to the NAT gateway 1138 that may transmit the calls to public Internet 1154. In this example, the containers 1167(1)-(N) that can be accessed in real-time by the customer can be isolated from the control plane VCN 1116 and can be isolated from other entities contained in the data plane VCN 1118. The containers 1167(1)-(N) may also be isolated from resources from other customers.

In other examples, the customer can use the containers 1167(1)-(N) to call cloud services 1156. In this example, the customer may run code in the containers 1167(1)-(N) that requests a service from cloud services 1156. The containers 1167(1)-(N) can transmit this request to the secondary VNICs 1172(1)-(N) that can transmit the request to the NAT gateway that can transmit the request to public Internet 1154. Public Internet 1154 can transmit the request to LB subnet(s) 1122 contained in the control plane VCN 1116 via the Internet gateway 1134. In response to determining the request is valid, the LB subnet(s) can transmit the request to app subnet(s) 1126 that can transmit the request to cloud services 1156 via the service gateway 1136.

It should be appreciated that IaaS architectures 800, 900, 1000, 1100 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Example Computer System

FIG. 12 illustrates an example computer system 1200, in which various embodiments may be implemented. The computer system 1200 may be used to implement any of the computer systems described above. As shown in the figure, computer system 1200 includes a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 includes tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In other embodiments, processing unit 1204 may also be implemented as a quad-core processing unit formed by integrating two dual-core processors into a single chip.

In various embodiments, processing unit 1204 can execute a variety of programs in response to program code and can maintain multiple concurrently executing programs or processes. At any given time, some or all of the program code to be executed can be resident in processor(s) 1204 and/or in storage subsystem 1218. Through suitable programming, processor(s) 1204 can provide various functionalities described above. Computer system 1200 may additionally include a processing acceleration unit 1206, which can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1200 may include a storage subsystem 1218 that includes software elements, shown as being currently located within a system memory 1210. System memory 1210 may store program instructions that are loadable and executable on processing unit 1204, as well as data generated during the execution of these programs.

Depending on the configuration and type of computer system 1200, system memory 1210 may be volatile (such as random access memory (RAM)) and/or non-volatile (such as read-only memory (ROM), flash memory, etc.) The RAM typically contains data and/or program services that are immediately accessible to and/or presently being operated and executed by processing unit 1204. In some implementations, system memory 1210 may include multiple different types of memory, such as static random access memory (SRAM) or dynamic random access memory (DRAM). In some implementations, a basic input/output system (BIOS), containing the basic routines that help to transfer information between elements within computer system 1200, such as during start-up, may typically be stored in the ROM. By way of example, and not limitation, system memory 1210 also illustrates application programs 1212, which may include client applications, Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems.

Storage subsystem 1218 may also provide a tangible computer-readable storage medium for storing the basic programming and data constructs that provide the functionality of some embodiments. Software (programs, code services, instructions) that when executed by a processor provide the functionality described above may be stored in storage subsystem 1218. These software services or instructions may be executed by processing unit 1204. Storage subsystem 1218 may also provide a repository for storing data used in accordance with the present disclosure.

Storage subsystem 1218 may also include a computer-readable storage media reader 1220 that can further be connected to computer-readable storage media 1222. Together and, optionally, in combination with system memory 1210, computer-readable storage media 1222 may comprehensively represent remote, local, fixed, and/or removable storage devices plus storage media for temporarily and/or more permanently containing, storing, transmitting, and retrieving computer-readable information.

Computer-readable storage media 1222 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 1200.

By way of example, computer-readable storage media 1222 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program services, and other data for computer system 1200.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to connect to one or more devices via the Internet. In some embodiments, communications subsystem 1224 can include radio frequency (RF) transceiver components for accessing wireless voice and/or data networks (e.g., using cellular telephone technology, advanced data network technology, such as 3 G, 4 G, 5 G or EDGE (enhanced data rates for global evolution), WiFi (IEEE 802.11 family standards, or other mobile communication technologies, or any combination thereof)), global positioning system (GPS) receiver components, and/or other components. In some embodiments, communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1226, event streams 1228, event updates 1230, and the like on behalf of one or more users who may use computer system 1200.

By way of example, communications subsystem 1224 may be configured to receive data feeds 1226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "including," "having," "including," and "containing" are to be construed as open-ended terms (i.e., meaning "including, but not limited to,") unless otherwise noted. The term "connected" is to be construed as a partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

As used herein, when an action is "based on" something, this means the action is based at least in part on at least a part of the something. As used herein, the terms "substantially," "approximately" and "about" are defined as being largely but not necessarily wholly what is specified (and include wholly what is specified) as understood by one of ordinary skill in the art. In any disclosed embodiment, the term "substantially," "approximately," or "about" may be substituted with "within [a percentage] of" what is specified, where the percentage includes 0.1, 1, 5, and 10 percent.

While illustrative examples of the application have been described in detail herein, it is to be understood that the inventive concepts may be otherwise variously embodied and employed, and that the appended claims are intended to be construed to include such variations, except as limited by the prior art.

What is claimed is:

1. A computer-implemented method comprising:
   obtaining, by a sentiment analysis system incorporating a neural network comprising a language model coupled to a multi-task model comprising a token labeling head and a sequence classification head, a text comprising sentences, wherein a configuration flag is associated with the text and indicates whether aspect-based sentiment analysis, sentence-level sentiment analysis, or both are to be performed on the text, wherein the sentiment analysis system is configured for a set of predetermined sentiments;
   providing, by the sentiment analysis system, as an input, the text to the language model;
   generating, by the language model, chunks of token embeddings for the text, wherein:
     each of the chunks comprises a predefined total number of token embeddings comprising token embeddings from a main sentence and at least one of token embeddings from a sentence before the main sentence, token embeddings from a sentence after the main sentence, or a combination thereof, and
     for each of the chunks, a number of the token embeddings from the sentence before the main sentence and a number of the token embeddings from the sentence after the main sentence are restricted to a predefined limit number of token embeddings;
   determining, by the sentiment analysis system, whether the configuration flag indicates to perform the aspect-based sentiment analysis using the token labeling head, the sentence-level sentiment analysis using the sequence classification head, or both;
   when the configuration flag indicates the aspect-based sentiment analysis is to be performed, executing, by the sentiment analysis system, a first process comprising:
     providing first input data corresponding to the text to the token labeling head, the first input data comprising the token embeddings from the main sentence and the at least one of the token embeddings from the sentence before the main sentence, the token embeddings from the sentence after the main sentence, or the combination thereof in each chunk, and
     performing, using the token labeling head, the aspect-based sentiment analysis on the first input data corresponding to the text, wherein the token labeling head outputs a prediction of a first sentiment from the set of predetermined sentiments based on the first input data;
   when the configuration flag indicates the sentence-level sentiment analysis is to be performed, executing, by the sentiment analysis system, a second process comprising:

masking, for each of the chunks, the at least one of the token embeddings from the sentence before the main sentence, the token embeddings from the sentence after the main sentence, or the combination thereof, providing second input data corresponding to the text to the sequence classification head, the second input data comprising the token embeddings from the main sentence of each chunk associated with each of the sentences, and performing, using the sequence classification head, the sentence-level sentiment analysis on each of the sentences in the text based on the second input data, wherein the sequence classification head outputs a prediction of a second sentiment from the set of predetermined sentiments based on the second input data; and when the configuration flag indicates both the aspect-based sentiment analysis and the sentence-level sentiment analysis are to be performed, performing both the first process and the second process.

2. The computer-implemented method of claim 1, wherein the masking comprises applying, for each of the chunks, a mask value to the at least one of the token embeddings from the sentence before the main sentence, the token embeddings from the sentence after the main sentence, or the combination thereof.

3. The computer-implemented method of claim 2, wherein performing the sentence-level sentiment analysis further comprises:

inputting the token embeddings from the main sentence in each chunk that is associated with a given sentence into the sequence classification head of the multi-task model;

predicting, by the sequence classification head, the second sentiment for the given sentence based on the token embeddings; and outputting, by the sequence classification head, the second sentiment for the given sentence.

4. The computer-implemented method of claim 1, wherein performing the aspect-based sentiment analysis further comprises:

inputting the token embeddings from the main sentence and the at least one of the token embeddings from the sentence before the main sentence, the token embeddings from the sentence after the main sentence, or the combination thereof in each chunk into the token labeling head of the multi-task model;

locating, by the token labeling head, one or more aspects in the text based on the token embeddings from the main sentence and the at least one of the token embeddings from the sentence before the main sentence, the token embeddings from the sentence after the main sentence, or the combination thereof in each chunk;

predicting, by the token labeling head, the first sentiment expressed towards each of the one or more aspects based on the token embeddings from the main sentence and the at least one of the token embeddings from the sentence before the main sentence, the token embeddings from the sentence after the main sentence, or the combination thereof in each chunk; and outputting, by the token labeling head, the first sentiment expressed towards each of the one or more aspects.

5. The computer-implemented method of claim 1, wherein at least one of the chunks comprises a part of the token embeddings from the sentence before the main sentence and the token embeddings from the main sentence, and a chunk following the at least one of the chunks comprises a part of the token embeddings from the main sentence and the token embeddings from the sentence after the main sentence.

6. The computer-implemented method of claim 1, wherein the token labeling head and the sequence classification head are configured by training a first head and a second head, respectively, using an early stop training method that comprises:

training the first head and the second head using token embeddings from a first set of documents;

optimizing hyperparameters comprising weights associated with a first performance metric for the first head and a second performance metric for the second head;

validating the first head and the second head using token embeddings from a second set of documents;

evaluating performance of the first head and the second head based on the second set of documents using a combination of the first performance metric, the second performance metric, and associated weights; and stopping the training of the first head and the second head when the performance of the first head and the second head on the second set of documents begins to degrade as determined based on the evaluating.

7. A system comprising:

one or more processors; and one or more computer-readable media storing instructions that, when executed by the one or more processors, cause the system to perform a method including:

obtaining, a text comprising sentences, wherein a configuration flag is associated with the text and indicates whether aspect-based sentiment analysis, sentence-level sentiment analysis, or both are to be performed on the text, wherein the system is configured for a set of predetermined sentiments and incorporates a neural network comprising a language model coupled to a multi-task model comprising a token labeling head and a sequence classification head;

providing, as an input, the text to the language model;

generating, by the language model, chunks of token embeddings for the text, wherein:

each of the chunks comprises a predefined total number of token embeddings comprising token embeddings from a main sentence and at least one of token embeddings from a sentence before the main sentence, token embeddings from a sentence after the main sentence, or a combination thereof, and for each of the chunks, a number of the token embeddings from the sentence before the main sentence and a number of the token embeddings from the sentence after the main sentence are restricted to a predefined limit number of token embeddings;

determining whether the configuration flag indicates to perform the aspect-based sentiment analysis using the token labeling head, the sentence-level sentiment analysis using the sequence classification head, or both;

when the configuration flag indicates the aspect-based sentiment analysis is to be performed, executing a first process including:

providing first input data corresponding to the text to the token labeling head, the first input data comprising the token embeddings from the main sentence and the at least one of the token embeddings from the sentence before the main sentence, the token embeddings from the sentence after the main sentence, or the combination thereof in each chunk, and performing, using the token labeling head, the aspect-based sentiment analysis on the first input data corresponding to the text, wherein the token labeling head outputs a prediction of a first sentiment from the set of predetermined sentiments based on the first input data;

when the configuration flag indicates the sentence-level sentiment analysis is to be performed, executing a second process including-:

masking, for each of the chunks, the at least one of the token embeddings from the sentence before the main sentence, the token embeddings from the sentence after the main sentence, or the combination thereof, providing second input data corresponding to the text to the sequence classification head, the second input data comprising the token embeddings from the main sentence of each chunk associated with each of the sentences, and performing, using the sequence classification head, the sentence-level sentiment analysis on each of the sentences in the text based on the second input data, wherein the sequence classification head outputs a prediction of a second sentiment from the set of predetermined sentiments based on the second input data; and when the configuration flag indicates both the aspect-based sentiment analysis and the sentence-level sentiment analysis are to be performed, performing both the first process and the second process.

8. The system of claim 7, wherein the masking includes applying, for each of the chunks, a mask value to the at least one of the token embeddings from the sentence before the main sentence, the token embeddings from the sentence after the main sentence, or the combination thereof.

9. The system of claim 8, wherein performing the sentence-level sentiment analysis further includes:

inputting the token embeddings from the main sentence in each chunk that is associated with a given sentence into the sequence classification head of the multi-task model;

predicting, by the sequence classification head, the second sentiment for the given sentence based on the token embeddings; and outputting, by the sequence classification head, the second sentiment for the given sentence.

10. The system of claim 7, wherein performing the aspect-based sentiment analysis further includes:

inputting the token embeddings from the main sentence and the at least one of the token embeddings from the sentence before the main sentence, the token embeddings from the sentence after the main sentence, or the combination thereof in each chunk into the token labeling head of the multi-task model;

locating, by the token labeling head, one or more aspects in the text based on the token embeddings from the main sentence and the at least one of the token embeddings from the sentence before the main sentence, the token embeddings from the sentence after the main sentence, or the combination thereof in each chunk;

predicting, by the token labeling head, the first sentiment expressed towards each of the one or more aspects based on the token embeddings from the main sentence and the at least one of the token embeddings from the sentence before the main sentence, the token embeddings from the sentence after the main sentence, or the combination thereof in each chunk; and outputting, by the token labeling head, the first sentiment expressed towards each of the one or more aspects.

11. The system of claim 7, wherein at least one of the chunks comprises a part of the token embeddings from the sentence before the main sentence and the token embeddings from the main sentence, and a chunk following the at least one of the chunks comprises a part of the token embeddings from the main sentence and the token embeddings from the sentence after the main sentence.

12. The system of claim 7, wherein the token labeling head and the sequence classification head are configured by training a first head and a second head, respectively, using an early stop training method that includes:

training the first head and the second head using token embeddings from a first set of documents;

optimizing hyperparameters comprising weights associated with a first performance metric for the first head and a second performance metric for the second head;

validating the first head and the second head using token embeddings from a second set of documents;

evaluating performance of the first head and the second head based on the second set of documents using a combination of the first performance metric, the second performance metric, and associated weights; and stopping the training of the first head and the second head when the performance of the first head and the second head on the second set of documents begins to degrade as determined based on the evaluating.

13. One or more non-transitory computer-readable media storing instructions that, when executed by one or more processors of a sentiment analysis system, cause the one or more processors to perform a method including:

obtaining, a text comprising sentences, wherein a configuration flag is associated with the text and indicates whether aspect-based sentiment analysis, sentence-level sentiment analysis, or both are to be performed on the text, wherein the sentiment analysis system is configured for a set of predetermined sentiments and incorporates a neural network comprising a language model coupled to a multi-task model comprising a token labeling head and a sequence classification head;

providing, as an input, the text to the language model;

generating, by the language model, chunks of token embeddings for the text, wherein:

each of the chunks comprises a predefined total number of token embeddings comprising token embeddings from a main sentence and at least one of token embeddings from a sentence before the main sentence, token embeddings from a sentence after the main sentence, or a combination thereof, and for each of the chunks, a number of the token embeddings from the sentence before the main sentence and a number of the token embeddings from the sentence after the main sentence are restricted to a predefined limit number of token embeddings;

determining whether the configuration flag indicates to perform the aspect-based sentiment analysis using the token labeling head, the sentence-level sentiment analysis using the sequence classification head, or both;

when the configuration flag indicates the aspect-based sentiment analysis is to be performed, executing, by the sentiment analysis system, a first process including:

providing first input data corresponding to the text to the token labeling head, the first input data comprising the token embeddings from the main sentence and the at least one of the token embeddings from the sentence before the main sentence, the token embeddings from the sentence after the main sentence, or the combination thereof in each chunk, and performing, using the token labeling head, the aspect-based sentiment analysis on the first input data corresponding to the text, wherein the token labeling head outputs a prediction of a first sentiment from the set of predetermined sentiments based on the first input data;

when the configuration flag indicates the sentence-level sentiment analysis is to be performed, executing, by the sentiment analysis system, a second process including:

masking, for each of the chunks, the at least one of the token embeddings from the sentence before the main sentence, the token embeddings from the sentence after the main sentence, or the combination thereof, providing second input data corresponding to the text to the sequence classification head, the second input data comprising the token embeddings from the main sentence of each chunk associated with each of the sentences, and performing, using the sequence classification head, the sentence-level sentiment analysis on each of the sentences in the text based on the second input data, wherein the sequence classification head outputs a prediction of a second sentiment from the set of predetermined sentiments based on the second input data; and when the configuration flag indicates both the aspect-based sentiment analysis and the sentence-level sentiment analysis are to be performed, performing both the first process and the second process.

14. The one or more non-transitory computer-readable media of claim 13, wherein the masking includes applying, for each of the chunks, a mask value to the at least one of the token embeddings from the sentence before the main sentence, the token embeddings from the sentence after the main sentence, or the combination thereof.

15. The one or more non-transitory computer-readable media of claim 14, wherein performing the sentence-level sentiment analysis further includes:

inputting the token embeddings from the main sentence in each chunk that is associated with a given sentence into the sequence classification head of the multi-task model;

predicting, by the sequence classification head, the second sentiment for the given sentence based on the token embeddings; and outputting, by the sequence classification head, the second sentiment for the given sentence.

16. The one or more non-transitory computer-readable media of claim 13, wherein performing the aspect-based sentiment analysis further includes:

inputting the token embeddings from the main sentence and the at least one of the token embeddings from the sentence before the main sentence, the token embeddings from the sentence after the main sentence, or the combination thereof in each chunk into the token labeling head of the multi-task model;

locating, by the token labeling head, one or more aspects in the text based on the token embeddings from the main sentence and the at least one of the token embeddings from the sentence before the main sentence, the token embeddings from the sentence after the main sentence, or the combination thereof in each chunk;

predicting, by the token labeling head, the first sentiment expressed towards each of the one or more aspects based on the token embeddings from the main sentence and the at least one of the token embeddings from the sentence before the main sentence, the token embeddings from the sentence after the main sentence, or the combination thereof in each chunk; and outputting, by the token labeling head, the first sentiment expressed towards each of the one or more aspects.

17. The one or more non-transitory computer-readable media of claim 13, wherein at least one of the chunks comprises a part of the token embeddings from the sentence before the main sentence and the token embeddings from the main sentence, and a chunk following the at least one of the chunks comprises a part of the token embeddings from the main sentence and the token embeddings from the sentence after the main sentence.

18. The one or more non-transitory computer-readable media of claim 13, wherein the token labeling head and the sequence classification head are configured by training a first head and a second head, respectively, using an early stop training method that includes:

training the first head and the second head using token embeddings from a first set of documents, optimizing hyperparameters comprising weights associated with a first performance metric for the first head and a second performance metric for the second head, validating the first head and the second head using token embeddings from a second set of documents, evaluating performance of the first head and the second head based on the second set of documents using a combination of the first performance metric, the second performance metric, and associated weights, and stopping the training of the first head and the second head when the performance of the first head and the second head on the second set of documents begins to degrade as determined based on the evaluating.

* * * * *